(12) United States Patent
Fijolek et al.

(10) Patent No.: US 6,223,222 B1
(45) Date of Patent: Apr. 24, 2001

(54) METHOD AND SYSTEM FOR PROVIDING QUALITY-OF-SERVICE IN A DATA-OVER-CABLE SYSTEM USING CONFIGURATION PROTOCOL MESSAGING

(75) Inventors: John G. Fijolek, Naperville; Nurettin B. Beser, Evanston, both of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/079,322

(22) Filed: May 14, 1998

(51) Int. Cl.[7] ................................................... G06F 15/16
(52) U.S. Cl. ........................................ 709/227; 370/236
(58) Field of Search ............... 713/1, 201; 709/217–220, 709/222, 225, 227, 232, 237, 238; 370/229, 230, 235, 236, 254, 351; 710/8, 10, 11

(56) References Cited

U.S. PATENT DOCUMENTS

| | | |
|---|---|---|
| 4,644,533 | 2/1987 | Braff et al. . |
| 4,881,263 | 11/1989 | Herbison et al. ........................ 380/21 |
| 5,014,234 | 5/1991 | Edwards, Jr. .......................... 364/900 |
| 5,138,712 | 8/1992 | Corbin ................................ 395/700 |
| 5,347,304 | 9/1994 | Moura et al. . |
| 5,442,749 | 8/1995 | Northcutt et al. .............. 395/200.09 |
| 5,488,412 | 1/1996 | Majeti et al. . |
| 5,489,897 | 2/1996 | Inoue ................................ 340/870.39 |
| 5,583,931 | 12/1996 | Schneider et al. . |
| 5,586,121 | 12/1996 | Moura et al. . |
| 5,598,410 | 1/1997 | Stone . |
| 5,600,717 | 2/1997 | Schneider et al. . |
| 5,606,606 | 2/1997 | Schneider et al. . |
| 5,608,446 | 3/1997 | Carr et al. . |
| 5,623,542 | 4/1997 | Schneider et al. . |
| 5,623,601 | 4/1997 | Vu ................................... 395/187.01 |

(List continued on next page.)

OTHER PUBLICATIONS

"A solution for the priority queue problem of deadline–ordered service disciplines," N. R. Figueira, IEEE International Conference on Computer Communications and Networks, Sep. 22–25, 1997, pp. 320–325.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., International Conference, vol. 4, ISBN: 0–7803–2431–5, May 9–12, 1995, pp. 2655–2658.

(List continued on next page.)

Primary Examiner—Thomas M. Heckler
(74) Attorney, Agent, or Firm—McDonnell Boehnen Hulbert & Berghoff; Stephen Lesavich

(57) ABSTRACT

A method and system for quality-of-service in a data-over-cable system using configuration protocol messaging is provided. The method and system include determining whether a cable modem termination system has enough available bandwidth to provide a quality-of-service connection requested by a cable modem from a quality-of-service server. The quality-of-service server uses Dynamic Host Configuration Protocol ("DHCP") messaging to send and receive quality-of-service identifiers indicating that the cable modem termination system has enough available bandwidth to provide a quality-of-service connection requested by a cable modem. The cable modem termination system creates a quality-of-service connection to a cable modem based on the quality-of-service identifiers returned from the quality-of-service server. The quality-of-service server using DHCP messaging provides a standard and efficient process to reserve bandwidth for quality-of-service connections in a data-over-cable system. The quality-of-service server is also used to distribute quality-of-service connection requests from cable modems among multiple cable modem termination system in a data-over-cable system.

31 Claims, 33 Drawing Sheets

U.S. PATENT DOCUMENTS

| | | |
|---|---|---|
| 5,636,211 | 6/1997 | Newlin et al. . |
| 5,675,732 | 10/1997 | Majeti et al. . |
| 5,710,885 | 1/1998 | Bondi .................................... 709/224 |
| 5,761,602 | 6/1998 | Wagner et al. ........................ 455/3.1 |
| 5,778,181 | 7/1998 | Hidary et al. ................... 395/200.48 |
| 5,790,198 | 8/1998 | Roop et al. ........................... 348/460 |
| 5,790,548 | 8/1998 | Sistanizadeh et al. ............... 370/401 |
| 5,790,677 | 8/1998 | Fox et al. ............................... 380/24 |
| 5,790,806 * | 8/1998 | Koperda ............................... 709/252 |
| 5,799,086 | 8/1998 | Sudia ..................................... 380/23 |
| 5,805,804 | 9/1998 | Laursen et al. ......................... 348/7 |
| 5,812,819 | 9/1998 | Rodwin et al. ...................... 395/500 |
| 5,818,845 | 10/1998 | Moura et al. ........................ 370/449 |
| 5,819,042 | 10/1998 | Hansen ................................ 714/756 |
| 5,828,655 | 10/1998 | Moura et al. ........................ 370/326 |
| 5,835,727 | 11/1998 | Wong et al. .................... 395/200.68 |
| 5,841,777 | 11/1998 | Cohen . |
| 5,854,901 | 12/1998 | Cole et al. ............................ 709/245 |
| 5,859,852 | 1/1999 | Moura et al. ........................ 370/449 |
| 5,864,679 | 1/1999 | Kanai et al. .......................... 709/238 |
| 5,870,134 | 2/1999 | Laubach et al. ....................... 348/12 |
| 5,872,523 | 2/1999 | Dellaverson et al. .......... 340/825.52 |
| 5,884,024 | 3/1999 | Lim et al. ........................ 395/187.01 |
| 5,903,588 | 5/1999 | Jones et al. . |
| 5,922,049 | 7/1998 | Radia et al. .......................... 709/220 |
| 5,923,659 | 7/1999 | Curry et al. .......................... 370/401 |
| 5,958,007 | 9/1999 | Lee et al. .............................. 709/219 |
| 5,974,453 | 10/1999 | Anderson et al. .................... 709/220 |
| 5,996,076 | 11/1999 | Rowney et al. ...................... 713/201 |
| 6,006,264 | 12/1999 | Colby et al. . |
| 6,009,103 | 12/1999 | Woundy ............................... 370/401 |
| 6,012,088 | 1/2000 | Li et al. ................................ 709/219 |
| 6,013,107 | 1/2000 | Blackshear et al. ................. 703/229 |
| 6,018,767 | 1/2000 | Fijolek et al. ........................ 709/218 |
| 6,049,546 | 4/2000 | Ramakrishnan . |
| 6,049,826 | 4/2000 | Beser ................................... 709/222 |
| 6,058,421 | 5/2000 | Fijolek et al. ........................ 709/225 |
| 6,070,246 | 5/2000 | Beser ................................... 713/201 |
| 6,075,787 | 6/2000 | Bobeck et al. . |
| 6,091,709 | 7/2000 | Harrison et al. . |

OTHER PUBLICATIONS

"Cable Modem to Customer Premise Equipment Interface Specification (Interim) SP–CMCI–I02–980317", Multimedia Cable Network Systems (MCNS) Holdings, L.P., 1998, pp. ii to 40.

"Operations Support System Interface Specification Baseline Privacy Interface MIB (Interim) SP–OSSI–B–PI–I01–980331", MCNS Holdings, L.P., 1998, pp. ii to 33.

"Cable Modem Termination System–Network Side Interface Specification (Interim Specification) SP–C–MTS–NSLL01–960702", MCNS Holdings, L.P., 1996, pp. ii to 13.

"Removable Security Module Interface Specification (Interim Specification) SP–RSMI–I01–980204", MCNS Holdings, L.P., 1997, pp. ii to 48.

"Baseline Privacy Interface Specification (Interim) SP–B–PI–I01–970922", MCNS Holdings, L.P., 1997, pp. ii to 66.

"Operations Support System Interface Specification (Interim) SP–OSSIIO1–970403", MCNS Holdings, L.P., 1997 pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–i01–970804", MCNS Holdings, L.P., 1997, pp. ii to 74.

"Security System Specification (Interim Specification) SP–SSI–I01–970506", MCNS Holdings, L.P., 1997, pp. ii to 103.

"Internet Engineering Task Force, Request for Comments 2131, Dynamic Host Configuration Protocol (DHCP)", Mar. 1997, pp. 1 to 42.

S. Adiraju, J. Fijolek, IPCDN Telephony Return MIB, Internet Engineering Task Force, Internet Draft, "<draft–ietf–ipcdn–tri–mib–00.1.txt>,"Mar. 23, 1998, pp. 1 to 26.

\* cited by examiner

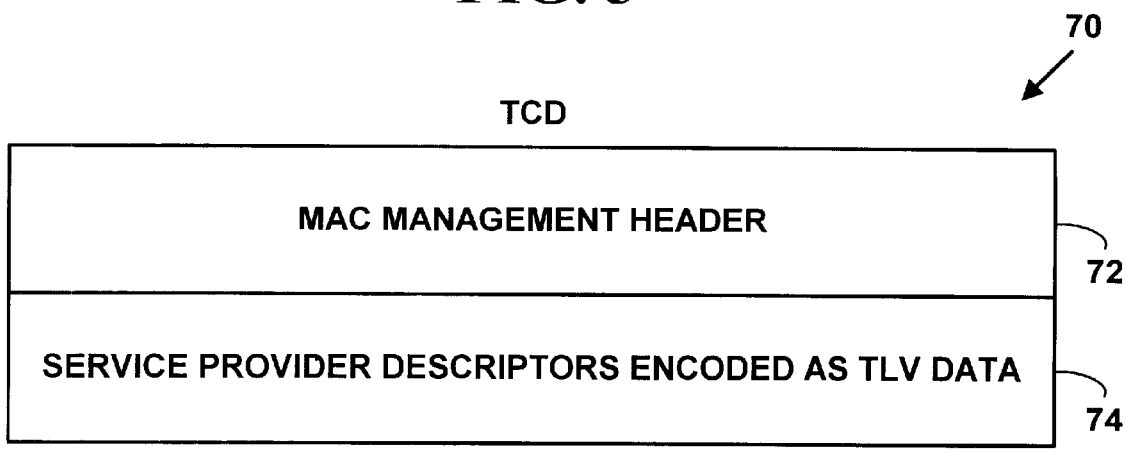
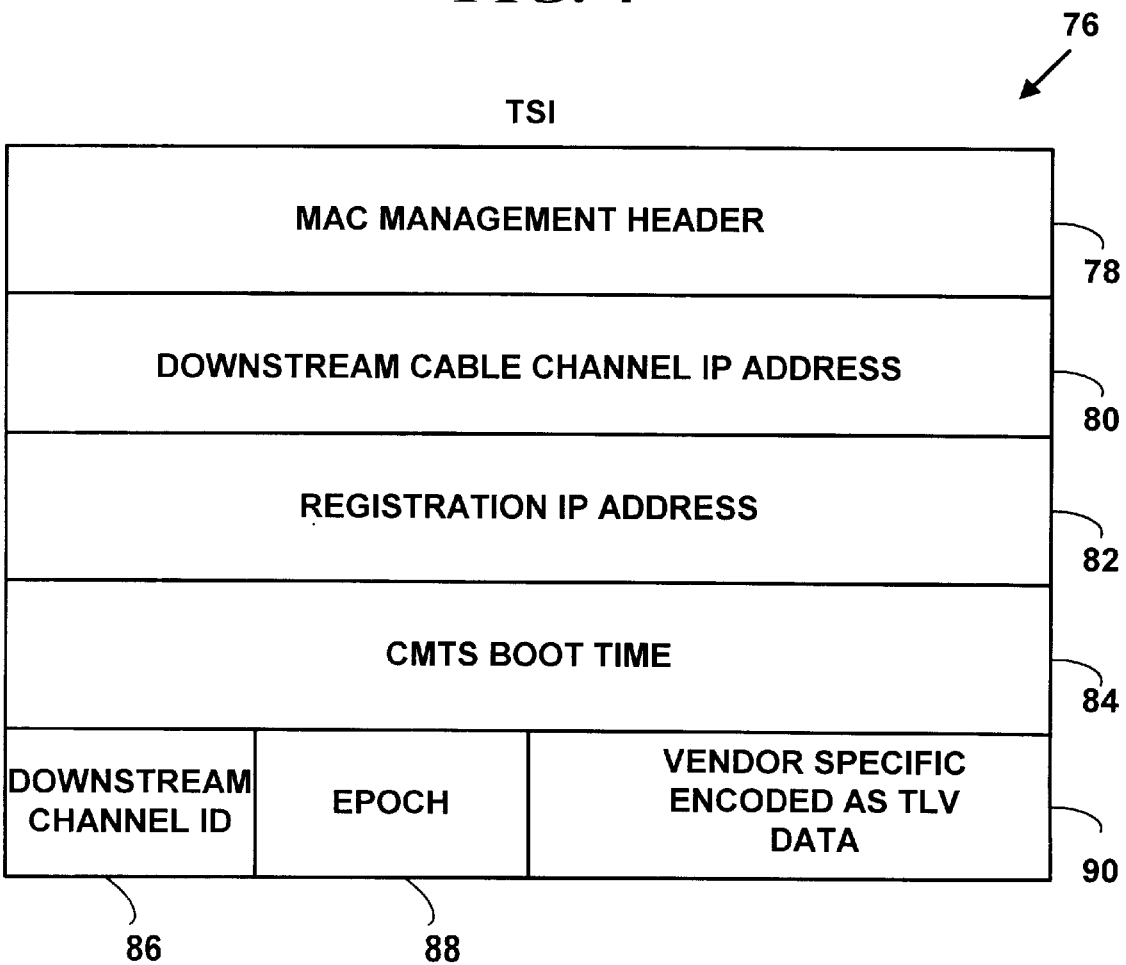

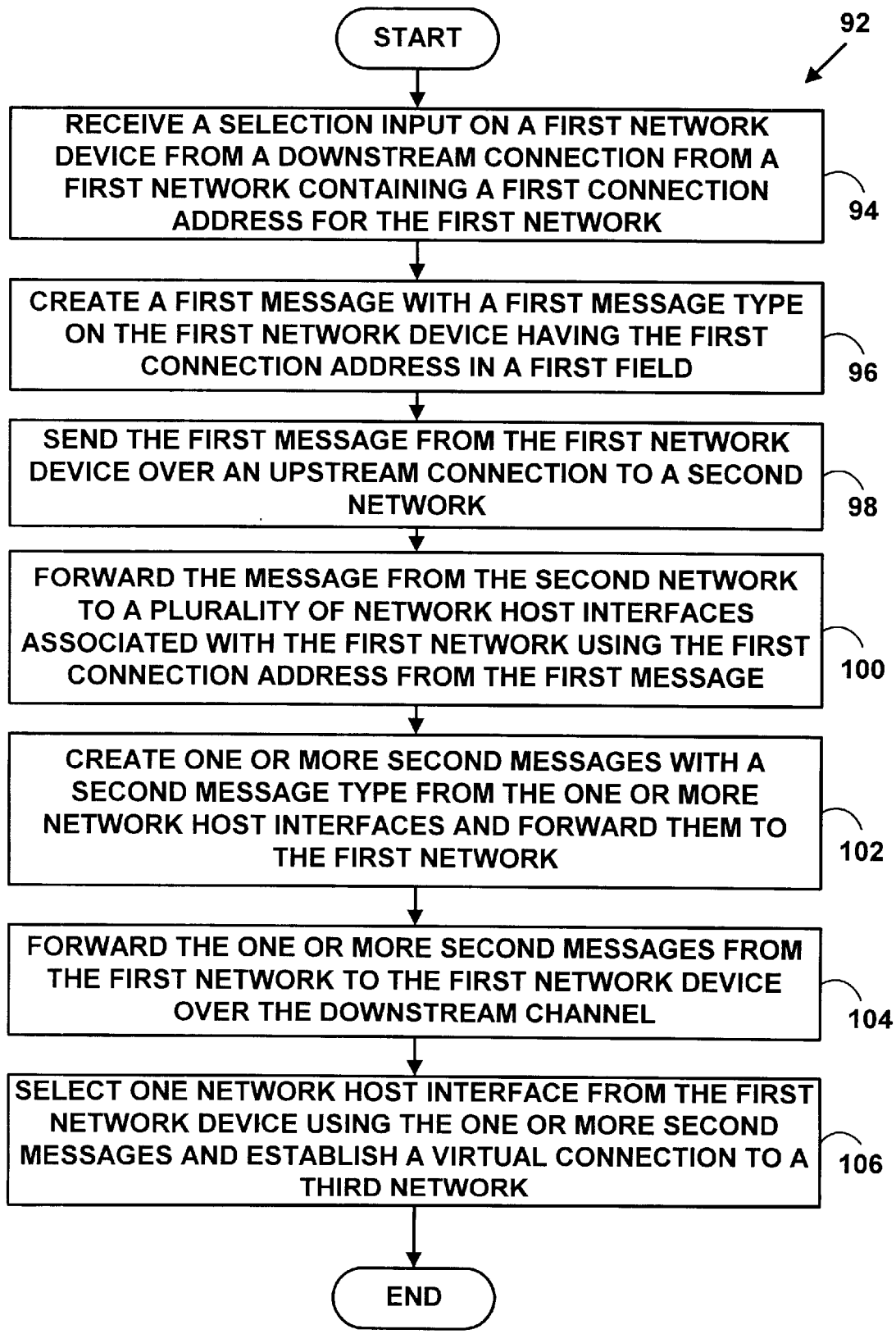

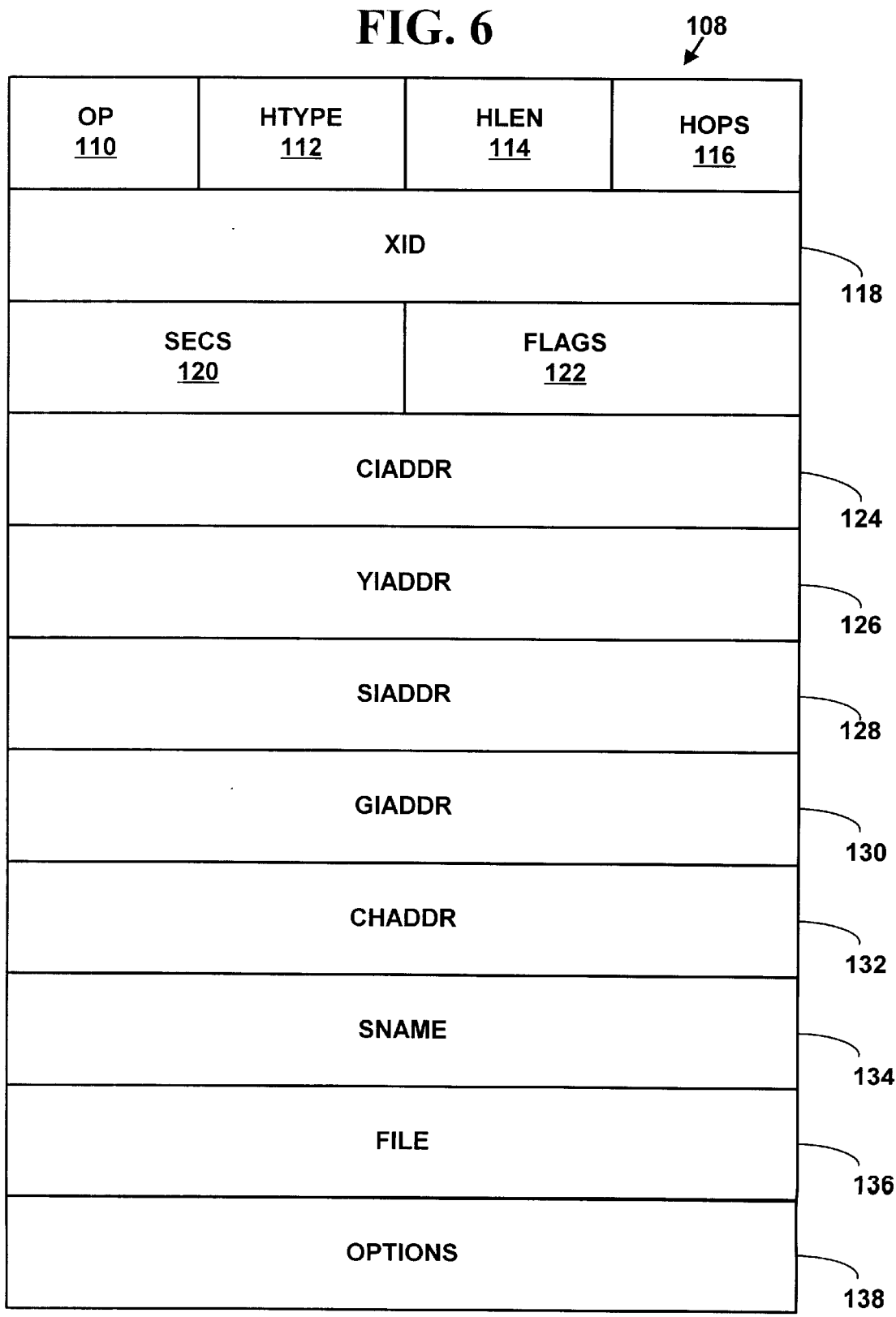

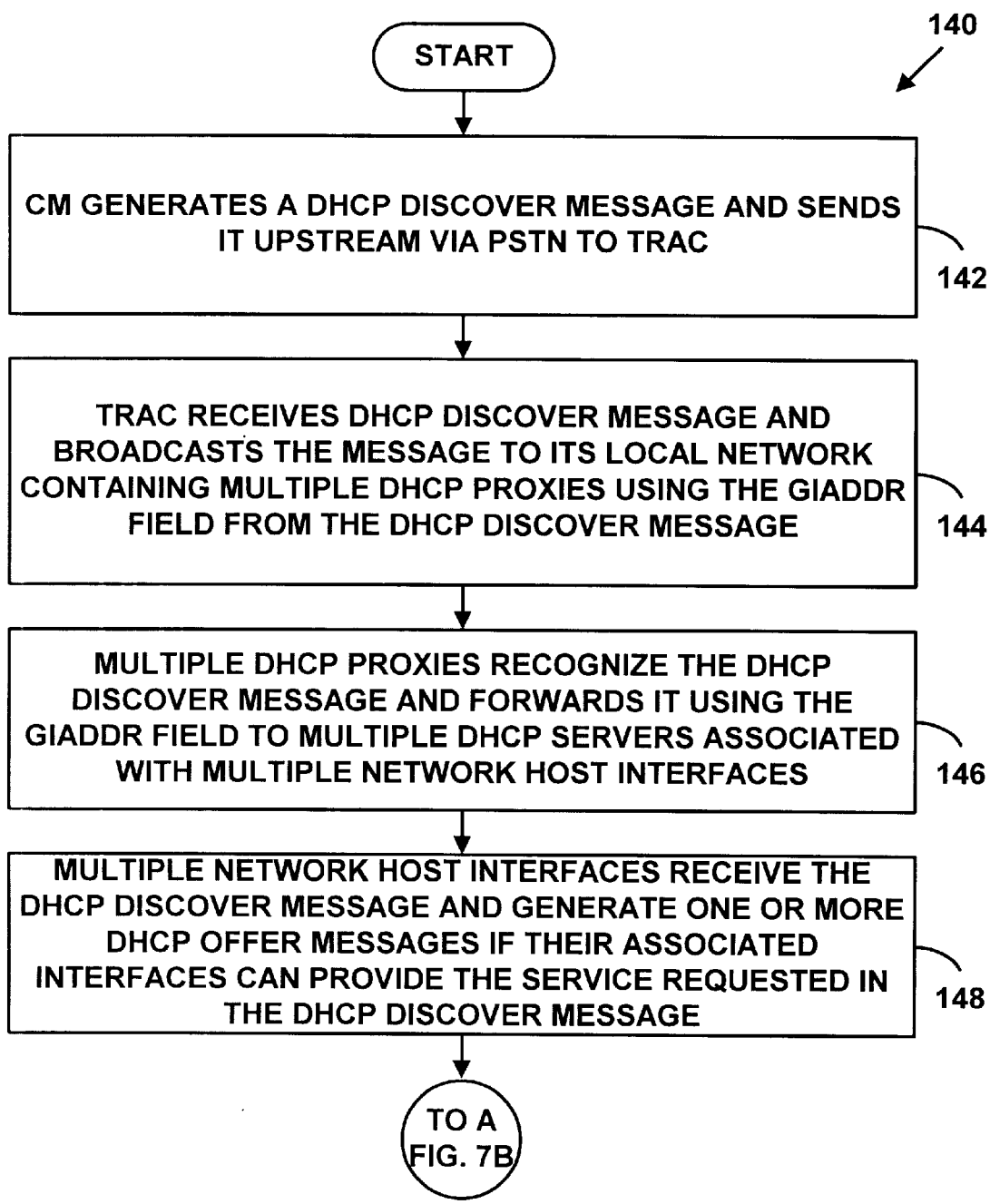

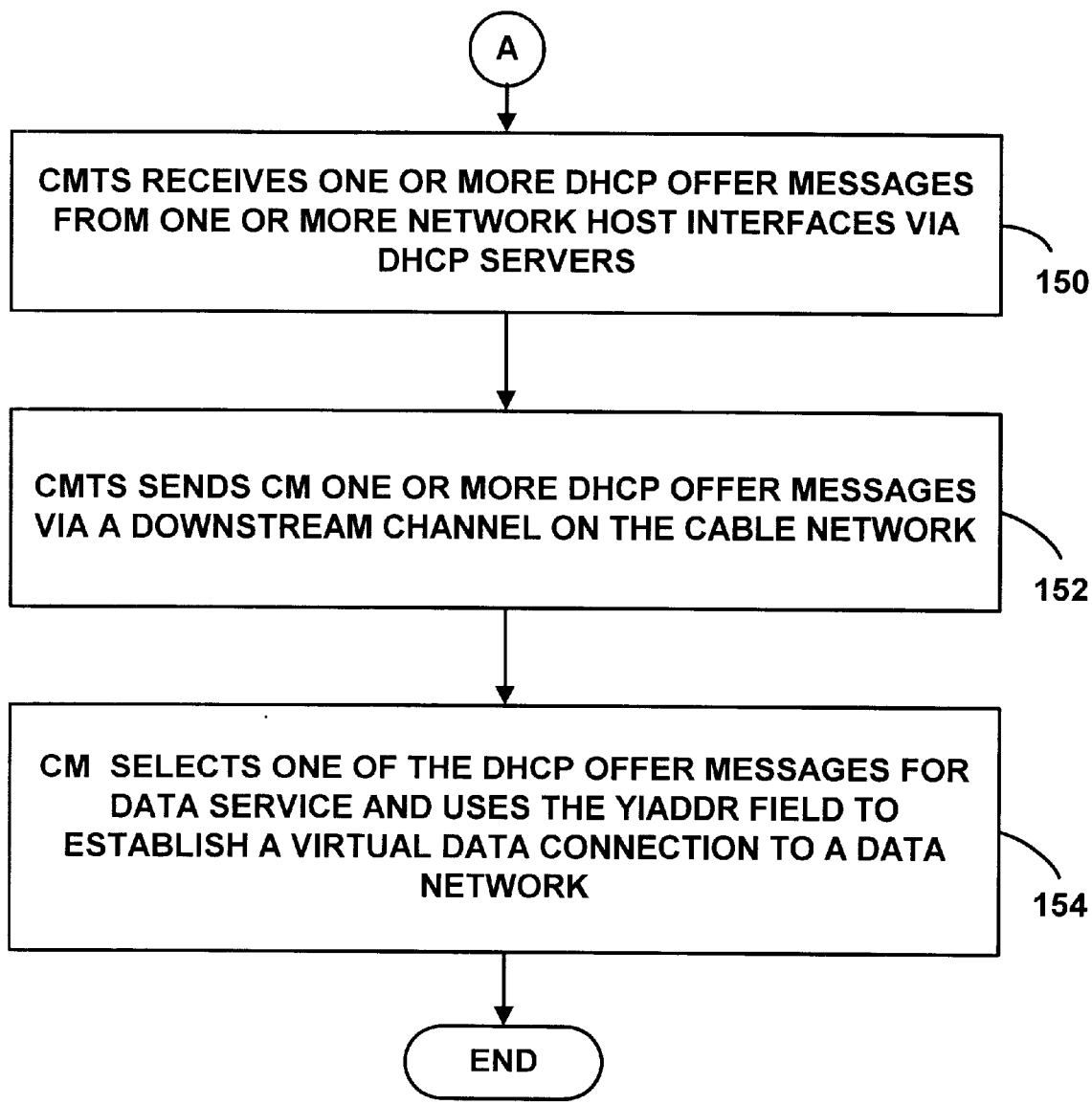

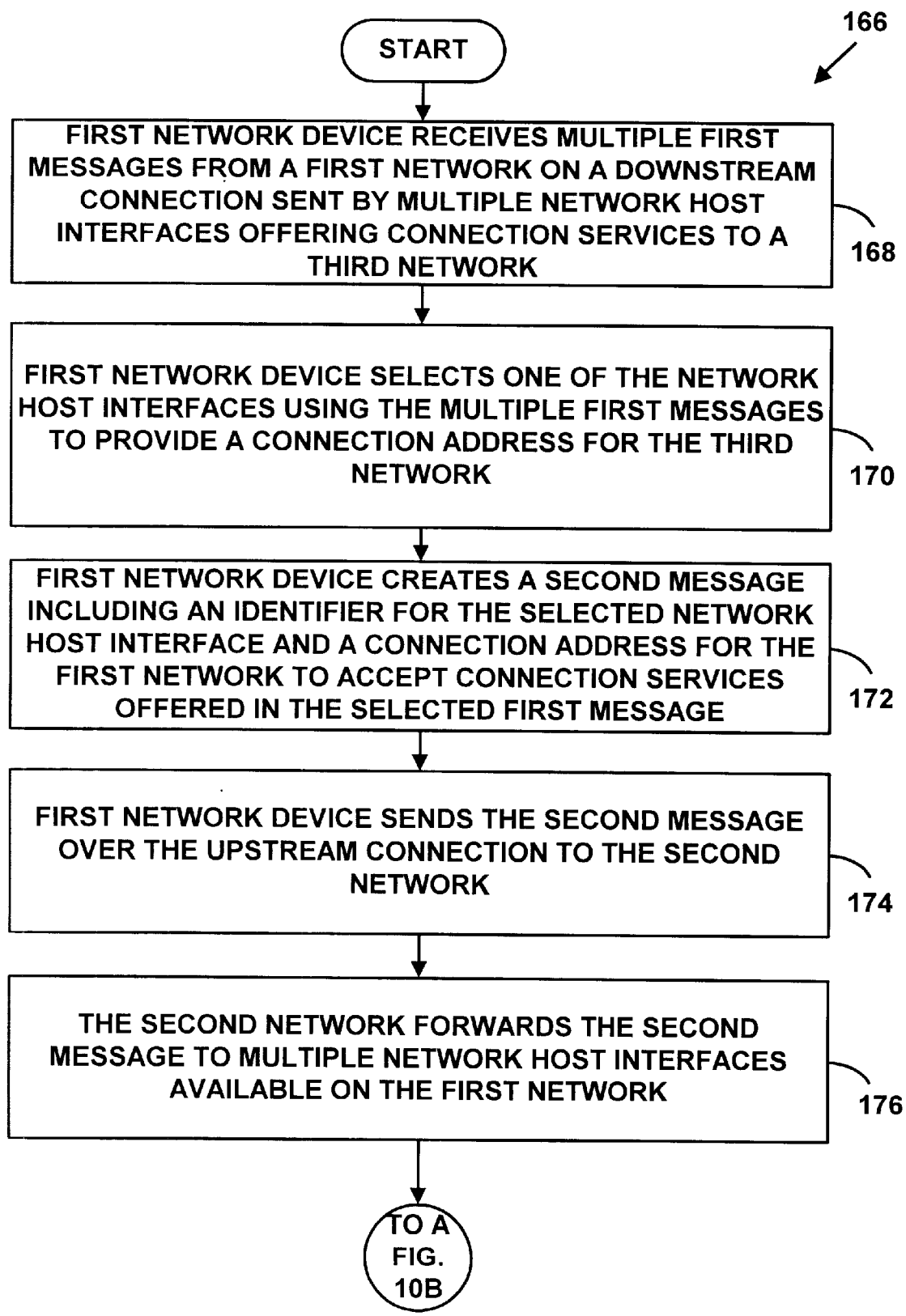

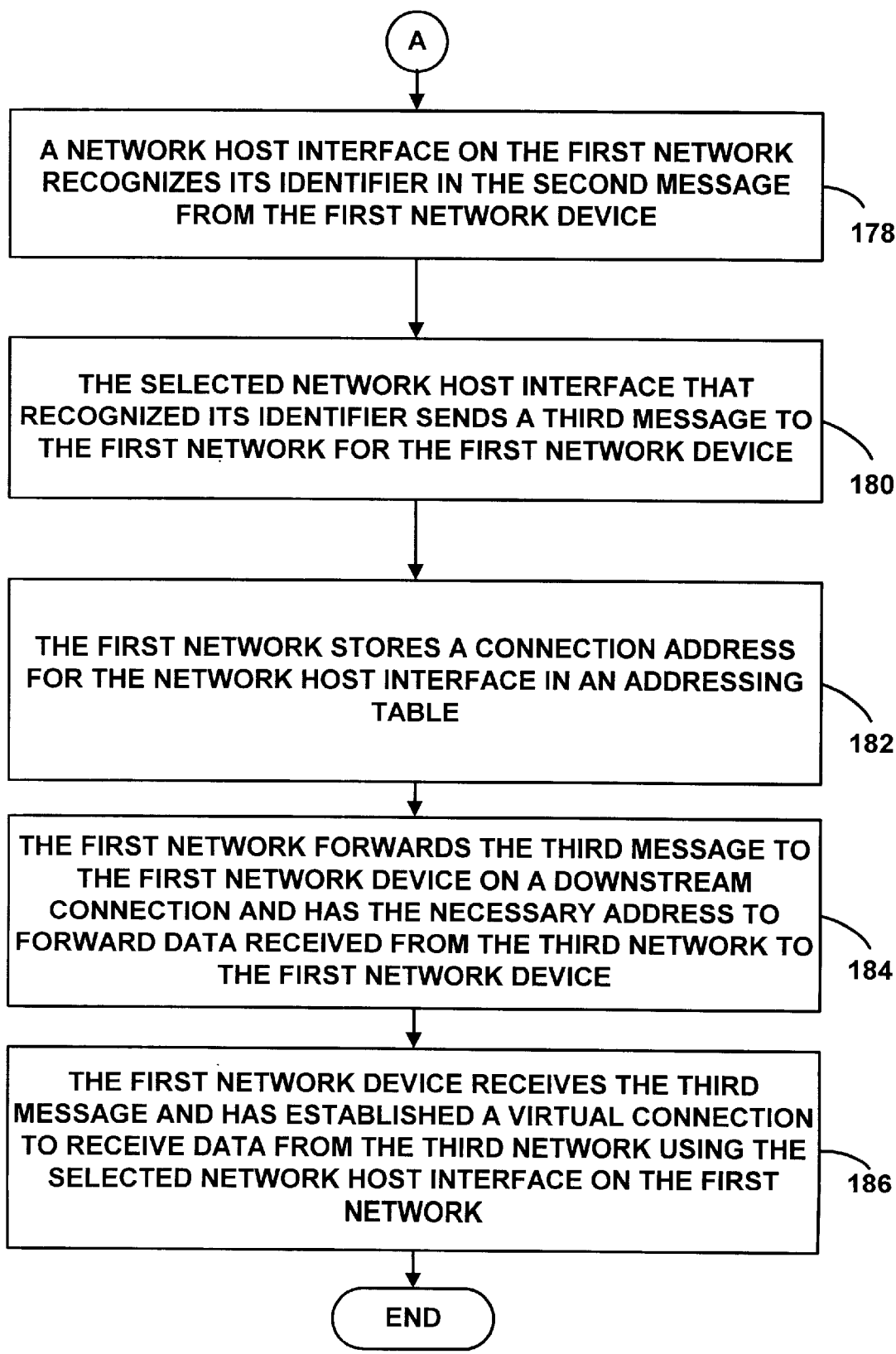

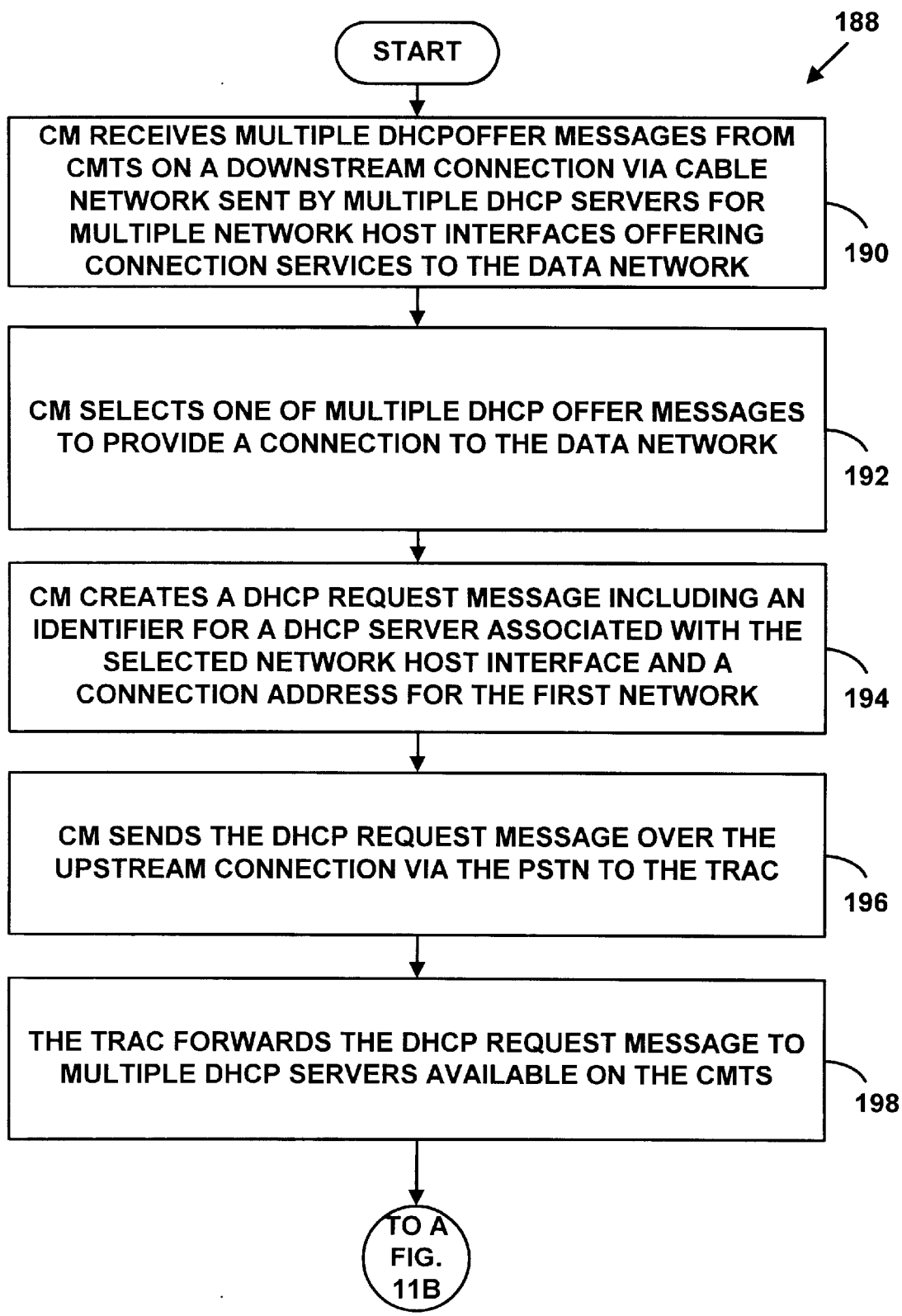

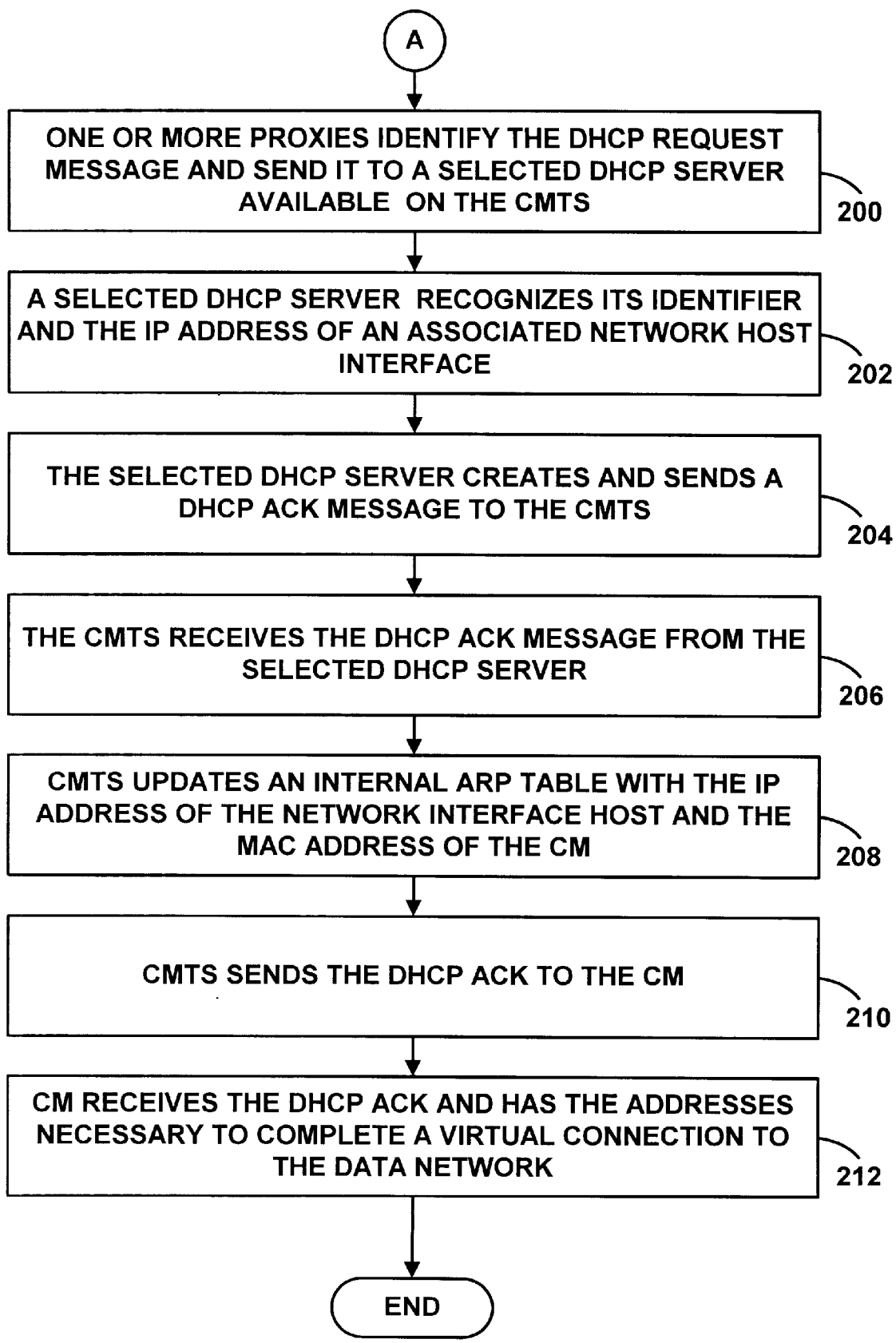

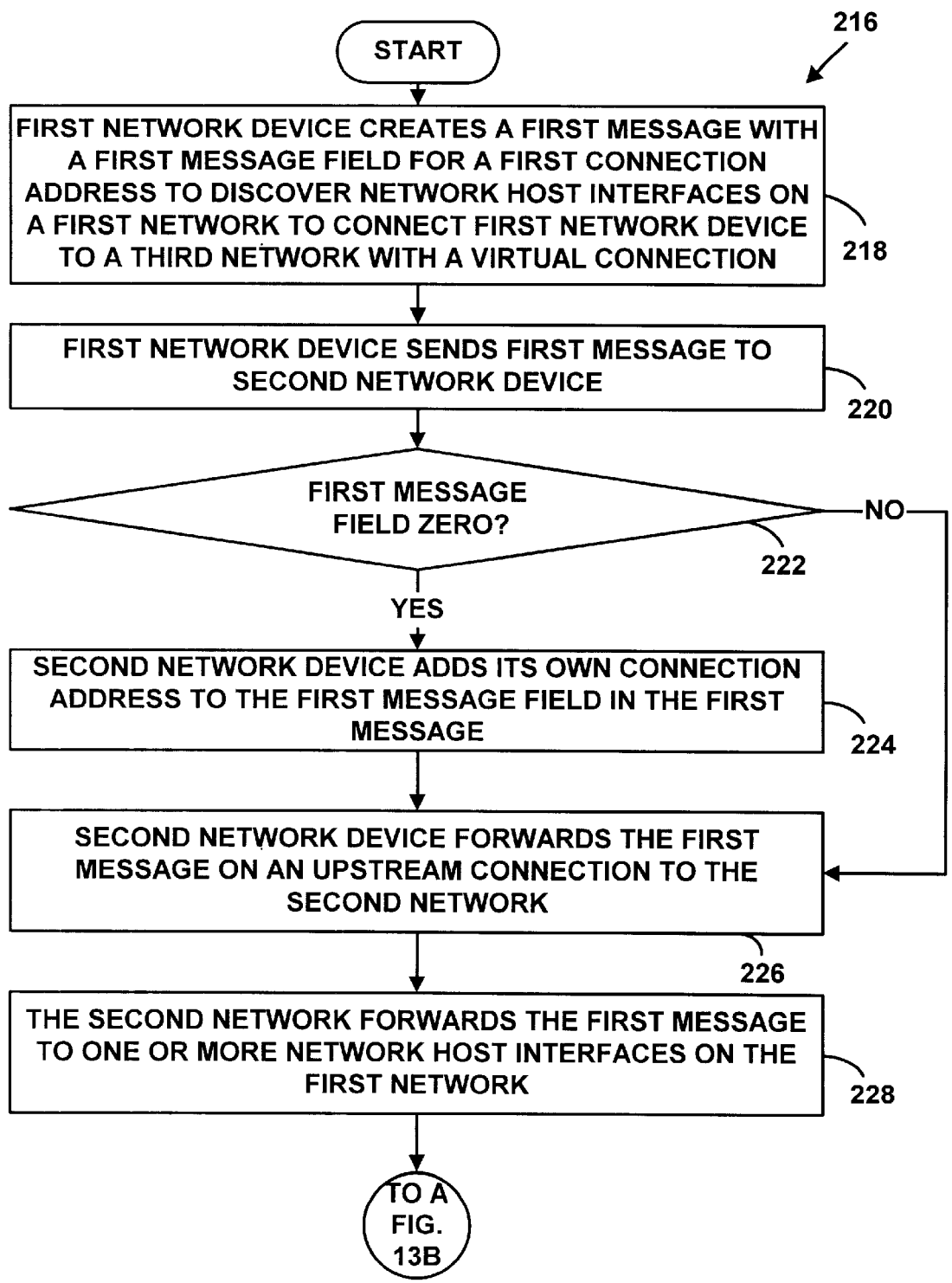

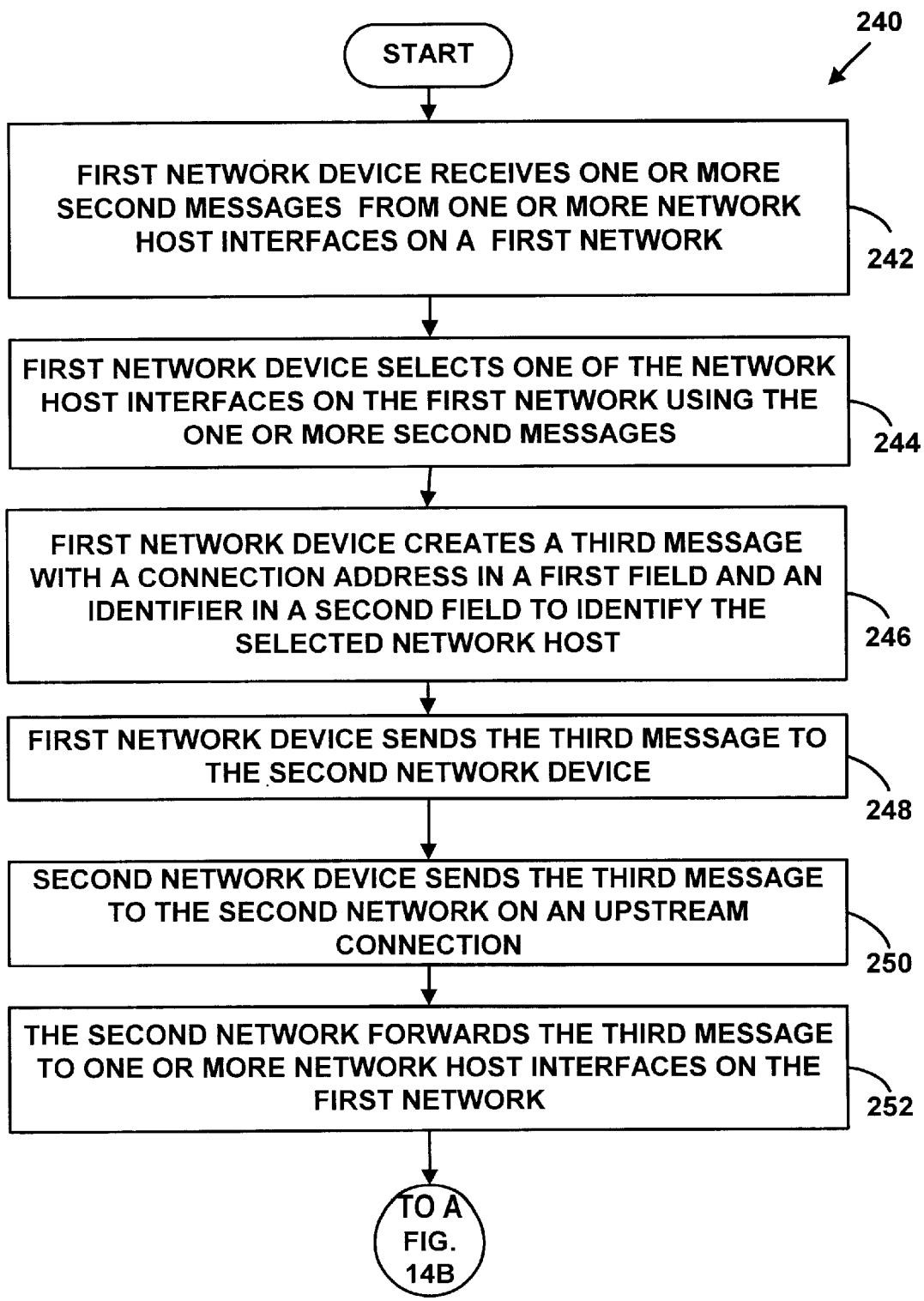

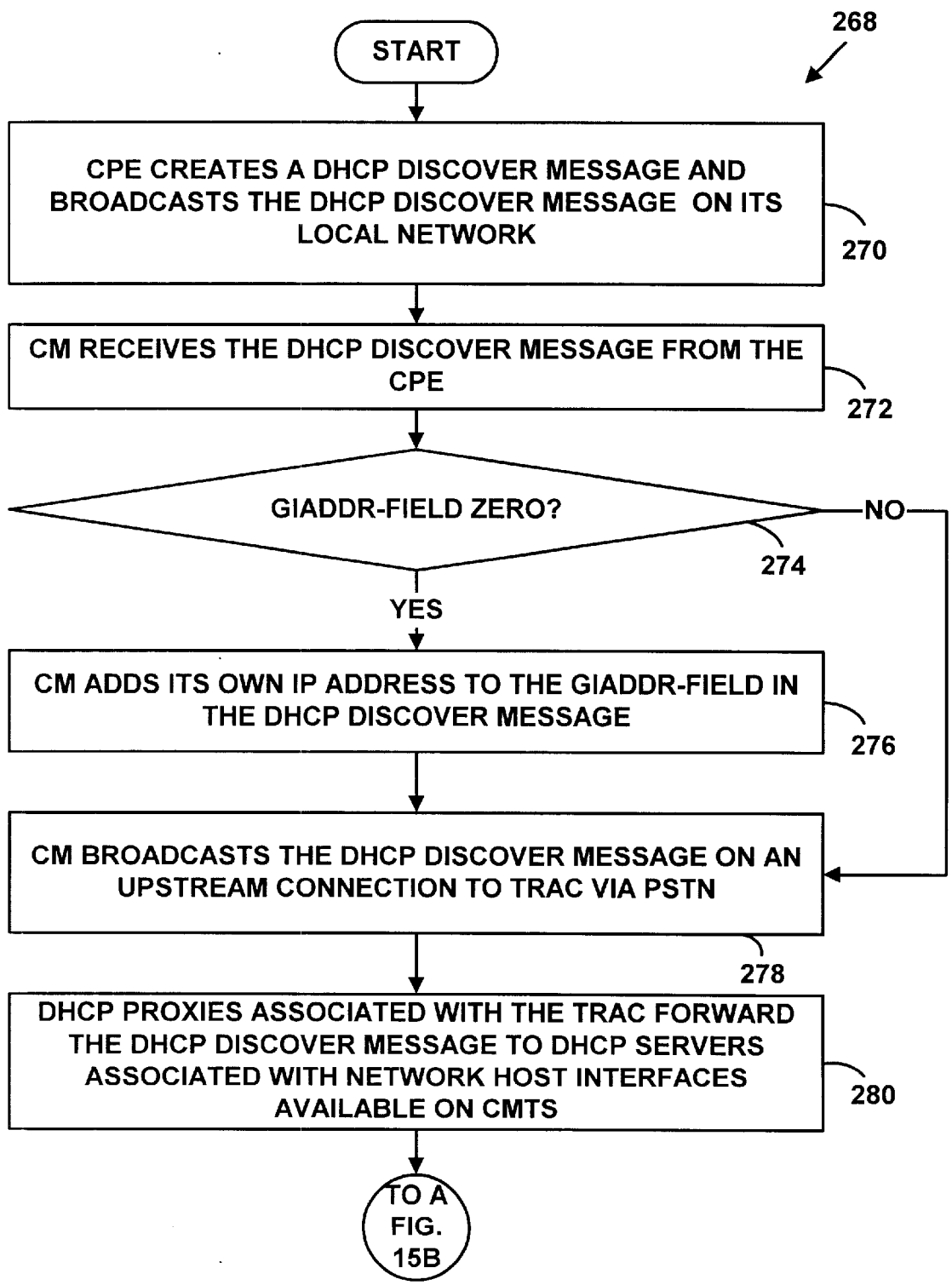

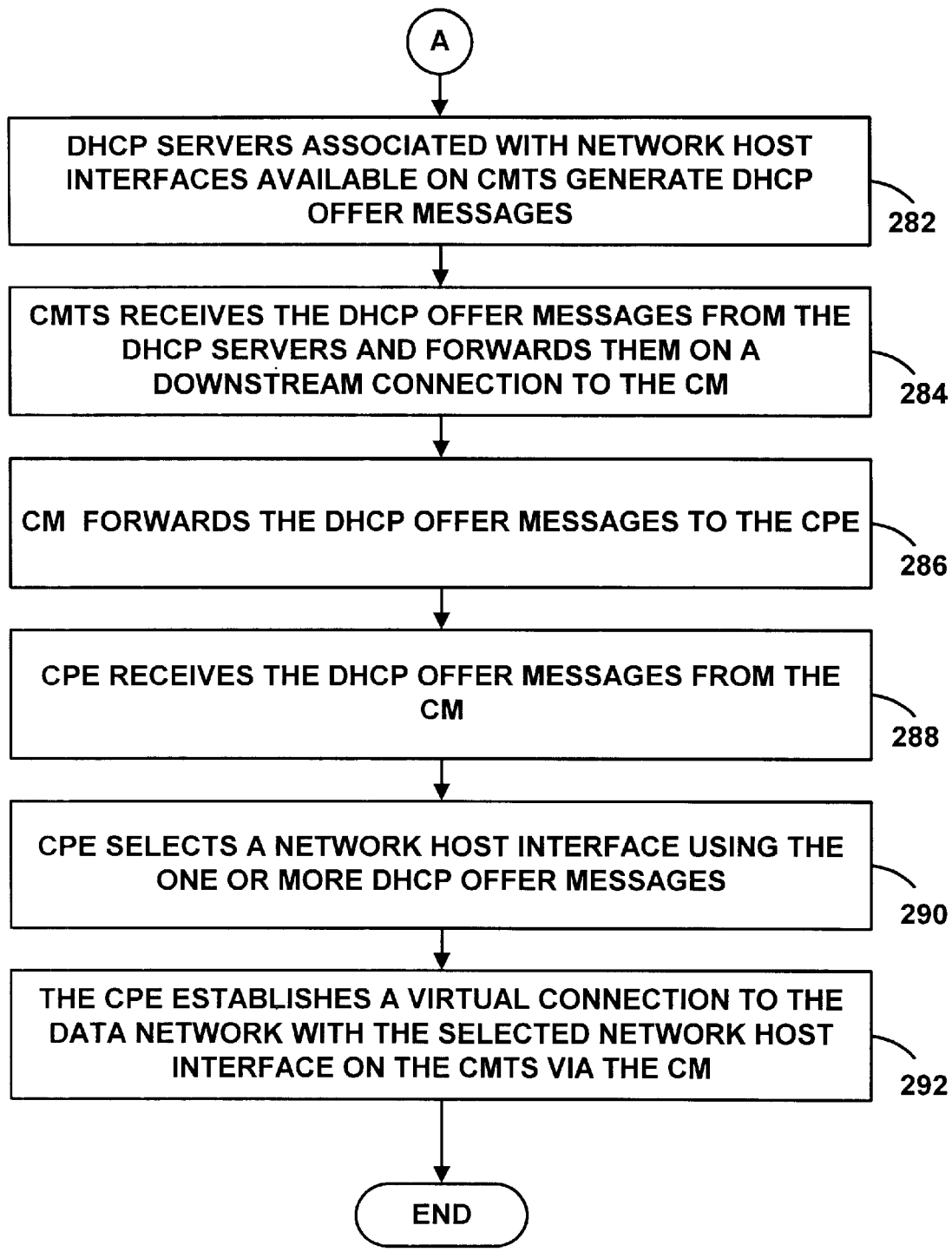

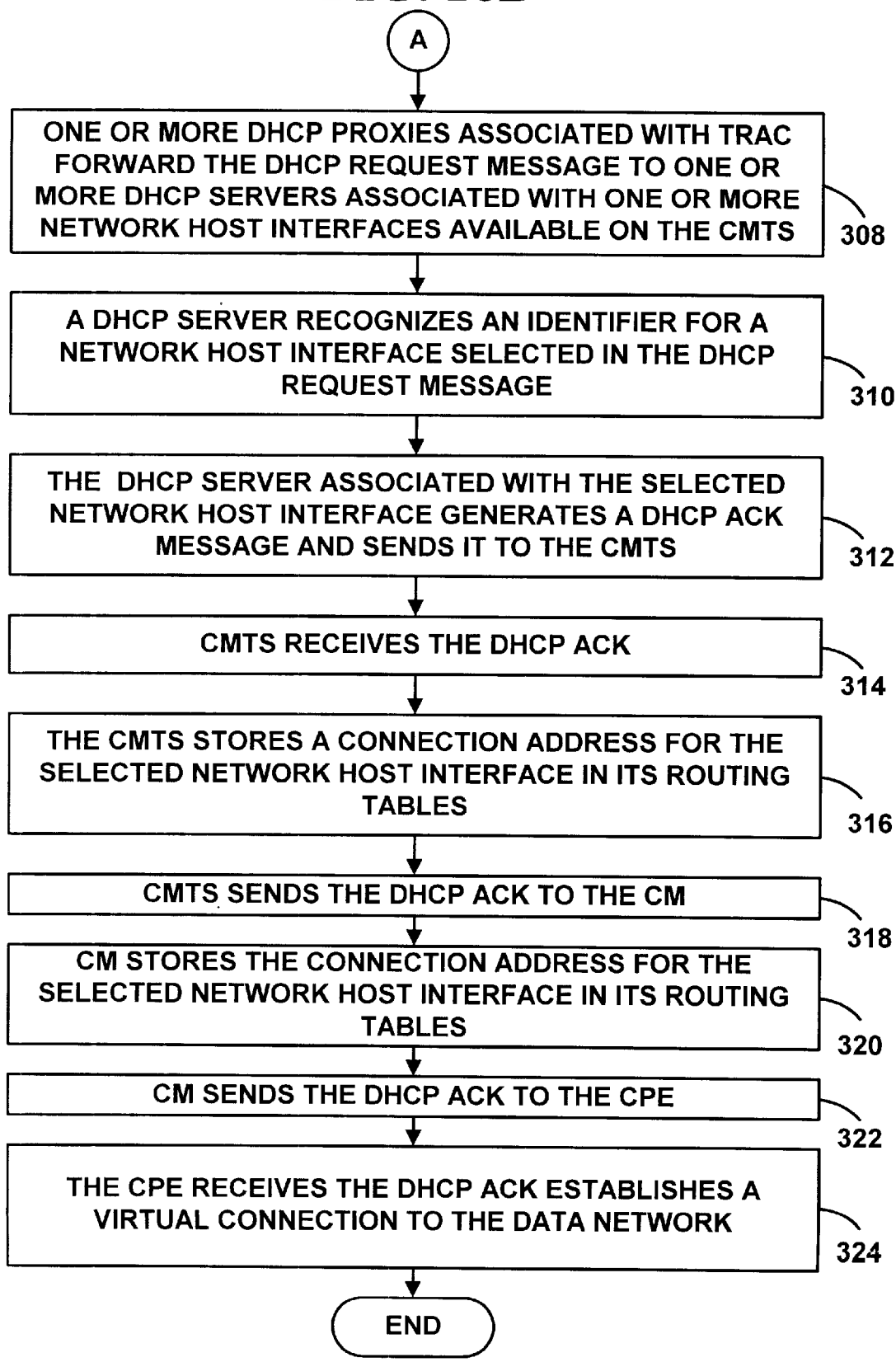

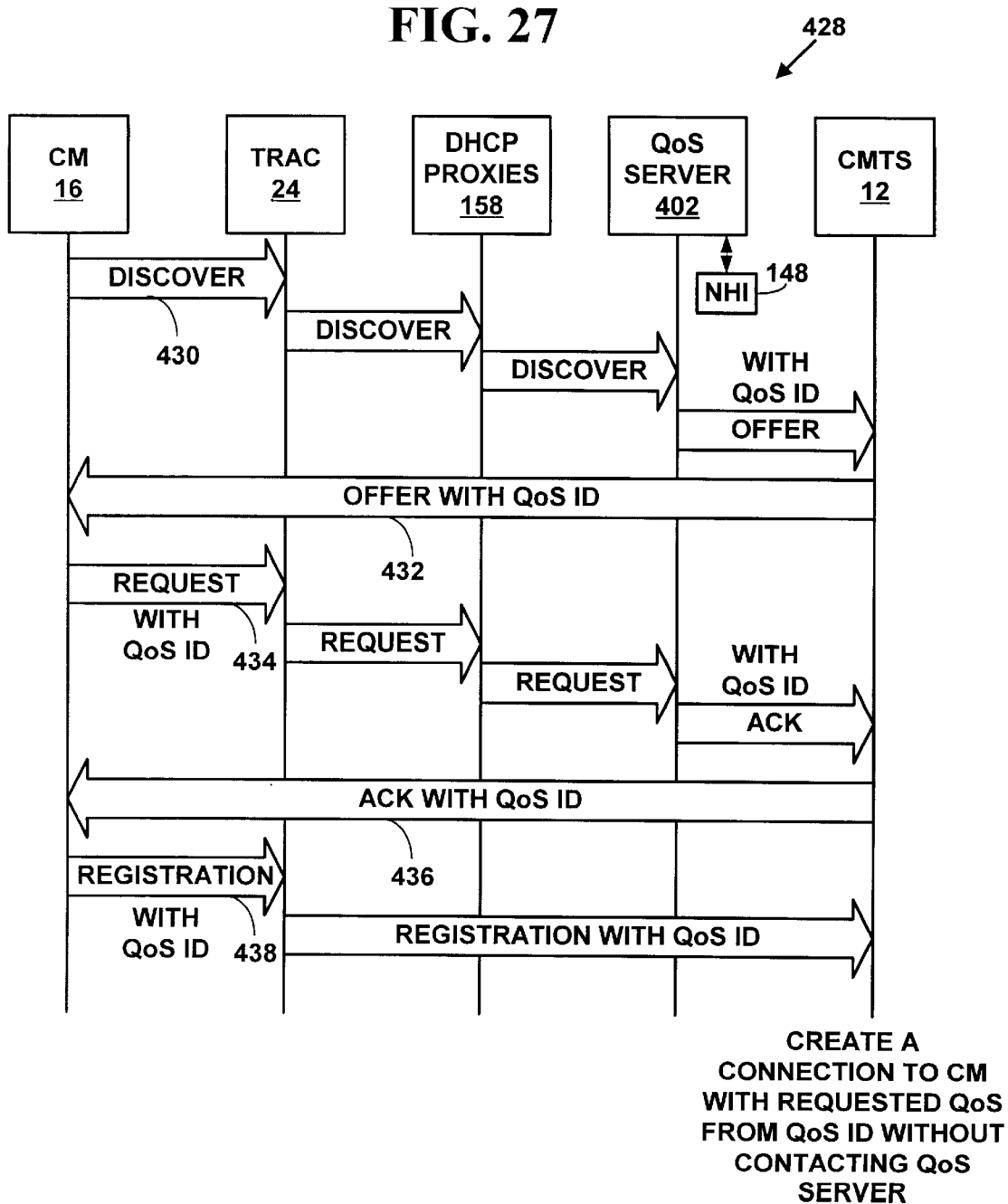

METHOD AND SYSTEM FOR PROVIDING QUALITY-OF-SERVICE IN A DATA-OVER-CABLE SYSTEM USING CONFIGURATION PROTOCOL MESSAGING

FIELD OF INVENTION

The present invention relates to communications in computer networks. More specifically, it relates to a method and system for providing quality-of-service to a cable modem in a data-over-cable system.

BACKGROUND OF THE INVENTION

Cable television networks such as those provided by Comcast Cable Communications, Inc., of Philadelphia, Pa., Cox Communications of Atlanta Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+ Mbps which is a much larger data rate than can be supported by a modem used over a serial telephone line.

However, most cable television networks provide only uni-directional cable systems, supporting only a "downstream" data path. A downstream data path is the flow of data from a cable system "headend" to a customer. A cable system headend is a central location in the cable television network that is responsible for sending cable signals in the downstream direction. A return data path via a telephone network, such as a public switched telephone network provided by AT&T and others, (i.e., a "telephony return") is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

When a cable modem used in the data-over-cable system with telephony return is initialized, a connection is made to both the cable modem termination system via the cable network and to the telephony remote access concentrator via the public switched telephone network. As a cable modem is initialized, it will initialize one or more downstream channels (i.e., downstream connections) to the cable modem termination system via the cable network or the telephony remote access concentrator via the public switched telephone network.

As a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message.

Configuration information forwarded to a cable modem termination system from a cable modem includes Class-of-Service ("CoS") and Quality-of-Service ("QoS") and other parameters.

As is known in the art, class-of-service provides a reliable (e.g., error free, in sequence, with no loss of duplication) transport facility independent of the quality-of-service. Class-of-service parameters include maximum downstream data rates, maximum upstream data rates, upstream channel priority, guaranteed minimum data rates, guaranteed maximum data rate and other parameters. Quality-of-service collectively specifies the performance of a network service that a device expects on a network. Quality-of-service parameters include transit delay expected to deliver data to a specific destination, the level of protection from unauthorized monitoring or modification of data, cost for delivery of data, expected residual error probability, the relative priority associated with the data and other parameters.

A cable modem termination system is responsible for providing class-of-service and quality-of-service connections to a cable modem. However, there are several problems associated with using a cable modem termination system to provide class-of-service and quality-of-service connections to a cable modem. The cable modem termination system is responsible for handling and balancing class-of-service and quality-of-service requests for tens of thousands of cable modems. The handling and balancing class-of-service and quality-of-service includes allocating bandwidth for guaranteed transmission rates requested by the cable modems. The handling and balancing requires significant computational and computer resources on the cable modem termination system. The cable modem termination system uses complex software that is not easily adaptable to new or additional class-of-service or quality-of-service parameters. In addition, multiple cable modem termination systems in a data-over-cable systems do not handle or balance class-of-service or quality-of-service parameters in a standard way. Thus, it is desirable to provide a standard, efficient and cost effective way to provide class-of-service and quality-of-service to cable modems in a data-over-cable system.

Co-pending application Ser. No. 09/079323 assigned to the same assignee as the present application describes a Quality-of-Service server to handle quality-of-service requests with class-of-service, quality-of-service and other parameters in a standard, efficient and cost effective manner.

Many different messaging protocols can be used with a quality-of-service server for servicing class-of-service and quality-of-service connection requests. Most data-over-cable systems in the prior art use a Dynamic Host Configuration Protocol ("DHCP") as a standard messaging protocol to allocate network addresses such as Internet Protocol ("IP") addresses. As is known in the art, DHCP is a protocol for passing configuration information to hosts on a network. IP is an addressing protocol designed to route traffic within a network or between networks. It is desirable to also use a standard messaging protocol such as DHCP for requesting and allocating static and dynamic bandwidth with various quality-of-service settings for quality-of-service servers used in data-over-cable systems. A standard messaging protocol such as DHCP for quality-of-service transactions would help ensure that any cable modem on any data-over-cable system can make a quality-of-service or class-of-service request in a standard, efficient and cost effective manner.

SUMMARY OF THE INVENTION

In accordance with a preferred embodiment of the present invention, the problems associated with providing a standard messaging protocol for use with quality-of-service servers are overcome. A method and system for requesting a quality-of-service connections with various quality-of-service settings from a quality-of-service server is provided. The quality-of-service settings include class-of-service, quality-of-service and other parameters. The method includes sending a first message with a first protocol from a first network device to a second network device. The first message includes a request to determine if the first network device has enough available bandwidth to create a connection to a third network device with a specific quality-of-service requested by the third network device. A second message is received with the first protocol from the second network device in response to the first message. The second message is an offer to reserve bandwidth on the first network device for the specific quality-of-service requested by the third network device. The second message includes a quality-of-service identifier for the specific quality-of-service requested in an existing message field for the first protocol. A third message is sent with the first protocol from the first network device to the second network device with the quality-of-service identifier in an existing message field for the first protocol requesting the second network device reserve bandwidth on the first network device for the specific quality-of-service requested by the third network device. A fourth message is received with the first protocol from the second network device on the first network device with the quality-of-service identifier in an existing message field for the first protocol acknowledging bandwidth for the specific quality-of-service requested by the third network device has been reserved on the second network device. The first network device creates a connection to the third network device based on the quality-of-service identifier.

In a preferred embodiment of the present invention, the first network device is a cable modem termination system, the second network device is a quality-of-service server and the third network device is a cable modem. The first protocol is DHCP. The first message is a DHCP discover message, the second message is a DHCP offer message, the third message is a DHCP request message and the fourth message is a DHCP acknowledgment message. The quality-of-service identifier is sent in an existing DHCP message gateway-Internet-address field with an Internet Protocol address. However, the present invention is not limited to the network devices, protocol, or protocol messages described, and other network devices, protocols and protocol messages could also be used.

The system includes a quality-of-service server, for determining whether a first network device has enough available bandwidth to establish a connection to a second network device with a specific quality-of-service requested by the second network device. The quality-of-service server provides support for class-of-service, quality-of-service and other parameters with DHCP messaging. The system also includes multiple quality-of-service identifiers, for identifying a transmission bandwidth required for a specific quality-of-service requested by a second network device, wherein a value for a quality-of-service identifier is determined by the quality-of-service bandwidth requested by class-of-service, quality-of-service and other parameters. The quality-of-service identifiers are sent and received in an existing DHCP message field.

In a preferred embodiment of the present invention, the first network device of the system is a cable modem termination system and the second network device of the system is a cable modem. However, the present invention is not limited to these network devices and other network devices could also be used.

A preferred embodiment of the present invention offers several advantages over the prior art. Class-of-service and quality-of-service are handled and balanced in a data-over-cable system by a quality-of-service server using standard configuration protocol messaging. This relieves the computational burden from a cable modem termination system and helps reduce or eliminate the need for complex class-of-service and quality-of-service software. Quality-of-service server provides a standardized way of handling Class-of-service and quality-of-service requests for one or more cable modem termination system and is easily adaptable for new class-of-service or quality-of-service parameters.

The foregoing and other features and advantages of a preferred embodiment of the present invention will be more readily apparent from the following detailed description, which proceeds with references to the accompanying drawings.

BRIEF DESCRIPTION OF THE DRAWINGS

FIG. 3 is a block diagram illustrating a Telephony Channel Descriptor message structure;

FIG. 4 is a block diagram illustrating a Termination System Information message structure;

FIG. 5 is a flow diagram illustrating a method for addressing hosts in a cable modem system;

FIG. 6 is a block diagram illustrating a Dynamic Host Configuration Protocol message structure;

FIGS. 7A and 7B are a flow diagram illustrating a method for discovering hosts in a cable modem system;

FIGS. 10A and 10B are a flow diagram illustrating a method for resolving host addresses in a data-over-cable system;

FIG. 11 is a block diagram illustrating a method for resolving discovered host addresses.

FIGS 13A and 13B are a flow diagram illustrating a method for obtaining addresses for customer premise equipment;

FIGS. 14A and 14B are a flow diagram illustrating a method for resolving addresses for customer premise equipment;

FIGS. 15A and 15B are a flow diagram illustrating a method for addressing network host interfaces from customer premise equipment;

FIGS. 16A and 16B are a flow diagram illustrating a method for resolving network host interfaces from customer premise equipment;

FIG. 27 is a block diagram illustrating a message flow for quality-of-service requests from a cable modem.

DETAILED DESCRIPTION OF A PREFERRED EMBODIMENT

Cable Modem System with Telephony Return

Figure 1:
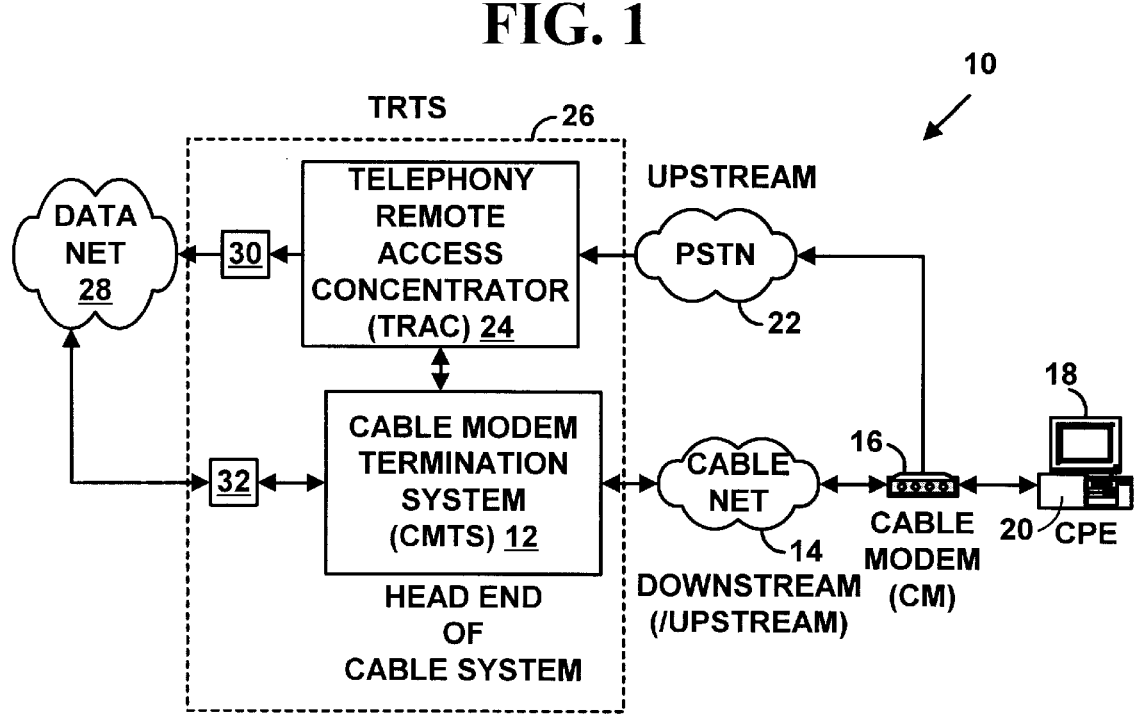
FIG. 1 is a block diagram illustrating a cable modem system with telephony return.

FIG. 1 is a block diagram illustrating a data-over-cable system with telephony return 10, hereinafter data-over-cable system 10. Most cable providers known in the art predominately provide unidirectional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in unidirectional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1 and the present invention is not limited to a data-over-cable system with telephony return. In a data-over cable system without telephony return, customer premise equipment or cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. Cable network 14 is connected to a Cable Modem ("CM") 16 with a downstream cable connection. CM 16 is any cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others. FIG. 1 illustrates one CM 16. However, in a typical data-over-cable system, tens or hundreds of thousands of CM 16 are connected to CMTS 12.

CM 16 is connected to Customer Premise Equipment ("CPE") 18 such as a personal computer system via a Cable Modem-to-CPE Interface ("CMCI") 20. CM 16 is connected to a Public Switched Telephone Network ("PSTN") 22 with an upstream telephony connection. PSTN 22 includes those public switched telephone networks provided by AT&T, Regional Bell Operating Companies (e.g., Ameritch, U.S. West, Bell Atlantic, Southern Bell Communications, Bell South, NYNEX, and Pacific Telesis Group), GTE, and others. The upstream telephony connection is any of a standard telephone line connection, Integrated Services Digital Network ("ISDN") connection, Asymmetric Digital Subscriber Line ("ADSL") connection, or other telephony connection. PSTN 22 is connected to a Telephony Remote Access Concentrator ("TRAC") 24. In a data-over cable system without telephony return, CM 16 has an upstream connection to CMTS 12 via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to CM 16. In another embodiment of the present invention, the telephony modem is a separate modem unit external to CM 16 used specifically for connecting with PSTN 22. A separate telephony modem includes a connection to CM 16 for exchanging data. CM 16 includes cable modems provided by the 3Com Corporation of Santa Clara, Calif., U.S. Robotics Corporation of Skokie, Ill., and others. In yet another embodiment of the present invention, CM 16 includes functionality to connect only to cable network 14 and receives downstream signals from cable network 14 and sends lo upstream signals to cable network 14 without telephony return. The present invention is not limited to cable modems used with telephony return.

CMTS 12 and TRAC 24 may be at a "headend" of cable system 10, or TRAC 24 may be located elsewhere and have routing associations to CMTS 12. CMTS 12 and TRAC 24 together are called a "Telephony Return Termination System" ("TRTS") 26. TRTS 26 is illustrated by a dashed box in FIG. 1. CMTS 12 and TRAC 24 make up TRTS 26 whether or not they are located at the headend of cable network 14, and TRAC 24 may in located in a different geographic location from CMTS 12. Content severs, operations servers, administrative servers and maintenance servers used in data-over-cable system 10 (not shown in FIG. 1) may also be in different locations. Access points to data-over-cable system 10 are connected to one or more CMTS's 12 or cable headend access points. Such configurations may be "one-to-one", "one-to-many," or "many-to-many;" and may be interconnected to other Local Area Networks ("LANs") or Wide Area Networks ("WANs").

TRAC 24 is connected to a data network 28 (e.g., the Internet or an intranet) by a TRAC-Network System Interface 30 ("TRAC-NSI"). CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used.

Cable Modem Protocol Stack

Figure 2:
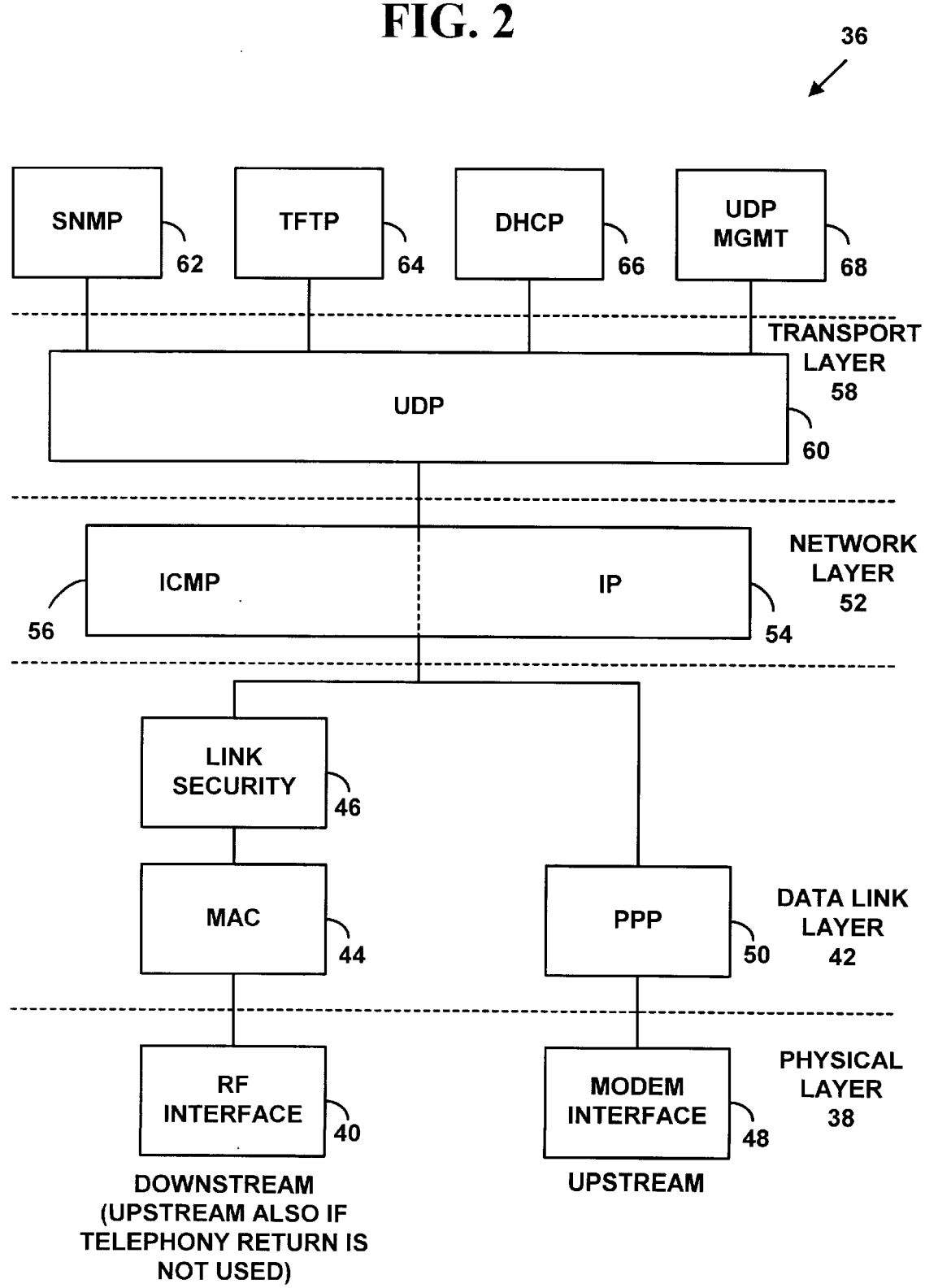
FIG. 2 is a block diagram illustrating a protocol stack for a cable modem.

FIG. 2 is a block diagram illustrating a protocol stack 36 for CM 16. FIG. 2 illustrates the downstream and upstream protocols used in CM 16. As is known in the art, the Open System Interconnection ("OSI") model is used to describe computer networks. The OSI model consists of seven layers including from lowest-to-highest, a physical, data-link, network, transport, session, presentation and application layer. The physical layer transmits bits over a communication link. The data link layer transmits error free frames of data. The network layer transmits and routes data packets.

For downstream data transmission, CM 16 is connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. RF interface 40 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in RF interface 40. However, other operating frequencies modulation methods could also be used. For more information on RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 40 could also be used and the present invention is not limited to IEEE 802.14 (e.g., RF interfaces from Multimedia Cable Network Systems ("MCNS") and others could also be used).

Above RF interface 40 in a data-link layer 42 is a Medium Access Control ("MAC") layer 44. As is known in the art, MAC layer 44 controls access to a transmission medium via physical layer 38. For more information on MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above MAC layer 44 is an optional link security protocol stack 46. Link security protocol stack 46 prevents authorized users from making a data connection from cable network 14. RF interface 40 and MAC layer 44 can also be used for an upstream connection if data-over-cable system 10 is used without telephony return.

For upstream data transmission with telephony return, CM 16 is connected to PSTN 22 in physical layer 38 via modem interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as modem interface 48. As is known in the art, ITU-T V.34 is commonly used in the data link layer for modem communications and currently allows data rates as high as 33,600 bits-per-second ("bps"). For more information see the ITU-T V.34 standard. However, other modem interfaces or other telephony interfaces could also be used.

Above modem interface 48 in data link layer 42 is Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference. Information for IETF RFCs can be found on the World Wide Web at URLs "ds.internic.net" or "www.ietf org."Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see RFC-791 incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP 54 is an unacknowledged protocol, datagrams may be discarded and ICMP 56 is used for error reporting. For more information on ICMP 56 see RFC-792 incorporated herein by reference.

Above IP 54 and ICMP 56 is a transport layer 58 with User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see RFC-768 incorporated herein by reference.

Above the network layer are a Simple Network Management Protocol ("SNMP") layer 62, Trivial File Protocol ("TFTP") layer 64, Dynamic Host Configuration Protocol ("DHCP") layer 66 and a UDP manager 68. SNMP layer 62 is used to support network management functions. For more information on SNMP layer 62 see RFC-1157 incorporated herein by reference. TFTP layer 64 is a file transfer protocol used to download files and configuration information. For more information on TFTP layer 64 see RFC-1350 incorporated herein by reference. DHCP layer 66 is a protocol for passing configuration information to hosts on an IP 54 network. For more information on DHCP layer 66 see RFC-1541 and RFC-2131 incorporated herein by reference. UDP manager 68 distinguishes and routes packets to an appropriate service (e.g., a virtual tunnel). More or few protocol layers could also be used with data-over-cable system 10.

CM 16 supports transmission and reception of IP 54 datagrams as specified by RFC-791. CMTS 12 and TRAC 24 may perform filtering of IP 54 datagrams. CM 16 is configurable for IP 54 datagram filtering to restrict CM 16 and CPE 18 to the use of only their assigned IP 54 addresses. CM 16 is configurable for IP 54 datagram UDP 60 port filtering (i.e., deep filtering).

CM 16 forwards IP 54 datagrams destined to an IP 54 unicast address across cable network 14 or PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between TRAC 24 and CMTS 12 which preclude filtering, or various forms of virtual tunneling and reverse virtual tunneling could be used to virtually source upstream packets from CM 16. For more information on virtual tunneling see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

CM 16 also forwards IP 54 datagrams destined to an IP 54 multicast address across cable network 14 or PSTN 22. CM 16 is configurable to keep IP 54 multicast routing tables and to use group membership protocols. CM 16 is also capable of IP 54 tunneling upstream through the telephony path. A CM 16 that wants to send a multicast packet across a virtual tunnel will prepend another IP 54 header, set the destination address in the new header to be the unicast address of CMTS 12 at the other end of the tunnel, and set the IP 54 protocol field to be four, which means the next protocol is IP 54.

CMTS 12 at the other end of the virtual tunnel receives the packet, strips off the encapsulating IP 54 header, and forwards the packet as appropriate. A broadcast IP 54 capability is dependent upon the configuration of the direct linkage, if any, between TRAC 24 and CMTS 12. CMTS 12, CM 16, and TRAC 24 are capable of routing IP 54 datagrams destined to an IP 54 broadcast address which is across cable network 14 or PSTN 22 if so configured. CM 16 is configurable for IP 54 broadcast datagram filtering.

An operating environment for the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a Cable Modem with Telephony Return

When CM 16 is initially powered on, if telephony return is being used, CM 16 will receive a Telephony Channel Descriptor ("TCD") from CMTS 12 that is used to provide dialing and access instructions on downstream channels via cable network 14. Information in the TCD is used by CM 16 to connect to TRAC 24. The TCD is transmitted as a MAC management message with a management type value of TRI_TCD at a periodic interval (e.g., every 2 seconds). To provide for flexibility, the TCD message parameters are encoded in a Type/Length/Value ("TLV") form. However, other encoding techniques could also be used.

FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by CM 16 to initiate a telephone call. SPD 74 is a TLV-encoded data structure that contains sets of dialing and access parameters for CM 16 with telephony return. SPD 74 is contained within TCD message 70. There may be multiple SPD 74 encodings within a single TCD message 70. There is at least one SPD 74 in TCD message 70. SPD 74 parameters are encoded as SPD-TLV tuples. SPD 74 contains the parameters shown in Table 1 and may contain optional vendor specific parameters. However, more or fewer parameters could also be used in SPD 74.

TABLE 1

| SPD 74 Parameter | Description |
| --- | --- |
| Factory Default Flag | Boolean value, if TRUE(1), indicates a SPD which should be used by CM 16. |
| Service Provider Name | This parameter includes the name of a service provider. Format is standard ASCII string composed of numbers and letters. |
| Telephone Numbers | These parameters contain telephone numbers that CM 16 uses to initiate a telephony modem link during a login process. Connections are attempted in ascending numeric order (i.e., Phone Number 1, Phone Number 2 . . .). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |

TABLE 1-continued

| SPD 74 Parameter | Description |
| --- | --- |
| Connection Threshold | The number of sequential connection failures before indicating connection failure. A dial attempt that does not result an answer and connection after no more than ten rings is considered a failure. The default value is one. |
| Login User Name | This contains a user name CM 16 will use an authentication protocol over the telephone link during the initialization procedure. Format is a monolithic sequence of alphanumeric characters in an ASCII string composed of numbers and letters. |
| Login Password | This contains a password that CM 16 will use during authentication over a telephone link during the initialization procedure. Format is a monolithic sequence of alphanumeric characters in an ASCII string composed of numbers and Ietters. |
| DHCP Authenticate | Boolean value, reserved to indicate that CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP Server | IP 54 address value of a DHCP 66 Server CM 16 uses for DHCP 66 Client and BOOTP Relay Process. If this attribute is present and DHCP 66 Authenticate attribute is TRUE(1). The default value is integer zero. |
| RADIUS Realm | The realm name is a string that defines a RADIUS server domain. Format is a monolithic sequence of alphanumeric characters in an ACSII string composed of numbers and letters. |
| PPP Authentication | This parameter instructs the telephone modem which authentication procedure to perform over the telephone link. |
| Demand Dial Timer | This parameter indicates time (in seconds) of inactive networking time that will be allowed to elapse before hanging telephone connection at CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by CMTS 12 at periodic intervals (e.g., every 2 seconds) to report CMTS 12 information to CM 16 whether or not telephony return is used. The TSI message is transmitted as a MAC 44 management message. The TSI provides a CMTS 12 boot record in a downstream channel to CM 16 via cable network 14. Information in the TSI is used by CM 16 to obtain information about the status of CMTS 12. The TSI message has a MAC 44 management type value of TRI_TSI.

FIG. 4 is a block diagram of a TSI message structure 76. TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, more or fewer fields could also be used in TSI message 76.

TABLE 2

| TSI 76 Parameter | Description |
| --- | --- |
| Downstream Channel IP Address 80 | This field contains an IP 54 address of CMTS 12 available on the downstream channel this message arrived on. |
| Registration IP Address 82 | This field contains an IP 54 address CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time CMTS 12 is either re-initialized or performs address or routing table flush. |
| Vendor Specific Extensions 90 | Optional vendor extensions may be added as TLV encoded data. |

After receiving TCD 70 message and TSI message 76, CM 16 continues to establish access to data network 28 (and resources on the network) by first dialing into TRAC 24 and establishing a telephony PPP 50 session. Upon the completion of a successful PPP 50 connection, CM 16 performs PPP Link Control Protocol ("LCP") negotiation with TRAC 24. Once LCP negotiation is complete, CM 16 requests Internet Protocol Control Protocol ("IPCP") address negotiation. For more information on IPCP see RFC-1332 incorporated herein by reference. During IPCP negotiation, CM 16 negotiates an IP 54 address with TRAC 24 for sending IP 54 data packet responses back to data network 28 via TRAC 24.

When CM 16 has established an IP 54 link to TRAC 24, it begins "upstream" communications to CMTS 12 via DHCP layer 66 to complete a virtual data connection by attempting to discover network host interfaces available on CMTS 12 (e.g., IP 54 host interfaces for a virtual IP 54 connection). The virtual data connection allows CM 16 to receive data from data network 28 via CMTS 12 and cable network 14, and send return data to data network 28 via TRAC 24 and PSTN 22. CM 16 obtains an address from a host interface (e.g., an IP 54 interface) available on CMTS 12 that can be used by data network 28 to send data to CM 16. However, CM 16 has only a downstream connection from CMTS 12 and has to obtain a connection address to data network 28 using an upstream connection to TRAC 24.

Addressing Network Host Interfaces in the Data-over-cable System via the Cable Modem FIG. 5 is a flow diagram illustrating a method 92 for addressing network host interfaces in a data-over-cable system with telephony return via a cable modem. Method 92 allows a cable modem to establish a virtual data connection to a data network. In method 92, multiple network devices are connected to a first network with a downstream connection of a first connection type, and connected to a second network with an upstream connection of a second connection type. The first and second networks are connected to a third network with a third connection type.

At step 94, a selection input is received on a first network device from the first network over the downstream connection. The selection input includes a first connection address wallowing the first network device to communicate with the first network via upstream connection to the second network. At step 96, a first message of a first type for a first protocol is created on the first network device having the first connection address from the selection input in a first message field. The first message is used to request a network host interface address on the first network. The first connection address allows the first network device to have the first message with the first message type forwarded to network host interfaces available on the first network via the upstream connection to the second network.

16 to determine an IP 54 network host interface address available on CMTS 12 to receive IP 54 data packets from data network 28, thereby establishing a virtual IP 54 connection with data network 28.

After addressing network host interfaces using method 92, an exemplary data path through cable system 10 is illustrated in Table 3. However other data paths could also be used and the present invention is not limited to the data paths shown in Table 3. For example, CM 16 may send data upstream back through cable network 14 (e.g., CM 16 to cable network 14 to CMTS 12) and not use PSTN 22 and the telephony return upstream path.

TABLE 3

1. An IP 54 datagram from data network 28 destined for CM 16 arrives on CMTS-NSI 32 and enters CMTS 12.
2. CMTS 12 encodes the IP 54 datagram in a cable data frame, passes it to MAC 44 and transmits it "downstream" to RF interface 40 on CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with modem interface 48 via PSTN 22 to TRAC 24.
5. TRAC 24 decodes the IP 54 datagram and forwards it via TRAC-NSI 30 to a destination on data network 28.

At step 98, the first network device sends the first message over the upstream connection to the second network. The second network uses the first address field in the first message to forward the first message to one or more network host interfaces available on first network at step 100. Network host interfaces available on the first network that can provide the services requested in first message send a second message with a second message type with a second connection address in a second message field to the first network at step 102. The second connection address allows the first network device to receive data packets from the third network via a network host interface available on the first network. The first network forwards one or more second messages on the downstream connection to the first network device at step 104.

The first network device selects a second connection address from one of the second messages from one of the one or more network host interfaces available on the first network at step 106 and establishes a virtual connection from the third network to the first network device using the second connection address for the selected network host interface.

The virtual connection includes receiving data on the first network host interface on the first network from the third network and sending the data over the downstream connection to the first network device. The first network device sends data responses back to the third network over the upstream connection to the second network, which forwards the data to the appropriate destination on the third network.

In one embodiment of the present invention, the data-over-cable system is data-over-cable system 10, the first network device is CM 16, the first network is cable television network 14, the downstream connection is a cable television connection. The second network is PSTN 22, the upstream connection is a telephony connection, the third network is data network 28 (e.g., the Internet or an intranet) and the third type of connection is an IP 54 connection. The first and second connection addresses are IP 54 addresses. However, the present invention is not limited to the network components and addresses described. Method 92 allows CM Dynamic Network Host Configuration on Data-over-cable System As was illustrated in FIG. 2, CM 16 includes a Dynamic Host Configuration Protocol ("DHCP") layer 66, hereinafter DHCP 66. DHCP 66 is used to provide configuration parameters to hosts on a network (e.g., an IP 54 network). DHCP 66 consists of two components: a protocol for delivering host-specific configuration parameters from a DHCP 66 server to a host and a mechanism for allocation of network host addresses to hosts. DHCP 66 is built on a client-server model, where designated DHCP 66 servers allocate network host addresses and deliver configuration parameters to dynamically configured network host clients.

FIG. 6 is a block diagram illustrating a DHCP 66 message structure 108. The format of DHCP 66 messages is based on the format of BOOTstrap Protocol ("B OOTP") messages described in RFC-951 and RFC-1542 incorporated herein by reference. From a network host client's point of view, DHCP 66 is an extension of the BOOTP mechanism. This behavior allows existing BOOTP clients to interoperate with DHCP 66 servers without requiring any change to network host the clients' BOOTP initialization software. DHCP 66 provides persistent storage of network parameters for network host clients.

To capture BOOTP relay agent behavior described as part of the BOOTP specification and to allow interoperability of existing BOOTP clients with DHCP 66 servers, DHCP 66 uses a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hen") a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134

("sname"), a boot file name 136 ("file") and an optional parameters field 138 ("options"). Descriptions for DHCP 66 message 108 fields are shown in Table 4.

TABLE 4

| DCHP 66 Parameter | Description |
|---|---|
| OP 110 | Message op code/message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your'(client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 6 is used to discover IP 54 and other network host interfaces in data-over-cable system 10. A network host client (e.g., CM 16) uses DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCPDISCOVER 66 message on its local physical subnet. The DHCPDISCOVER 66 message may include options that suggest valuesfor a network host interface address. BOOTP relay agents may pass the message on to DHCP 66 servers not on the same physical subnet.
2. DHCP servers may respond with a DHCPOFFER message that includes an available network address in the 'yiaddr' field (and other configuration parameters in DHCP 66 options)
   from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering Network Host Interfaces in the Data-over-cable System

The DHCP discovery process illustrated in table 5 will not work in data-over-cable system 10. CM 16 has only a downstream connection from CMTS 12, which includes DHCP 66 servers, associated with network host interfaces available on CMTS 12. In a preferred embodiment of the present invention, CM 16 discovers network host interfaces via TRAC 24 and PSTN 22 on an upstream connection.

The DHCP 66 addressing process shown in Table 5 was not originally intended to discover network host interfaces in data-over-cable system 10. CMTS 12 has DHCP 66 servers associated with network host interfaces (e.g., IP interfaces), but CM 16 only has as downstream connection from CMTS 12. CM 16 has an upstream connection to TRAC 24, which has a DHCP 66 layer. However, TRAC 24 does not have DHCP 66 servers, or direct access to network host interfaces on CMTS 12.

FIGS. 7A and 7B are a flow diagram illustrating a method 140 for discovering network host interfaces in data-over-cable system 10. When CM 16 has established an IP 54 link to TRAC 24, it begins communications with CMTS 12 via DHCP 66 to complete a virtual IP 54 connection with data network 28. However, to discover what IP 54 host interfaces might be available on CMTS 12, CM 16 has to communicate with CMTS 12 via PSTN 22 and TRAC 24 since CM 16 only has a "downstream" cable channel from CMTS 12.

At step 142 in FIG. 7A, after receiving a TSI message 76 from CMTS 12 on a downstream connection, CM 16 generates a DHCP discover ("DHCPDISCOVER") message and sends it upstream via PSTN 22 to TRAC 22 to discover what IP 54 interfaces are available on CMTS 12. The fields of the DHCP discover message are set as illustrated in Table 6. However, other field settings may also be used.

TABLE 6

| DHCP 66 Parameter | Description |
|---|---|
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 118 | Set BROADCAST bit to zero. |

TABLE 6-continued

| DHCP 66 Parameter | Description |
| --- | --- |
| CIADDR 124 | If CM 16 has previously been assigned an IP 54 address, the IP 54 address is placed in this field. If CM 16 has previously been assigned an IP 54 address by DHCP 66, and also has been assigned an address via IPCP CM 16 places the DHCP 66 IP 54 address in this field. |
| GIADDR 130 | CM 16 places the Downstream Channel IP 54 address 80 of CMTS 12 obtained in TSI message 76 on a cable downstream channel in this field. |
| CHADDR 132 | CM 16 places its 48-bit MAC 44 LAN address in this field. |

The DHCPDISCOVER message is used to "discover" the existence of one or more IP 54 host interfaces available on CMTS 12. DHCP 66 giaddr-field 130 (FIG. 6) includes the downstream channel IP address 80 of CMTS 12 obtained in TSI message 76 (e.g., the first message field from step 96 of method 92). Using the downstream channel IP address 80 of CMTS 12 obtained in TSI message 76 allows the DHCP-DISCOVER message to be forwarded by TRAC 24 to DHCP 66 servers (i.e., protocol servers) associated with network host interfaces available on CMTS 12. If DHCP 66 giaddr-field 130 (FIG. 6) in a DHCP message from a DHCP 66 client is non-zero, the DHCP 66 server sends any return messages to a DHCP 66 server port on a DHCP 66 relaying agent (e.g., CMTS 12) whose address appears in DHCP 66 giaddr-field 130.

In a typical DHCP 66 discovery process the DHCP 66 giaddr-field 130 is set to zero. If DHCP 66 giaddr-field 130 is zero, the DHCP 66 client is on the same subnet as the DHCP 66 server, and the DHCP 66 server sends any return messages to either the DHCP 66 client's network address, if that address was supplied in DHCP 66 ciaddr-field 124 (FIG. 6), or to a client's hardware address specified in DHCP 66 chaddr-field 132 (FIG. 6) or to a local subnet broadcast address (e.g., 255.255.255.255).

At step 144, a DHCP 66 layer on TRAC 24 broadcasts the DHCPDISCOVER message on its local network leaving DHCP 66 giaddr-field 130 intact since it already contains a non-zero value. TRAC's 24 local network includes connections to one or more DHCP 66 proxies (i.e., network host interface proxies). The DHCP 66 proxies accept DHCP 66 messages originally from CM 16 destined for DHCP 66 servers connected to network host interfaces available on CMTS 12 since TRAC 24 has no direct access to DCHP 66 servers associated with network host interfaces available on CMTS 12. DHCP 66 proxies are not used in a typical DHCP 66 discovery process.

One or more DHCP 66 proxies on TRAC's 24 local network recognizes the DHCPDISCOVER message and forwards it to one or more DHCP 66 servers associated with network host interfaces (e.g., IP 54 interfaces) available on CMTS 12 at step 146. Since DHCP 66 giaddr-field 130 (FIG. 6) in the DHCPDISCOVER message sent by CM 16 is already non-zero (i.e., contains the downstream IP address of CMTS 12), the DHCP 66 proxies also leave DHCP 66 giaddr-field 130 intact.

One or more DHCP 66 servers for network host interfaces (e.g., IP 54 interfaces) available on CMTS 12 receive the DHCPDISCOVER message and generate a DHCP 66 offer message ("DHCPOFFER") at step 148. The DHCP 66 offer message is an offer of configuration parameters sent from network host interfaces to DHCP 66 servers and back to a network host client (e.g., CM 16) in response to a DHCP-DISCOVER message. The DHCP 66 offer message is sent with the message fields set as illustrated in Table 7. However, other field settings can also be used. DHCP 66 yiaddr-field 126 (e.g., second message field from step 102 of method 92) contains an IP 54 address for a network host interface available on CMTS 12 and used for receiving data packets from data network 28.

TABLE 7

| DHCP 66 Parameter | Description |
| --- | --- |
| FLAGS 122 | BROADCAST bit set to zero. |
| YIADDR 126 | IP 54 address from a network host interface to allow CM 16 to receive data from data network 28 via a network host interface available on CMTS 12. |
| SIADDR 128 | An IP 54 address for a TFTP 64 server to download configuration information for an interface host. |
| CHADDR 132 | MAC 44 address of CM 16. |
| SNAME 134 | Optional DHCP 66 server identifier with an interface host. |
| FILE 136 | A TFTP 64 configuration file name for CM 16. |

DHCP 66 servers send the DHCPOFFER message to the address specified in 66 giaddr-field 130 (i.e., CMTS 12) from the DHCPDISCOVER message if associated network host interfaces (e.g., IP 54 interfaces) can offer the requested service (e.g., IP 54 service) to CM 16. The DHCPDISOVER message DHCP 66 giaddr-field 130 contains a downstream channel IP address 80 of CMTS 12 that was received by CM 16 in TSI message 76. This allows CMTS 12 to receive the DHCPOFFER messages from the DHCP 66 servers and send them to CM 16 via a downstream channel on cable network 14.

At step 150 in FIG. 7B, CMTS 12 receives one or more DHCPOFFER messages from one or more DHCP 66 servers associated with the network host interfaces (e.g., IP 54 interfaces). CMTS 12 examines DHCP 66 yiaddr-field 126 and DHCP 66 chaddr-field 132 in the DHCPOFFER messages and sends the DHCPOFFER messages to CM 16 via cable network 14. DHCP 66 yiaddr-field 126 contains an IP 54 address for a network host IP 54 interface available on CMTS 12 and used for receiving IP 54 data packets from data network 28. DHCP 66 chaddr-field 132 contains the MAC 44 layer address for CM 16 on a downstream cable channel from CMTS 12 via cable network 14. CMTS 12 knows the location of CM 16 since it sent CM 16 a MAC 44 layer address in one or more initialization messages (e.g., TSI message 76).

If a BROADCAST bit in flags field 124 is set to one, CMTS 12 sends the DHCPOFFER messages to a broadcast IP 54 address (e.g., 255.255.255.255) instead of the address specified in DHCP 66 yiaddr-field 126. DHCP 66 chaddr-field 132 is still used to determine that MAC 44 layer address. If the BROADCAST bit in DHCP 66 flags field 122 is set, CMTS 12 does not update internal address or routing tables based upon DHCP 66 yiaddr-field 126 and DHCP 66 chaddr-field 132 pair when a broadcast message is sent.

At step 152, CM 16 receives one or more DHCPOFFER messages from CMTS 12 via cable network 14 on a downstream connection. At step 154, CM 16 selects an offer for IP 54 service from one of the network host interfaces (e.g., an IP interfaces 54) available on CMTS 12 that responded to the DHCPDISOVER message sent at step 142 in FIG. 7A and establishes a virtual IP 54 connection. The selected DHCPOFFER message contains a network host interface address (e.g., IP 54 address) in DHCP 66 yiaddr-field 126 (FIG. 6). A cable modem acknowledges the selected network host interface with DHCP 66 message sequence explained below.

After selecting and acknowledging a network host interface, CM 16 has discovered an IP 54 interface address available on CMTS 12 for completing a virtual IP 54 connection with data network 28. Acknowledging a network host interface is explained below. The virtual IP 54 connection allows IP 54 data from data network 28 to be sent to CMTS 12 which forwards the IP 54 packets to CM 16 on a downstream channel via cable network 14. CM 16 sends response IP 54 packets back to data network 28 via PSTN 22 and TRAC 24.

Figure 8:
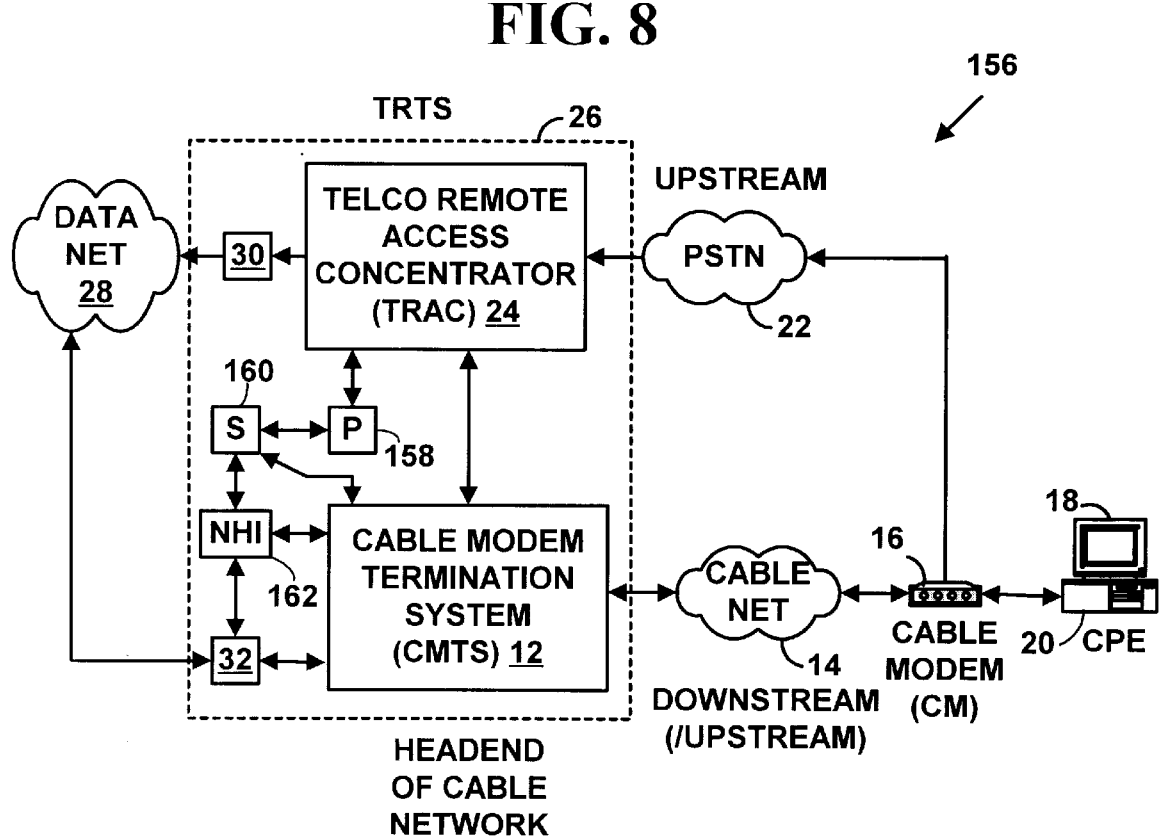
FIG. 8 is a block diagram illustrating a data-over-cable system for the method illustrated in FIGS. 7A and 7B.
Figure 9:
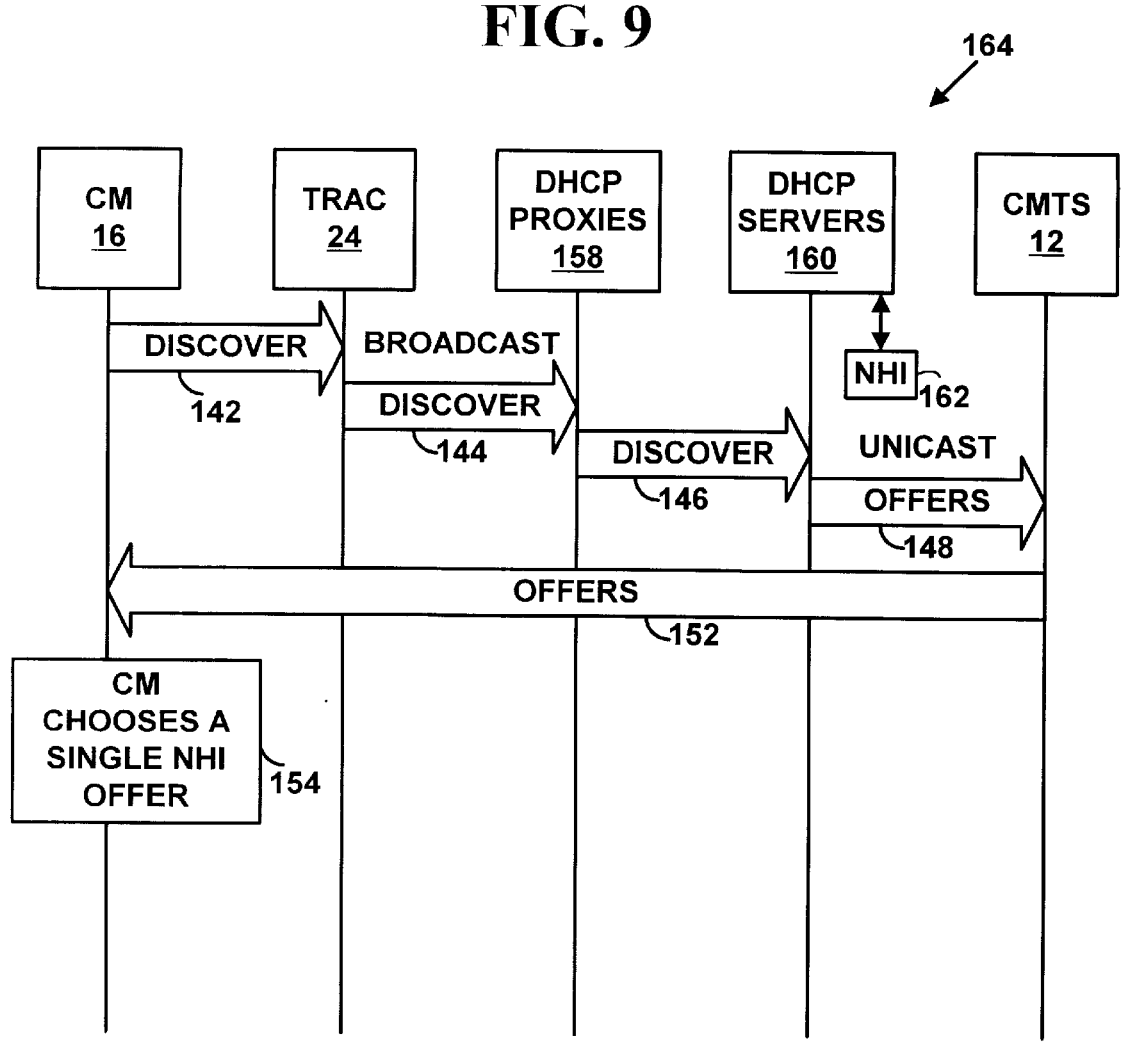
FIG. 9 is a block diagram illustrating the message flow of the method illustrated in FIGS. 7A and 7B.

FIG. 8 is a block diagram illustrating a data-over-cable system 156 for the method illustrated in FIGS. 7A and 7B. Data-over-cable system 156 includes DHCP 66 proxies 158, DHCP 66 servers 160 and associated Network Host Interfaces 162 available on CMTS 12. Multiple DHCP 66 proxies 158, DHCP 66 servers 160 and network host interfaces 162 are illustrated as single boxes in FIG. 8. FIG. 8 also illustrates DHCP 66 proxies 158 separate from TRAC 24. In one embodiment of the present invention, TRAC 24 includes DHCP 66 proxy functionality and no separate DHCP 66 proxies 158 are used. In such an embodiment, TRAC 24 forwards DHCP 66 messages using DHCP 66 giaddr-field 130 to DHCP 66 servers 160 available on CMTS 12. FIG. 9 is a block diagram illustrating a message flow 162 of method 140 (FIGS. 7A and 7B).

Message flow 162 includes DHCP proxies 158 and DHCP servers 160 illustrated in FIG. 8 Steps 142, 144, 146, 148, 150 and 154 of method 140 (FIGS. 7A and 7B) are illustrated in FIG. 9. In one embodiment of the present invention, DHCP proxies 158 are not separate entities, but are included in TRAC 24. In such an embodiment, DHCP proxy services are provided directly by TRAC 24.

Resolving Addresses for Network Host Interfaces

Since CM 16 receives multiple DHCPOFFER messages (Step 152 FIG. 7B) CM 16 resolves and acknowledges one offer from a selected network host interface. FIGS. 10A and 10B are a flow diagram illustrating a method 166 for resolving and acknowledging host addresses in a data-over-cable system. Method 166 includes a first network device that is connected to a first network with a downstream connection of a first connection type, and connected to a second network with an upstream connection of a second connection type. The first and second networks are connected to a third network with a third connection type. In one embodiment of the present invention, the first network device is CM 16, the first network is cable network 14, the second network is PSTN 22 and the third network is data network 28 (e.g., the Internet). The downstream connection is a cable television connection, the upstream connection is a telephony connection, and the third connection is an IP connection.

Turning to FIG. 10A, one or more first messages are received on the first network device from the first network on the downstream connection at step 168. The one or more first messages are offers from one or more network host interfaces available on the first network to provide the first network device a connection to the third network. The first network device selects one of the network host interfaces using message fields in one of the one or more first messages at step 170. The first network device creates a second message with a second message type to accept the offered services from a selected network host interface at step 172. The second message includes a connection address for the first network in a first message field and an identifier to identify the selected network host interface in a second message field.

The first network device sends the second message over the upstream connection to the second network at step 174. The second network uses the first message field in the second message to forward the second message to the one or more network host interfaces available on first network at step 176.

A network host interface available on the first network identified in second message field in the second message from the first network device recognizes an identifier for the network host interface at 178 in FIG. 10B. The selected network host interface sends a third message with a third message type to the first network at step 180. The third message is an acknowledgment for the first network device that the selected network host interface received the second message from the first network device. The first network stores a connection address for the selected network interface in one or more tables on the first network at step 182. The first network will forward data from the third network to the first network device when it is received on the selected network host interface using the connection address in the one or more routing tables. The first network forwards the third message to the first network device on the downstream connection at step 184. The first network device receives the third message at step 186. The first network and the first network device have the necessary addresses for a virtual connection that allows data to be sent from the third network to a network host interface on the first network, and from the first network over the downstream connection to the first network device. Method 166 accomplishes resolving network interface hosts addresses from a cable modem in a data-over-cable with telephony return.

Method 166 of the present invention is used in data-over-cable system 10 with telephony return. However, the present invention is not limited to data-over-cable system 10 with telephony return and can be used in data-over-cable system 10 without telephony return by using an upstream cable channel instead of an upstream telephony channel.

FIGS. 11A and 11B are a flow diagram illustrating a method 188 for resolving discovered host addresses in data-over-cable system 10 with telephony return. At step 190 in FIG. 11A, CM 16 receives one or more DHCPOFFER messages from one or more DHCP 66 servers associated with one or more network host interfaces (e.g., at step 168 in method 166). The one or more DHCPOFFER messages include DHCP 66 fields set as illustrated in Table 7 above. However, other field settings could also be used. At step 192, CM 16 selects one of the DHCPOFFER messages (see also, step 170 in method 166). At step 194, CM 16 creates a DHCP 66 request message ("DHCPREQUEST") message to request the services offered by a network host interface selected at step 192. The fields of the DHCP request message are set as illustrated in Table 8. However, other field settings may also be used.

TABLE 8

| DHCP 66 Parameter | Description |
|---|---|
| OP 110 | Set to BOOTREQUEST. |
| HTYPE 112 | Set to network type (e.g., one for 10 Mbps Ethernet). |

TABLE 8-continued

| DHCP 66 Parameter | Description |
| --- | --- |
| HLEN 114 | Set to network length (e.g., six for 10 Mbps Ethernet) |
| HOPS 116 | Set to zero. |
| FLAGS 118 | Set BROADCAST bit to zero. |
| CIADDR 124 | If CM 16 has previously been assigned an IP address, the IP address is placed in this field. If CM 16 has previously been assigned an IP address by DHCP 66, and also has been assigned an address via IPCP, CM 16 places the DHCP 66 IP 54 address in this field. |
| YIADDR 126 | IP 54 address sent from the selected network interface host in DCHPOFFER message |
| GIADDR 130 | CM 16 places the Downstream Channel IP 54 address 80 CMTS 12 obtained in TSI message 76 on a cable downstream channel in this field. |
| CHADDR 132 | CM 16 places its 48-bit MAC 44 LAN address in this field. |
| SNAME 134 | DHCP 66 server identifier for the selected network interface host |

The DHCPREQUEST message is used to "request" services from the selected IP 54 host interface available on CMTS 12 using a DHCP 66 server associated with the selected network host interface. DHCP 66 giaddr-field 130 (FIG. 6) includes the downstream channel IP address 80 for CMTS 12 obtained in TSI message 76 (e.g., the first message-field from step 172 of method 166). Putting the downstream channel IP address 80 obtained in TSI message 76 allows the DHCPREQUEST message to be forwarded by TRAC 24 to DCHP 66 servers associated with network host interfaces available on CMTS 12. DHCP 66 giaddr-field 126 contains an identifier (second message field, step 172 in method 166) DHCP 66 sname-field 134 contains a DHCP 66 server identifier associated with the selected network host interface.

If DHCP 66 giaddr-field 130 in a DHCP message from a DHCP 66 client is non-zero, a DHCP 66 server sends any return messages to a DHCP 66 server port on a DHCP 66 relaying agent (e.g., CMTS 12) whose address appears in DHCP 66 giaddr-field 130. If DHCP 66 giaddr-field 130 is zero, the DHCP 66 client is on the same subnet as the DHCP 66 server, and the DHCP 66 server sends any return messages to either the DHCP 66 client's network address, if that address was supplied in DHCP 66 ciaddr-field 124, or to the client's hardware address specified in DHCP 66 chaddr-field 132 or to the local subnet broadcast address.

Returning to FIG. 11A at step 196, CM 16 sends the DHCPREQUEST message on the upstream connection to TRAC 24 via PSTN 22. At step 198, a DHCP 66 layer on TRAC 24 broadcasts the DHCPREQUEST message on its local network leaving DHCP 66 giaddr-field 130 intact since it already contains a non-zero value. TRAC's 24 local network includes connections to one or more DHCP 66 proxies. The DHCP 66 proxies accept DHCP 66 messages originally from CM 16 destined for DHCP 66 servers associated with network host interfaces available on CMTS 12. In another embodiment of the present invention, TRAC 24 provides the DHCP 66 proxy functionality, and no separate DHCP 66 proxies are used.

The one or more DHCP 66 proxies on TRAC's 24 local network message forwards the DHCPOFFER to one or more of the DHCP 66 servers associated with network host interfaces (e.g., IP 54 interfaces) available on CMTS 12 at step 200 in FIG. 11B. Since DHCP 66 giaddr-field 130 in the DHCPDISCOVER message sent by CM 16 is already non-zero (i.e., contains the downstream IP address of CMTS 12), the DHCP 66 proxies leave DHCP 66 giaddr-field 130 intact.

One or more DHCP 66 servers for the selected network host interfaces (e.g., IP 54 interface) available on CMTS 12 receives the DHCPOFFER message at step 202. A selected DHCP 66 server recognizes a DHCP 66 server identifier in DHCP 66 sname-field 134 or the IP 54 address that was sent in the DCHPOFFER message in the DHCP 66 yiaddr-field 126 from the DHCPREQUST message as being for the selected DHCP 66 server.

The selected DHCP 66 server associated with network host interface selected by CM 16 in the DHCPREQUEST message creates and sends a DCHP 66 acknowledgment message ("DHCPACK") to CMTS 12 at step 204. The DHCPACK message is sent with the message fields set as illustrated in Table 9. However, other field settings can also be used. DHCP 66 yiaddr-field again contains the IP 54 address for the selected network host interface available on CMTS 12 for receiving data packets from data network 28.

TABLE 9

| DHCP 66 Parameter | Description |
| --- | --- |
| FLAGS 122 | Set a BROADCAST bit to zero. |
| YIADDR 126 | IP 54 address for the selected network host interface to allow CM 16 to receive data from data network 28. |
| SIADDR 128 | An IP 54 address for a TFTP 64 server to download configuration information for an interface host. |
| CHADDR 132 | MAC 44 address of CM 16. |
| SNAME 134 | DHCP 66 server identifier associated with the selected network host interface. |
| FILE 136 | A configuration file name for an network interface host. |

The selected DHCP 66 server sends the DHCACK message to the address specified in DHCP 66 giaddr-field 130 from the DHCPREQUEST message to CM 16 to verify the selected network host interface (e.g., IP 54 interface) will offer the requested service (e.g., IP 54 service).

At step 206, CMTS 12 receives the DHCPACK message from the selected DHCP 66 server associated with the selected network host interface IP 54 address(e.g., IP 54 interface). CMTS 12 examines DHCP 66 yiaddr-field 126 and DHCP 66 chaddr-field 132 in the DHCPACK message. DHCP 66 yiaddr-field 126 contains an IP 54 address for a network host IP 54 interface available on CMTS 12 and used for receiving IP 54 data packets from data network 28 for CM 16. DHCP 66 chaddr-field 132 contains the MAC 44 layer address for CM 16 on a downstream cable channel from CMTS 12 via cable network 14.

CMTS 12 updates an Address Resolution Protocol ("ARP") table and other routing tables on CMTS 12 to reflect the addresses in DHCP 66 yiaddr-field 126 and DHCP 66 chaddr-field 132 at step 208. As is known in the art, ARP allows a gateway such as CMTS 12 to forward any datagrams from a data network such as data network 28 it receives for hosts such as CM 16. ARP is defined in RFC-826, incorporated herein by reference.

CMTS 12 stores a pair of network address values in the ARP table, the IP 54 address of the selected network host interface from DHCP 66 yiaddr-field 126 and a Network Point of Attachment ("NPA") address. In a preferred embodiment of the present invention, The NPA address is a MAC 44 layer address for CM 16 via a downstream cable channel. The IP/NPA address pair are stored in local routing tables with the IP/NPA addresses of hosts (e.g., CMs 16) that are attached to cable network 14.

At step 210, CMTS 12 sends the DHCPACK message to CM 16 via cable network 14. At step 212, CM 16 receives the DHCPACK message, and along with CMTS 12 has addresses for a virtual connection between data network 28 and CM 16. When data packets arrive on the IP 54 address for the selected host interface they are sent to CMTS 12 and CMTS 12 forwards them using a NPA (i.e., MAC 44 address) from the routing tables on a downstream channel via cable network 14 to CM 16.

If a BROADCAST bit in flags field 124 is set to one in the DHCPACK, CMTS 12 sends the DHCPACK messages to a broadcast IP 54 address (e.g., 255.255.255.255). DHCP 66 chaddr-field 132 is still used to determine that MAC layer address. If the BROADCAST bit in flags field 122 is set, CMTS 12 does not update the ARP table or offer routing tables based upon DHCP 66 yiaddr-field 126 and DHCP 66 chaddr-field 132 pair when a broadcast message is sent.

Figure 12:
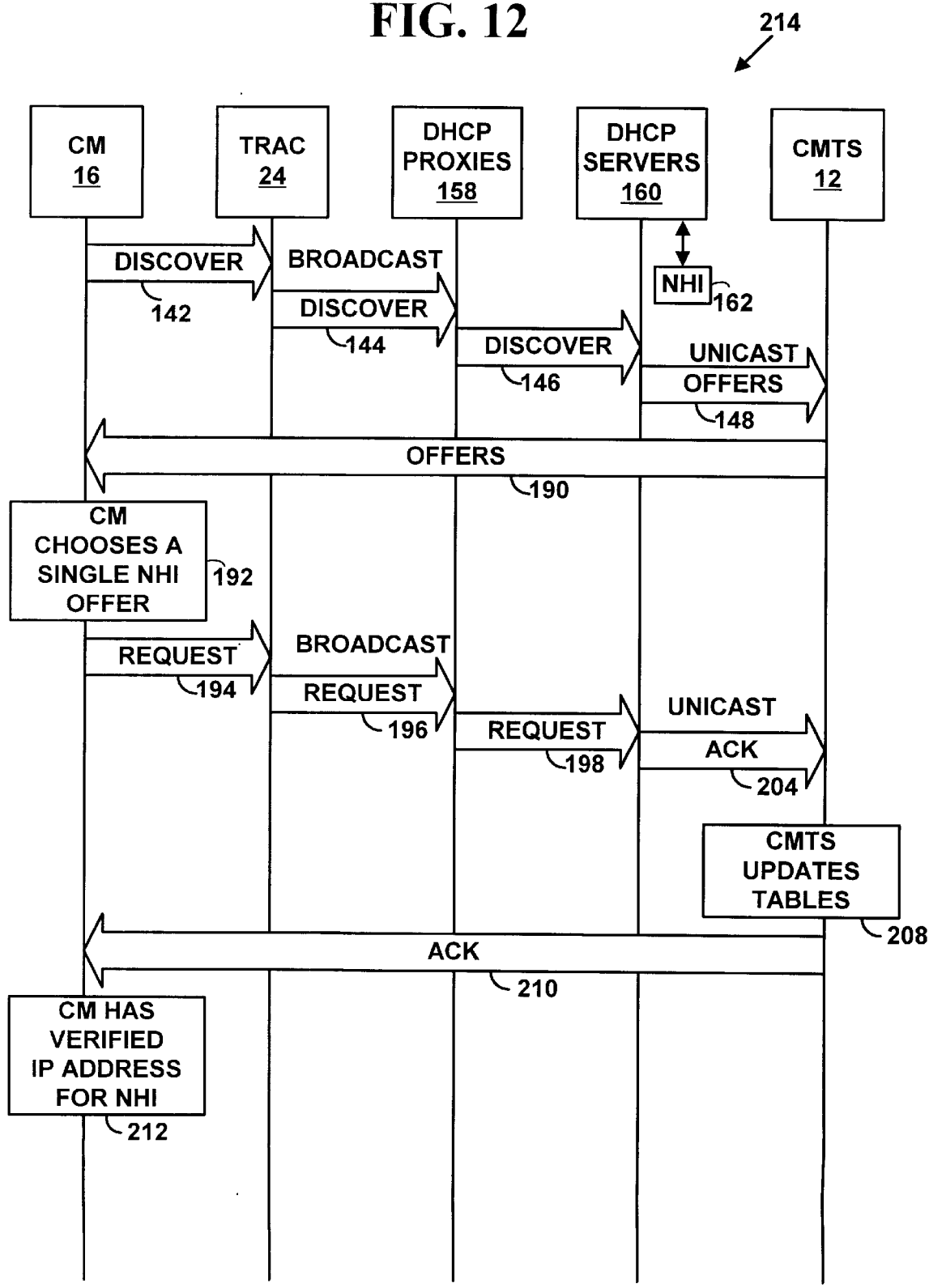
FIG. 12 is a block diagram illustrating the message flow of the method illustrated in FIG. 10.

FIG. 12 is a block diagram illustrating the message flow 214 of the method 188 illustrated in FIGS. 11A and 11B. Message flow 214 includes DHCP proxies 158 and DHCP servers 160 illustrated in FIG. 8. Method steps 194, 196, 198, 204, 208, 210 and 212 of method 188 (FIGS. 11A and 11B) are illustrated in FIG. 12. In one embodiment of the present invention, DHCP proxies 158 are not separate entities, but are included in TRAC 24. In such an embodiment, DHCP proxy services are provided directly by TRAC 24.

After method 188, CMTS 12 has a valid IP/MAC address pair in one or more address routing tables including an ARP table to forward IP 54 data packets from data network 28 to CM 16, thereby creating a virtual IP 54 data path to/from CM 16 as was illustrated in method 92 (FIG. 5) and Table 3. CM 16 has necessary parameters to proceed to the next phase of initialization, a download of a configuration file via TFTP 64. Once CM 16 has received the configuration file and has been initialized, it registers with CMTS 12 and is ready to receive data from data network 14.

In the event that CM 16 is not compatible with the configuration of the network host interface received in the DHCPACK message, CM 16 may generate a DHCP 66 decline message ("DHCPDECLINE") and transmit it to TRAC 24 via PSTN 22. A DHCP 66 layer in TRAC 24 forwards the DHCPDECLINE message to CMTS 12. Upon seeing a DHCPDECLINE message, CMTS 12 flushes its ARP tables and routing tables to remove the now invalid IP/MAC pairing. If an IP 54 address for a network host interface is returned that is different from the IP 54 address sent by CM 16 in the DCHCPREQUEST message, CM 16 uses the IP 54 address it receives in the DHCPACK message as the IP 54 address of the selected network host interface for receiving data from data network 28.

The present invention is described with respect to, but is not limited to, a data-over-cable-system with telephony return. Method 188 can also be used with a cable modem that has a two-way connection (i.e., upstream and downstream) to cable network 14 and CMTS 12. In a data-over-cable-system without telephony return, CM 16 would broadcast the DHCPREQUEST message to one or more DHCP 66 servers associated with one or more network host interfaces available on CMTS 12 using an upstream connection on data network 14 including the IP 54 address of CMTS 12 in DHCP 66 giaddr-field 130. Method 188 accomplishes resolving addresses for network interface hosts from a cable modem in a data-over-cable with or without telephony return, and without extensions to the existing DHCP protocol.

CPE Initialization in a Data-over-cable System

Figure 13B:
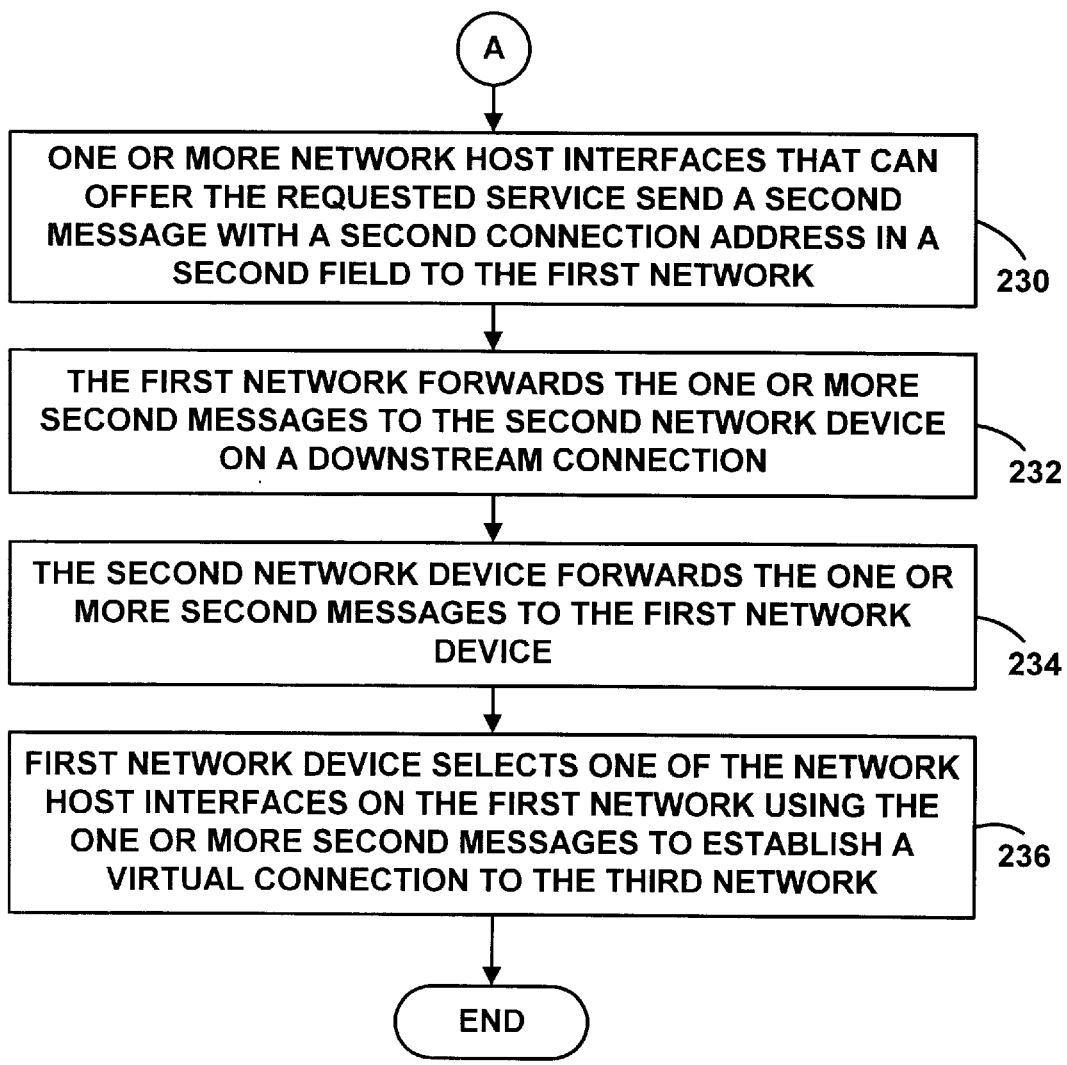

CPE 18 also uses DHCP 66 to generate requests to obtain IP 54 addresses to allow CPE 18 to also receive data from data network 28 via CM 16. In a preferred embodiment of the present invention, CM 16 functions as a standard BOOTP relay agent/DHCP Proxy 158 to facilitate CPE's 18 access to DHCP 66 server 160. FIGS. 13A and 13B are a flow diagram illustrating a method 216 for obtaining addresses for customer premise equipment. CM 16 and CMTS 12 use information from method 214 to construct IP 54 routing and ARP table entries for network host interfaces 162 providing data to CMCI 20 and to CPE 18.

Method 216 in FIGS. 13A and 13B includes a data-over-cable system with telephony return and first network device with a second network device for connecting the first network device to a first network with a downstream connection of a first connection type, and for connecting to a second network with an upstream connection of a second connection type. The first and second networks are connected to a third network with a third connection type.

In one embodiment of the present invention, data-over-cable system with telephony return is data-over-cable system 10 with the first network device CPE 18 and the second network device CM 16. The first network is cable television network 14, the downstream connection is a cable television connection, the second network is PSTN 22, the upstream connection is a telephony connection, the third network is data network 28 (e.g., the Internet or an intranet) and the third type of connection is an IP 54 connection. However, the present invention is not limited to the network components described and other network components may also be used. Method 216 allows CPE 18 to determine an IP 54 network host interface address available on CMTS 12 to receive IP 54 data packets from data network 54, thereby establishing a virtual IP 54 connection with data network 28 via CM 16.

Returning to FIG. 13A at step 218, a first message of a first type (e.g., a DHCP 66 discover message) with a first message field for a first connection is created on the first network device. The first message is used to discover a network host interface address on the first network to allow a virtual connection to the third network.

At step 220, the first network device sends the first message to the second network device. The second network device checks the first message field at step 222. If the first message field is zero, the second network device puts its own connection address into the first message field at step 224. The second network device connection address allows the messages from network host interfaces on the first network to return messages to the second network device attached to the first network device. If the first message field is non-zero, the second network device does not alter the first message field since there could be a relay agent attached to the first network device that may set the first connection address field.

At step 226, the second network device forwards the first message to a connection address over the upstream connection to the second network. In one embodiment of the present invention, the connection address is an IP broadcast address (e.g., 255.255.255.255). However, other connection addresses can also be used.

The second network uses the first connection address in the first message field in the first message to forward the first message to one or more network host interfaces (e.g., IP 54 network host interfaces) available on first network at step 228. One or more network host interfaces available on the first network that can provide the services requested in first message send a second message with a second message type with a second connection address in a second message field to the first network at step 230 in FIG. 13B. The second connection address allows the first network device to receive data packets from the third network via a network host interface on the first network. The first network forwards the one or more second messages on the downstream connection to the second network device at step 232. The second network device forwards the one or more second messages to the first network device at step 234. The first network device selects one of the one or more network host interfaces on the first network using the one or more second messages at step 236. This allows a virtual connection to be established between the third network and the first network device via the selected network host interface on the first network and the second network device.

Figure 14B:
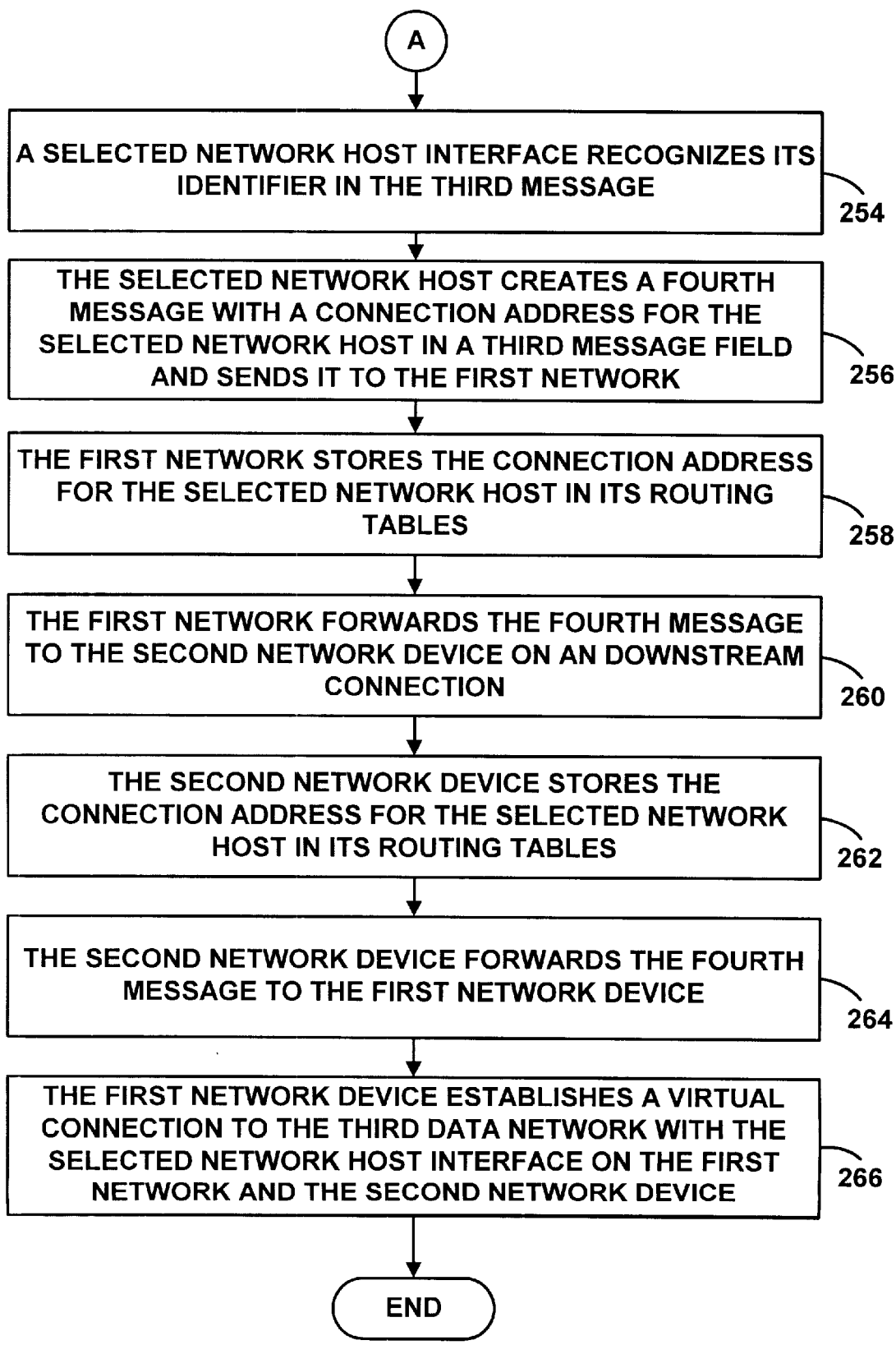

FIGS. 14A and 14B are a flow diagram illustrating a method 240 for resolving addresses for the network host interface selected by a first network device to create a virtual connection to the third network. Turning to FIG. 14A, at step 240 one or more second messages are received with a second message type on the first network device from the second network device from the first network on a downstream connection at step 242. The one or more second messages are offers from one or more protocol servers associated with one or more network host interfaces available on the first network to provide the first network device a connection to the third network. The first network device selects one of the network host interfaces using one of the one or more second messages at step 244. The first network device creates a third message with a third message type to accept the offered services from the selected network host interface at step 246. The third message includes a connection address for the first network in a first message field and an identifier to identify the selected network host interface in a second message field. At step 248, first network device equipment sends the third message to the second network device.

The second network device sends the third message over the upstream connection to the second network at step 250. The second network uses the first message field in the third message to forward the third message to the one or more network host interfaces available on first network at step 252.

A network host interface available on the first network identified in second message field in the third message from the first network device recognizes an identifier for the selected network host interface at step 254 in FIG. 14B. The selected network host interface sends a fourth message with a fourth message type to the first network at step 256. The fourth message is an acknowledgment for the first network device that the selected network host interface received the third message. The fourth message includes a second connection address in a third message field. The second connection address is a connection address for the selected network host interface. The first network stores the connection address for the selected network interface from the third message in one or more routing tables (e.g., an ARP table) on the first network at step 258. The first network will forward data from the third network to the first network device via the second network device when it is received on the selected network host interface using the connection address from the third message field. The first network forwards the fourth message to the second network device on the downstream connection at step 260. The second network device receives the fourth message and stores the connection address from the third message field for the selected network interface in one or more routing tables on the second network device at step 262. The connection address for the selected network interface allows the second network device to forward data from the third network sent by the selected network interface to the customer premise equipment.

At step 264, the second network device forward the fourth message to the first network device. At step 266, the first network device establishes a virtual connection between the third network and the first network device.

After step 266, the first network, the second network device and the first network device have the necessary connection addresses for a virtual connection that allows data to be sent from the third network to a network host interface on the first network, and from the first network over the downstream connection to the second network and then to the first network device. In one embodiment of the present invention, method 240 accomplishes resolving network interface hosts addresses from customer premise equipment with a cable modem in a data-over-cable with telephony return without extensions to the existing DHCP protocol.

Methods 216 and 2.40 of the present invention are used in data-over-cable system 10 with telephony return with CM 16 and CPE 18. However, the present invention is not limited to data-over-cable system 10 with telephony return and can be used in data-over-cable system 10 without telephony return by using an upstream cable channel instead of an upstream telephony channel.

FIGS. 15A and 15B are a flow diagram illustrating a method 268 for addressing network host interfaces from CPE 18. At step 270 in FIG. 15A, CPE 18 generates a DHCPDISCOVER message broadcasts the DHCPDISCOVER message on its local network with the fields set as illustrated in Table 6 above with addresses for CPE 18 instead of CM 16. However, more or fewer field could also be set. CM 16 receives the DHCPDISCOVER as a standard BOOTP relay agent at step 272. The DHCP DISCOVER message has a MAC 44 layer address for CPE 18 in DHCP 66 chaddr-field 132, which CM 16 stores in one or more routing tables. As a BOOTP relay agent, the CM 16 checks the DHCP 66 giaddr-field 130 (FIG. 6) at step 274. If DHCP 66 giaddr-field 130 is set to zero, CM 16 put its IP 54 address into DHCP 66 giaddr-field 130 at step 276.

If DHCP 66 giaddr-field 130 is non-zero, CM 16 does not alter DHCP 66 giaddr-field 130 since there could be another BOOTP relay agent attached to CPE 18 which may have already set DHCP 66 giaddr-field 130. Any BOOTP relay agent attached to CPE 18 would have also have acquired its IP 54 address from using a DCHP 66 discovery process (e.g., FIG. 12).

Returning to FIG. 15A, at step 278, CM 16 broadcasts the DHCPDISCOVER message to a broadcast address via PSTN 22 to TRAC 24. In one embodiment of the present invention, the broadcast address is an IP 54 broadcast address (e.g., 255.255.255.255). At step 280, one or more DHCP 66 proxies 158 associated with TRAC 24, recognize the DHCPDISOVER message, and forward it to one or more DHCP 66 servers 160 associated with one or more network host interfaces 162 available on CMTS 12. Since DHCP 66 giaddr-field 130 is already non-zero, the DHCP proxies leave DHCP 66 giaddr-field 130 intact. In another embodiment of the present invention, TRAC 24 includes DCHP 66 proxy 158 functionality and no separate DHCP 66 proxies 158 are used.

At step 282 in FIG. 15B, the one or more DHCP servers 160 receive the DHCPDISCOVER message from one or more DHCP proxies, and generate one or more DHCPOFFER messages to offer connection services for one or more network host interfaces 162 available on CMTS 12 with the fields set as illustrated in Table 7. The one or more DHCP servers 160 send the one or more DHCPOFFER messages to the address specified in DHCP 66 giaddr-field 130 (e.g., CM 16 or a BOOTP relay agent on CPE 18), which is an IP 54 address already contained in an ARP or other routing table in CMTS 12. Since CMTS 12 also functions as a relay agent for the one or more DHCP servers 160, the one or more DHCPOFFER messages are received on CMTS 12 at step 284.

CMTS 12 examines DHCP 66 yiaddr-field 126 and DHCP 66 giaddr-field 130 in the DHCPOFFER messages, and sends the DHCPOFFER messages down cable network 14 to IP 54 address specified in the giaddr-field 130. The MAC 44 address for CM 16 is obtained through a look-up of the hardware address associated with DHCP 66 chaddr-field 130. If the BROADCAST bit in DHCP 66 flags-field 122 is set to one, CMTS 12 sends the DHCPOFFER message to a broadcast IP 54 address (e.g., 255.255.255.255), instead of the address specified in DHCP 66 yiaddr-field 126. CMTS 12 does not update its ARP or other routing tables based upon the broadcast DCHP 66 yiaddr-field 126 DHCP 66 chaddr-field 132 address pair.

Returning to FIG. 15B, CM 16 receives the one or more DHCPOFFER messages and forwards them to CPE 18 at step 286. CM 16 uses the MAC 44 address specified determined by DHCP 66 chaddr-field 132 look-up in its routing tables to find the address of CPE 18 even if the BROADCAST bit in DHCP 66 flags-field 122 is set. At step 290, CPE 18 receives the one or more DHCPOFFER messages from CM 16. At step 292, CPE 18 selects one of the DHCPOFFER messages to allow a virtual connection to be established between data network 28 and CPE 18. Method 266 accomplishes addressing network interface hosts from CPE 18 in data-over-cable system 10 without extensions to the existing DHCP protocol.

Figure 16A:
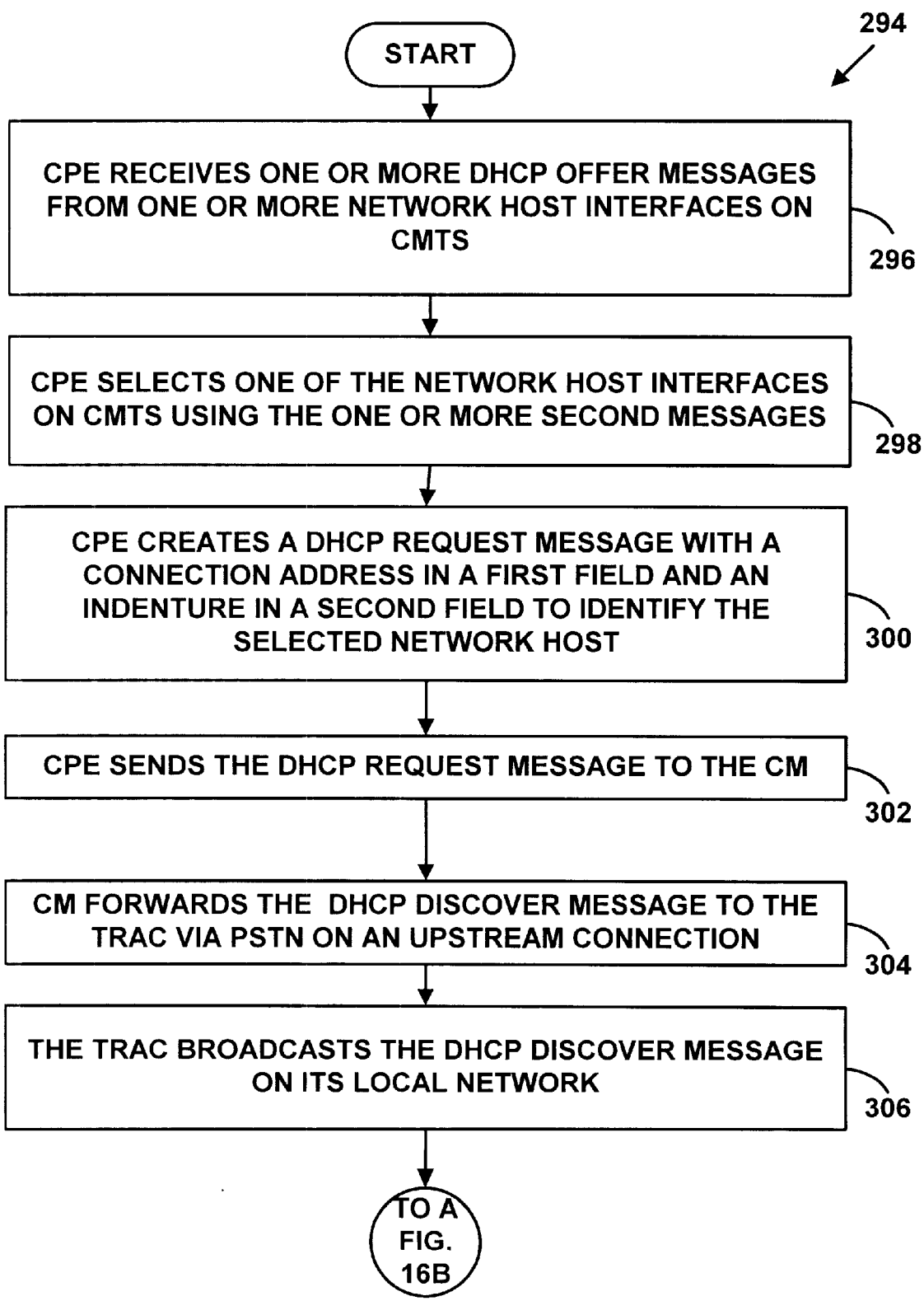

FIGS. 16A and 16B are a flow diagram illustrating a method 294 for resolving network host interfaces from CPE 18. At step 296, CPE 18 receives the one or more DHCPOFFER messages from one or more DHCP 66 servers associated with one or more network host interface available on CMTS 12. At step 298, CPE 18 chooses one offer of services from a selected network host interface. At step 300, CPE 18 generates a DHCPREQUEST message with the fields set as illustrated in Table 8 above with addresses for CPE 18 instead of CM 16. However, more or fewer fields could also be set. At step 302, CPE 18 sends the DHCPREQUEST message to CM 16. At step 304, CM 16 forwards the message to TRAC 24 via PSTN 22.

At step 306, a DHCP 66 layer on TRAC 24 broadcasts the DHCPREQUEST message on its local network leaving DHCP 66 giaddr-field 130 intact since it already contains a non-zero value. TRAC's 24 local network includes connections to one or more DHCP 66 proxies. The DHCP 66 proxies accept DHCP 66 messages originally from CPE 18 destined for DHCP 66 servers associated with network host interfaces available on CMTS 12. In another embodiment of the present invention, TRAC 24 provides the DHCP 66 proxy finctionality, and no separate DHCP 66 proxies are used.

One or more DHCP 66 proxies on TRAC's 24 local network recognize the DHCPOFFER message and forward it to one or more of the DHCP 66 servers associated with network host interfaces (e.g., IP 54 interfaces) available on CMTS 12 at step 308 in FIG. 16B. Since DHCP 66 giaddr-field 130 in the DHCPDISCOVER message sent by CPE 18 is already non-zero, the DHCP 66 proxies leave DHCP 66 giaddr-field 130 intact.

One or more DHCP 66 servers for the selected network host interfaces (e.g., IP 54 interface) available on CMTS 12 receive the DHCPOFFER message at step 310. A selected DHCP 66 server recognizes a DHCP 66 server identifier in DHCP 66 sname-field 134 or the IP 54 address that was sent in the DCHPOFFER message in the DHCP 66 yiaddr-field 126 from the DHCPREQUST message for the selected DHCP 66 server.

The selected DHCP 66 server associated with network host interface selected by CPE 18 in the DHCPREQUEST message creates and sends a DCHP acknowledgment message ("DHCPACK") to CMTS 12 at step 312 using the DHCP 66 giaddr-field 130. The DHCPACK message is sent with the message fields set as illustrated in Table 9. However, other field settings can also be used. DHCP 66 yiaddr-field contains the IP 54 address for the selected network host interface available on CMTS 12 for receiving data packets from data network 28 for CPE 18.

At step 314, CMTS 12 receives the DHCPACK message. CMTS 12 examines the DHCP 66 giaddr-field 130 and looks up that IP address in its ARP table for an associated MAC 44 address. This is a MAC 44 address for CM 16, which sent the DHCPREQUEST message from CPE 18. CMTS 12 uses the MAC 44 address associated with the DHCP 66 giaddr-field 130 and the DHCP 66 yiaddr-field 126 to update its routing and ARP tables reflecting this address pairing at step 316. At step 318, CMTS 12 sends the DHCPACK message on a downstream channel on cable network 14 to the IP 54 and MAC 44 addresses, respectively (i.e., to CM 16). If the BROADCAST bit in the DHCP 66 flags-field 122 is set to one, CMTS 12 sends the DHCPACK message to a broadcast IP 54 address (e.g., 255.255.255.255), instead of the address specified in the DHCP 66 yiaddr-field 126. CMTS 12 uses the MAC 44 address associated with the DHCP 66 chaddr-field 130 even if the BROADCAST bit is set.

CM 16 receives the DHCPACK message. It examines the DHCP 66 yiaddr-field 126 and chaddr-field 132, and updates its routing table and an ARP routing table to reflect the address pairing at step 320. At step 322, CM 16 sends the DHCPACK message to CPE 18 via CMCI 20 at IP 54 and MAC 44 addresses respectively from its routing tables. If the BROADCAST bit in the DHCP 66 flags-field 122 is set to one, CM 16 sends the downstream packet to a broadcast IP 54 address (e.g., 255.255.255.255), instead of the address specified in DHCP 66 yiaddr-field 126. CM 16 uses the MAC 44 address specified in DHCP 66 chaddr-field 132 even if the BROADCAST bit is set to located CPE 18. At step 324, CPE 18 receives the DHCPACK from CM 16 and has established a virtual connection to data network 28.

In the event that CPE 18 is not compatible with the configuration received in the DHCPACK message, CPE 18 may generate a DHCP 66 decline ("DHCPDECLINE") message and send it to CM 16. CM 16 will transmit the DHCPDECLINE message up the PPP 50 link via PSTN 22 to TRAC 24. On seeing a DHCPDECLINE message TRAC 24 sends a unicast copy of the message to CMTS 12. CM 16 and CMTS 12 examine the DHCP 66 yiaddr-field 126 and giaddr-field 130, and update their routing and ARP tables to flush any invalid pairings.

Upon completion of methods 266 and 292, CM 16 CMTS 12 have valid IP/MAC address pairings in their routing and ARP tables. These tables store the same set of IP 54 addresses, but does not associate them with the same MAC 44 addresses. This is because CMTS 12 resolves all CPE 18

IP 54 addresses to the MAC 44 address of a corresponding CM 16. The CMs 16, on other hand, are able to address the respective MAC 44 addresses of their CPEs 18. This also allows DHCP 66 clients associated with CPE 18 to function normally since the addressing that is done in CM 16 and CMTS 12 is transparent to CPE 18 hosts.

Figure 17:
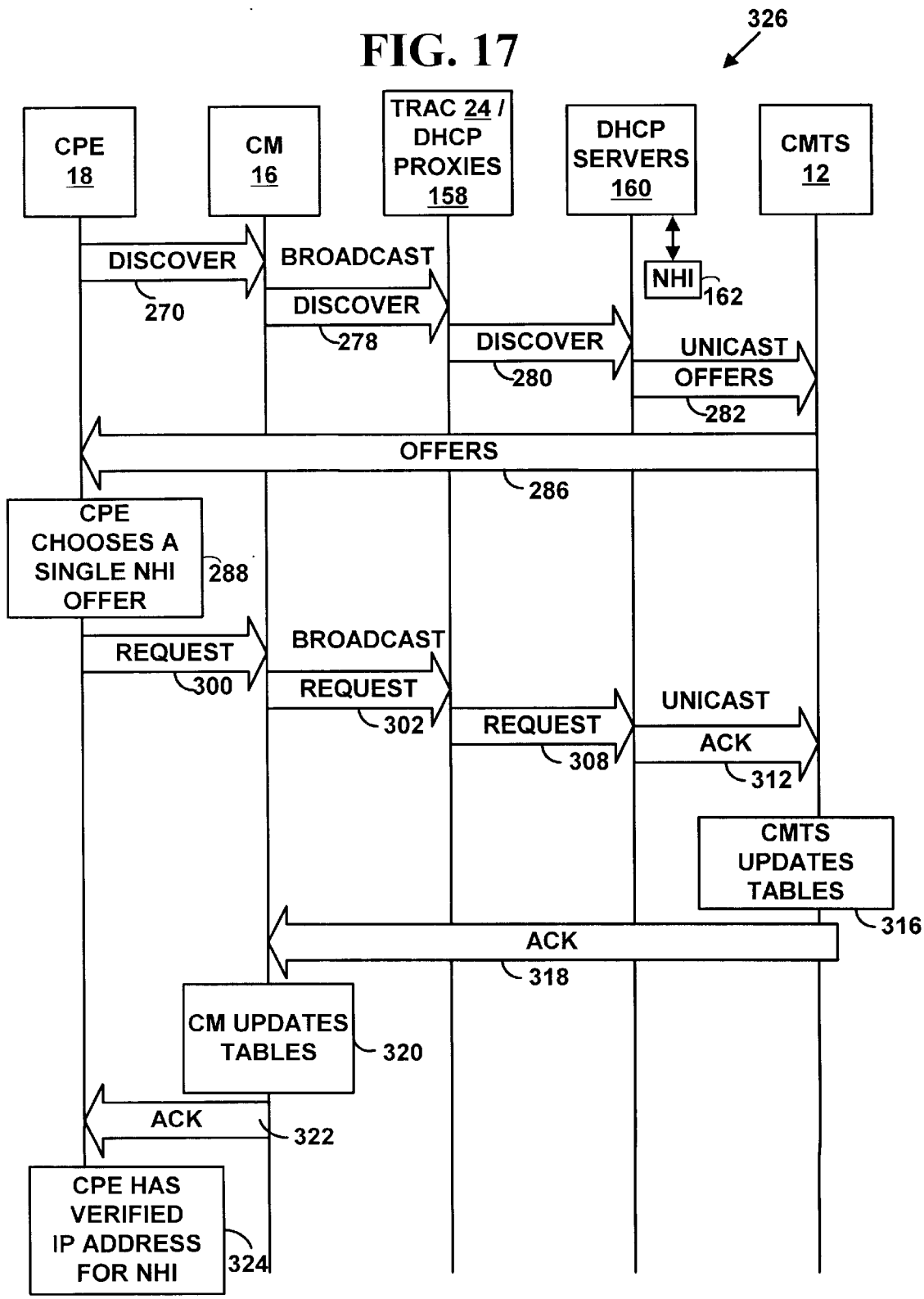
FIG. 17 is a block diagram illustrating a message flow for the methods in FIGS. 15A, 15B, and 16A and 16B.

FIG. 17 is a block diagram illustrating a message flow 326 for methods 268 and 294 in FIGS. 15A, 15B, and 16A and 16B. Message flow 326 illustrates a message flow for methods 268 and 294, for a data-over-cable system with and without telephony return. In another embodiment of the present invention, CM 16 forwards requests from CPE 18 via an upstream connection on cable network 14 to DHCP servers 160 associated with one or more network host interfaces available on CMTS 12.

Method 268 and 294 accomplishes resolving addresses for network interface hosts from customer premise equipment in a data-over-cable with or without telephony return without extensions to the existing DHCP protocol. Methods 268 and 294 of the present invention are used in data-over-cable system 10 with telephony return. However, the present invention is not limited to data-over-cable system 10 with telephony return and can be used in data-over-cable system 10 without telephony return by using an upstream cable channel instead of an upstream telephony channel.

Using the initialization sequences described above (FIG. 12), CM 16 obtains configuration parameters at the beginning of every session on data-over-cable system 10. CM 16 uses an IP 54 address and a configuration file name obtained in a DHCP 66 response message during initialization to establish connections to data-over-cable system 10. CM 16 initiates a TFTP 64 exchange to request the configuration file obtained in the DHCP 66 response message. The configuration file name obtained by CM 16 includes required configuration parameters for initialization and additional parameters for Class-of-Service and Quality-of-Service. The configuration parameters obtained in the required configuration file and additional parameters are sent from CM 16 to CMTS 12 in a registration message.

Quality-of-service in a Data-over-cable System

During initialization, individual cable modems request upstream and downstream connections with different Class-of-Service ("CoS") and Quality of Service ("QoS") to/from CMTS 12 on cable network 14. If telephony return is used, then cable modems request downstream CoS and QoS connections from CMTS 12 on cable network 14. As is known in the art, CoS provides a reliable (e.g., error free, in sequence, with no loss of duplication) transport facility independent of the QoS. QoS collectively specifies the performance of the network service that a device expects on a network. The CoS and QoS connections are requested with a registration message sent from CM 16 to CMTS 12.

Figure 18:
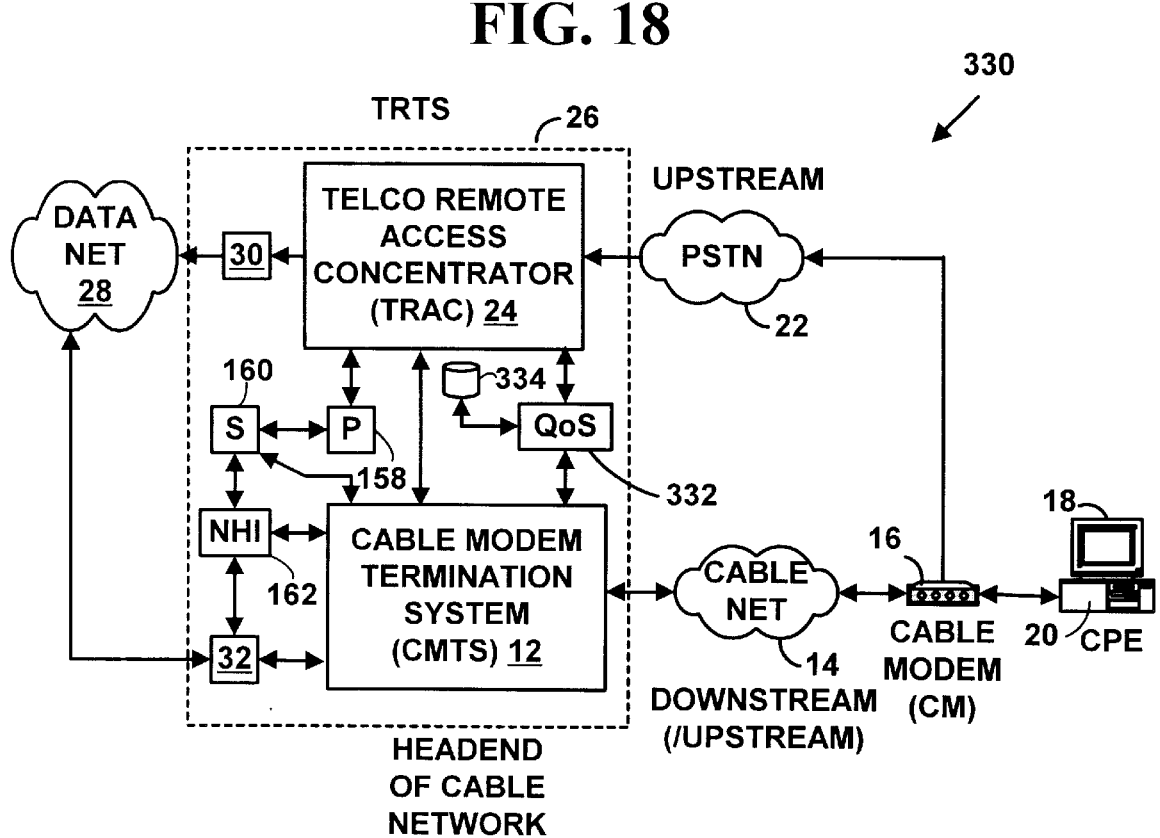
FIG. 18 is a block diagram illustrating data-over-cable system with a quality-of-service server.

FIG. 18 is a block diagram illustrating data-over-cable system 330 used for a preferred embodiment of the present invention. Data-over-cable system 330 is similar to the data over cable system illustrated in FIG. 8. However, FIG. 18 illustrates a QoS server 332 used to determine whether CMTS 12 has available bandwidth to provide a specific quality-of-service request to a CM 16. A quality-of-service bandwidth request includes bandwidth allocated for CoS, QoS and other related parameters and is hereinafter called "quality-of-service "bandwidth request". QoS server 332 handles CoS, QoS and other related parameters and is hereinafter called a "QoS server" for the sake of simplicity. QoS server 332 maintains multiple quality-of-service identifiers allocated with a database 334 for CoS and other QoS designations. The multiple quality-of-service identifiers are an indication of CoS, QoS and other related parameters requested by CM 16 and are collectively called "quality-of-service identifiers" for the sake of simplicity. FIG. 18 illustrates QoS server 332 separate from CMTS 12 in TRTS 26. However QoS server 332 may also be integral to CMTS 12 (e.g., as a dedicated QoS process running on CMTS 12 or integrated into DHCP 66 server 160).

In addition to the configuration information from the configuration file sent to CMTS 12 by CM 16, one or more of Type-of-Service, Flow Identification Definition, Service Identifier, Multi-cast group or Number of CPEs configuration parameters may be added to the registration request message to request a specific quality-of-service connection. However, more or fewer additional configuration parameters in different formats could also be added to the registration request. CoS, QoS, Type-of-Service, Flow Identification Definition, Service IDentifier, Multi-cast group and Number of CPEs configuration parameters in TLV format are illustrated in Tables 10–20. However, other values and layouts could also be used.

Table 10 illustrates exemplary CoS (e.g., class one and class two) in TLV format. However, more or fewer classes of service along with other values could also be used. CoS parameters include maximum downstream data rates in bits-per-second ("bps"), maximum upstream data rate in bps, upstream channel priority, guaranteed minimum data rates in bps, guaranteed maximum data rate in bps and other parameters. Table 10 illustrates CoS values as a TLV Value sub-type, Length Value format. However, other layouts could also be used.

TABLE 10

| Type | Length | Value (sub)type | Length | Value | Description of Value |
|---|---|---|---|---|---|
| 4 | 28 | 1 | 1 | 1 | CoS-1 |
| 4 | 28 | 2 | 4 | 10,000,000 | Maximum forward rate of 10 Mbps |
| 4 | 28 | 3 | 4 | 2,000,000 | Maximum return rate of 2 Mbps |
| 4 | 28 | 4 | 1 | 5 | Return path priority of 5 |
| 4 | 28 | 5 | 4 | 64,000 | Minimum guaranteed rate of 64 kbps |
| 4 | 28 | 6 | 2 | 100 | Maximum transmission burst of 100 mini-slots |
| 4 | 28 | 1 | 1 | 2 | CoS-2 |
| 4 | 28 | 2 | 4 | 5,000,000 | Maximum forward rate of 5 Mbps |
| 4 | 28 | 3 | 4 | 1,000,000 | Maximium return rate of 1 Mbps |
| 4 | 28 | 4 | 1 | 3 | Return priority path of 3 |
| 4 | 28 | 5 | 4 | 32,000 | Minimuim guaranteed rate of 32 kbps |
| 4 | 28 | 6 | 2 | 50 | Maximum transmission burst of 50 mini-slots |

QoS parameters include transit delay expected to deliver data to a specific destination, the level of protection from unauthorized monitoring or modification of data, cost for delivery of data, expected residual error probability, the relative priority associated with the data and other parameters.

Table 11 illustrates QoS parameters as Flow Identifiers in TLV format. However, more or fewer flow identifiers could also be used.

TABLE 11

| Type/Subtype | Length | Description of Value |
|---|---|---|
| Ax | N | Flow Class Definition Header |
| A0 | 4 | Flow Class Identifier |
| A1 | 1 | Flow Type |
| A2 | 1 | Ethernet precedence and TOS |
| A3 | 1 | ATM flow subtype |
| A4 | 6 | Minimum number of bytes/sec |
| A5 | 6 | Maximum number of bytes/sec |
| A6 | N | Cell Error Ratio |
| A7 | N | Cell Loss Ratio |
| A8 | N | Cell Mis-insertion Rate |
| A9 | N | Mean Cell Transfer Delay |
| A10 | N | Cell Variation Delay |
| A11–A127 | N | Reserved |
| A128–A255 | N | Vendor Specific |

Table 12 illustrates Type-Of-Service sub-TLV information for QoS parameters. However, more or fewer TOS parameters could also be used.

TABLE 12

| Type of Service (TOS) | Bit-0 | Bit-1 | Bit-2 | Bit-3 | Decimal Value |
|---|---|---|---|---|---|
| Maximize Delay | 1 | 0 | 0 | 0 | 1 |
| Maximize Throughput | 0 | 1 | 0 | 0 | 2 |
| Maximize Reliability | 0 | 0 | 1 | 0 | 4 |
| Minimize Cost | 0 | 0 | 0 | 1 | 8 |
| Normal Service | 0 | 0 | 0 | 0 | 0 |

Table 13 illustrates Flow Identifier Values (Type A0, Table 11). However, more or fewer flow identifier values could also be used.

TABLE 13

| Flow Identifier Value (4-bytes) | Definition of Value |
|---|---|
| 0 | The packet is to be sent to the network without any special treatment. |
| 1 | The packet is to be sent to the network using a precedence (i.e., priority) and TOS. |
| 2 . . . 255 | Reserved. |

Table 14 illustrates Flow type (Type A1, Table 11). However, more or fewer flow types could also be used.

TABLE 14

| Flow type | Definition |
|---|---|
| 1 | IP 54 |
| 2 | ATM |
| 3 . . . 255 | Reserved |

Table 15 illustrates Asynchronous Transport Mode ("ATM") Flow sub-type (Type A3, Table 11). However, more or fewer ATM flow sub-types could also be used.

TABLE 15

| ATM Flow Sub-type | Definition |
|---|---|
| 1 | Universal Bit Rate ("UBR") |
| 2 | Constant Bit Rate ("CBR") |
| 3 | Adaptable Bit Rate ("ABR") |
| 4 | Variable Bit Rate ("VBR") |

CM 16 adds Service IDentifiers ("SIDs") to the registration message sent to CMTS 12. SIDs provide device identification, QoS and CoS management. In particular, they are integral to bandwidth identification. A SID defines a particular mapping between CM 12 and CMTS 16. This mapping is the basis on which bandwidth is allocated to CM 16 by CMTS 12 CoS and QoS is implemented. Within MAC 44, SIDs are unique and CMTS 12 may assign one or more SIDs to each CM 16, corresponding to the CoS or QoS required by CM 16. Table 16 illustrates SID parameters in TLV format. However, more or fewer SID parameters could also be used.

TABLE 16

| Type/Subtype | Length | Description of Value | Default Value |
|---|---|---|---|
| Bx | N | Service Identifier Header | |
| B0 | 1 | Service Identifier Type | 0 |
| B1 | 1 | Number of Service Identifier's (SIDs) to be given with this definition | 1 |
| B2 | 4 | Flow Identifier for SIDs | 0 |
| B3 | 4 | CoS for SIDs | 0 |
| B4 | 4 | Source IP 54 address | CM's IP 54 address |
| B5 | 4 | Source IP 54 address mask | 255.255.255.255 |
| B6 | 4 | Destination IP 54 address | 255.255.255.255 |
| B7 | 4 | Destination IP 54 address mask | 255.255.255.255 |
| B8 | 1 | IP Protocol Type | 256 |
| B9 | 4 | Source Port (Start) | 0 |
| B10 | 4 | Source Port (End) | 65,535 |
| B11 | 4 | Destination Port (Start) | 0 |
| B12 | 4 | Destination Port (End) | 65,535 |
| B13 | 1 | Precedence and TOS | 0 |
| B14 | 1 | Precedence and TOS Mask | 255 |
| B15 | N | Multicast group definition | Null string"" |
| B16 | 4 | Protocol Type | 0xffffffff |
| B17–B127 | N | Reserved | |
| B128–B255 | N | Vendor Specific | |

Table 17 illustrates multicast and unicast Service Identifier Type (Type B0, Table 16) values. However, more or fewer service identifier types could also be used.

TABLE 17

| Service Identifier Type Value | Value Definition |
|---|---|
| 1 | Outgoing unicast from CM 16 |
| 2 | Outgoing multicast from CM 16 |
| 3 | Incoming unicast to CM 16 |
| 8 | Outgoing multicast to CM 16 |

Table 18 illustrates IP Protocol Type values (Type B8, Table 16). However, more or fewer IP protocol types could also be used.

TABLE 18

| IP Protocol Type Value | Value Definition |
| --- | --- |
| 1 | ICMP 56 |
| 2 | Transmission Control Protocol ("TCP") |
| 4 | UDP 60 |
| 256 | Any Protocol |

Table 19 illustrates Protocol Type values (Type B16, Table 16). However, more or fewer protocol types could also be used.

TABLE 19

| Protocol Type Value | Value Definition |
| --- | --- |
| 0 | No Protocols Allowed |
| 1 | IP 54 |
| 2 | Internet Packet eXchange ("IPX") |
| 4 | Appletalk |
| 8 | ATM |
| 0xffffffff | All protocols allowed |

Table 20 illustrates the Number of CPEs 18 that can connect to CM 16 during a session. However, more or fewer number of CPEs could also be used.

TABLE 20

| Type | Length | Description of Value | Default |
| --- | --- | --- | --- |
| H | 2 | Number of CPEs 18 that can connect to CM 16 during a session | 1 = CPE 18 or 0xffffffff = any number of CPEs 18 |

Figure 19:
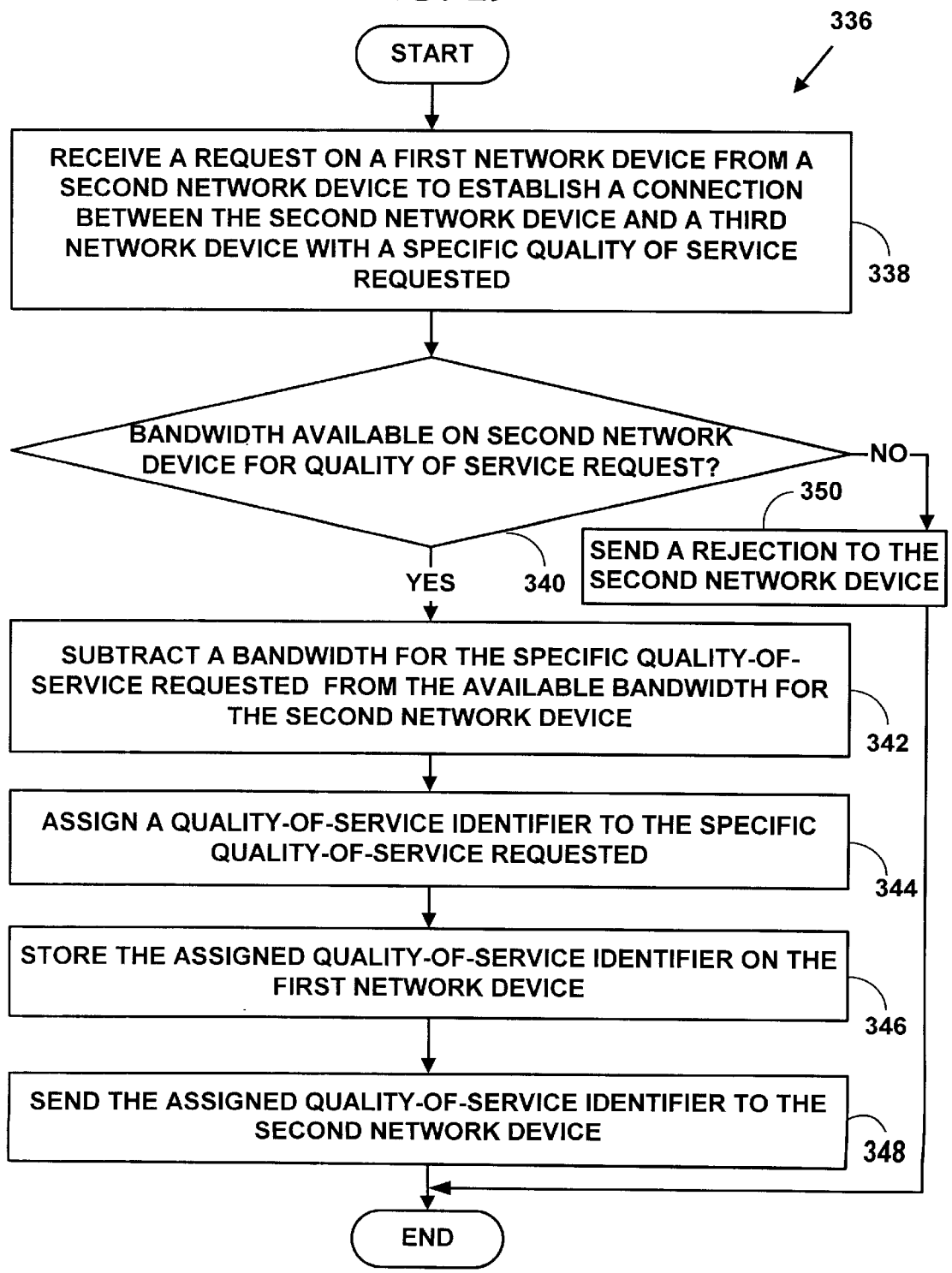
FIG. 19 is a flow diagram illustrating a method for providing quality-of-service for a network device in a data over cable-system.

FIG. 19 is a flow diagram illustrating a method 336 for providing quality of service for a network device in a data over-cable-system. Method 336 includes receiving a request on a first network device from a second network device to establish a connection between the second network device and a third network device with a specific quality-of-service at step 338. The quality-of-service request includes bandwidth for CoS, QoS and other parameters. The first network device determines whether the second network device has enough available bandwidth to establish the connection to the third network device with the specific quality-of-service requested at step 340. The bandwidth determination includes a bandwidth determination required for CoS, QoS and other parameters. If the first network device has enough bandwidth to establish the connection to the third network device with the specific quality-of-service at step 340, a bandwidth required for the specific quality-of-service is subtracted from an available bandwidth for the second network device at step 342. At step 344, a quality-of-service identifier is assigned to the specific quality-of-service bandwidth requested. The quality-of-service identifier is assigned based on bandwidth required CoS, QoS and other parameters. The assigned quality-of-service identifier is saved on the first network device at step 346. The assigned quality-of-service identifier is sent to the second network device indicating the second network device has enough bandwidth to allow the connection with the specific quality-of-service requested at step 348. If the first network device does not have enough available bandwidth to establish the connection to the third network device with the specific quality-of-service requested by the third network device at step 340, a rejection is sent to the first network device at step 350.

In a preferred embodiment of the present invention, the first network device is QoS server 332, the second network device is CMTS 12 and the third network device is CM 16. The quality-of-service identifiers are additional SIDs (Table 16). In another embodiment of the present invention, the quality-of-service identifiers are not additional SIDs (Table 16), but are a new type of identifier used in data-over-cable system 330. However, the present invention is not limited to these network devices quality-of-service identifiers and other network devices and quality-of-service identifiers could also be used. Method 336 moves handling and allocation of bandwidth for CM 16 from CMTS 12 to QoS server 332.

Figure 20:
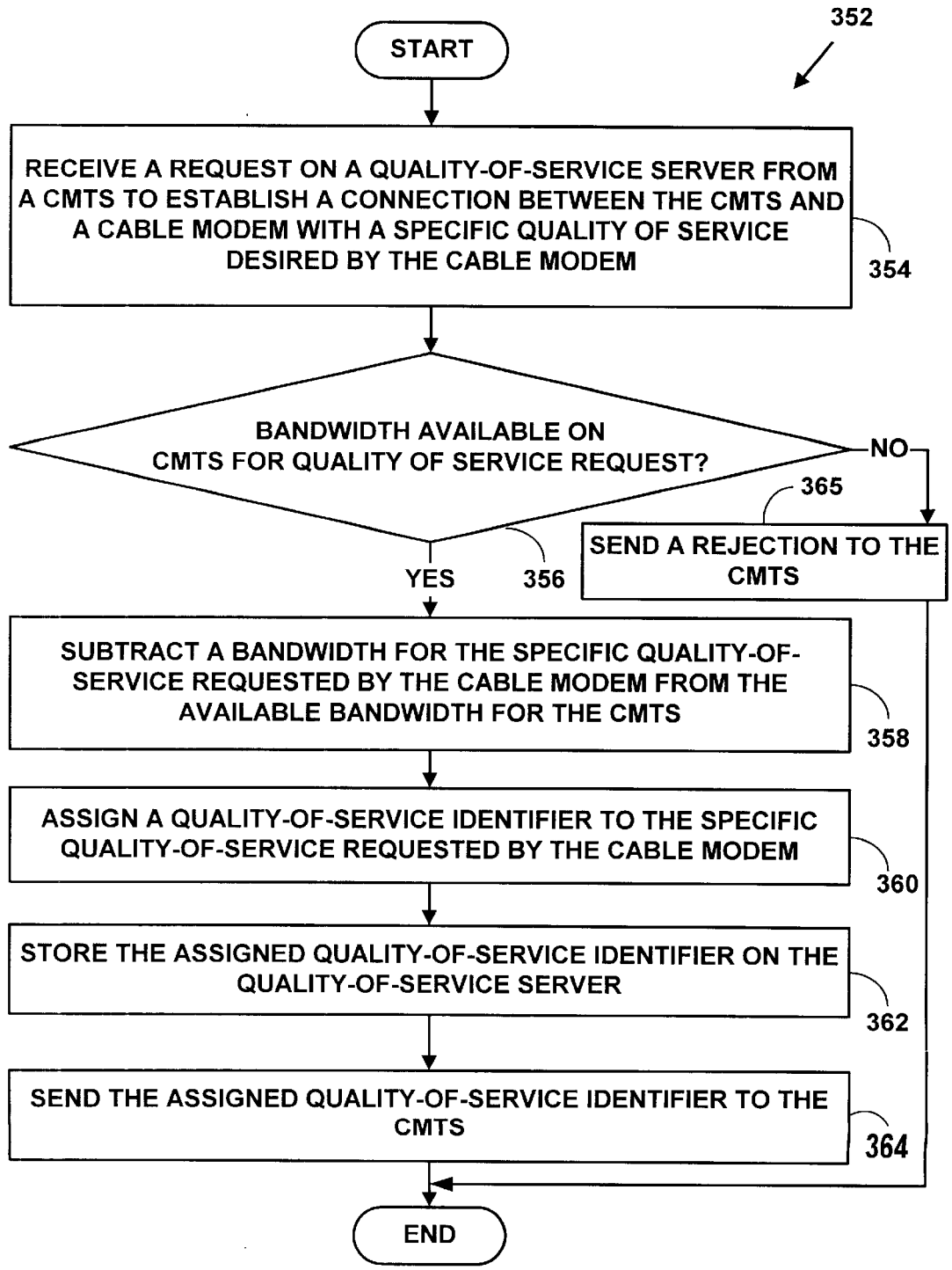
FIG. 20 is a flow diagram illustrating a method for providing quality-of-service to a cable modem.

FIG. 20 is flow diagram illustrating a method 352 for providing quality-of-service to a cable modem. At step 354, QoS server 332 receives a request from CMTS 12 to establish a connection between CMTS 12 and CM 16 with a specific quality-of-service requested by CM 16 (e.g., for CoS, QoS and other parameters in Tables 10–20). At step 356, QoS server 332 determines whether CMTS 12 has enough available bandwidth to establish the connection to CM 16 with the specific quality-of-service requested by CM 16. If CMTS 12 has enough bandwidth (e.g., for CoS, QoS and other parameters in tables 10–20) to establish the connection to CM 16 with the specific quality-of-service requested by CM 16, a bandwidth required for the specific quality-of-service requested by CM 16 is subtracted from an available bandwidth for CMTS 12 at step 358. At step 360, a quality-of-service identifier is assigned to the specific quality-of-service bandwidth requested by CM 16. The assigned quality-of-service identifier is saved on QoS server at step 362. At step 364, The assigned quality-of-service identifier source identifier is sent to CMTS 12 indicating that CMTS 12 has enough bandwidth to allow the connection with the specific quality-of-service requested by CM 16. If CMTS 12 does not have enough available bandwidth to establish the connection to CM 16 with the specific quality-of-service requested by CM 16 at step 340, a rejection is sent to CMTS 12 at step 365.

Figure 21:
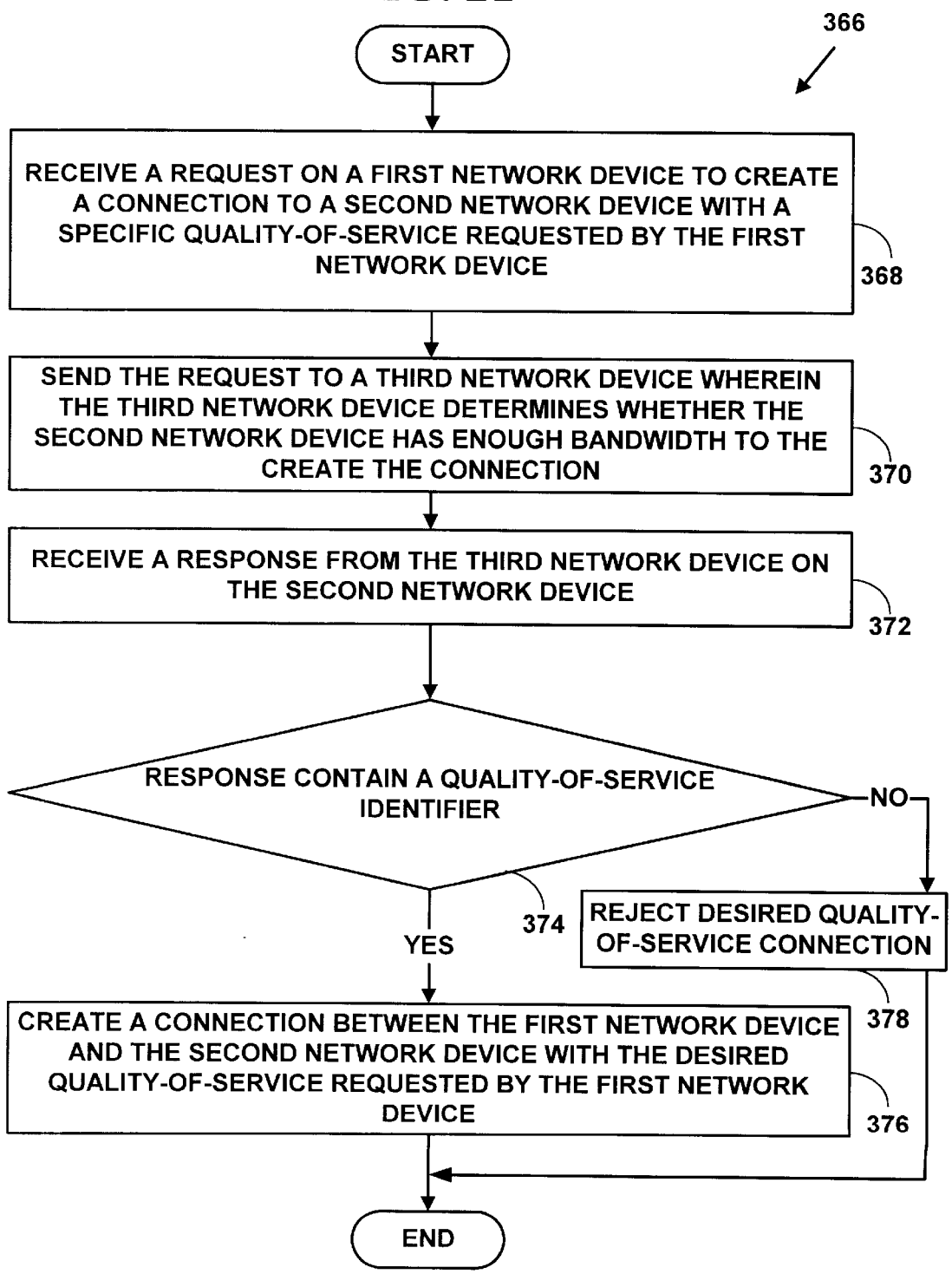
FIG. 21 is a flow diagram illustrating a method for determining quality-of-service from a network device.

FIG. 21 is a flow diagram illustrating a method 366 for determining quality-of-service on a network device. At step 368, a request is received on a first network device from a second network device, the request including a request to establish a connection between the second network device and the first network device with a specific quality-of-service. At step 370, the request is sent to a third network device to determine whether the second network device has enough bandwidth to establish the connection to the first network device with the specific quality-of-service requested. At step 372, a response is received from the third network device. At step 374, a test is conducted to determine whether the response contains a quality-of-service identifier for the specific quality-of-service requested by the first network device. The quality-of-service identifier indicates that the second network device has enough available bandwidth to establish the connection. If the response contains a quality-of-service service identifier, at step 376 the second network device creates a connection to the first network device with the specific quality-of-service requested. If the response does not contain a quality-of-service identifier, a rejection is sent from the first network device to the second network device at step 378.

In a preferred embodiment of the present invention, the first network device is CMTS 12, the second network device is CM 16 and the third network device is QoS server 332. However, other network devices could also be used and the present invention is not limited to these network devices.

Figure 22:
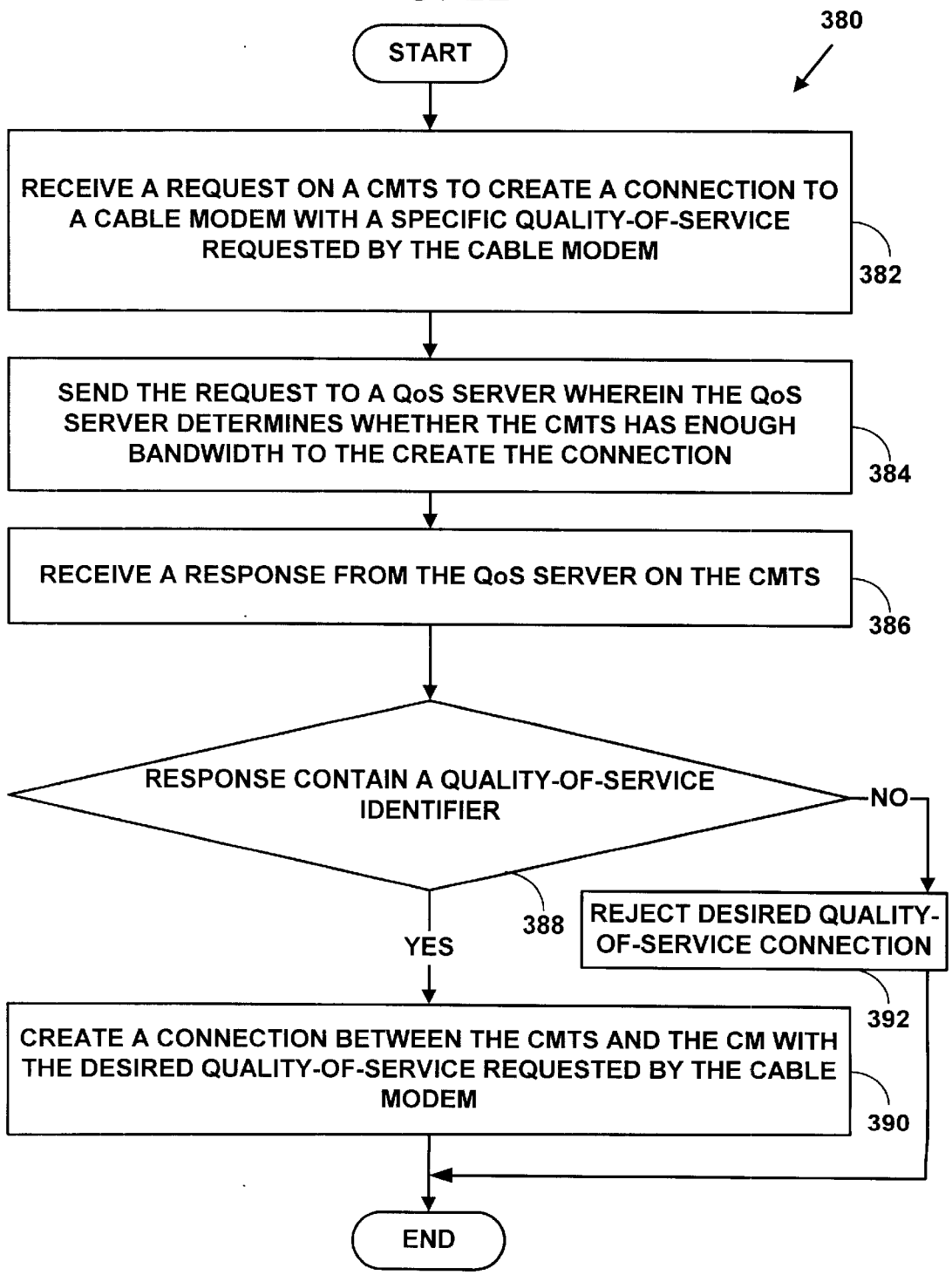
FIG. 22 is a flow diagram illustrating a method for determining quality-of-service from a cable modem termination system.

FIG. 22 is a flow diagram illustrating a method 378 for determining quality-of-service from CMTS 12. At step 380, a request is received on CMTS 12 from CM 16, the request including a request to establish a connection between CMTS 12 and CM 16 with a specific quality-of-service requested by CM 16. At step 382, the request is sent to QoS server 332 to determine whether CMTS 12 has enough bandwidth to establish the connection to CM 16 with the specific quality-of-service requested by CM 16. At step 384, a response is received on CMTS 12 from QoS server 332. At step 386, a test is conducted to determine whether the response contains a quality-of-service identifier for the specific quality-of-service requested by CM 16. The quality-of-service identifier indicates that CMTS 12 has enough available bandwidth to establish the connection. If the response contains a quality-of-service identifier, at step 376 CMTS 12 creates a connection to CM 16 with the specific quality-of-service requested by CM 16. If the response does not contain a quality-of-service identifier, a rejection is sent from CMTS 12 to CM 16 at step 378.

Table 21 illustrates an exemplary registration message sent to CMTS 12 by CM 16. CMTS 12 sends the information from Table 21 to QoS server 332 using method 352. QoS server 332 returns a quality-of-service identifier if CMTS 12 has enough bandwidth to service the request.

TABLE 21

| Type | Length | Value (sub)type | Length | Value | Description of Value |
|---|---|---|---|---|---|
| 4 | 28 | 1 | 1 | 1 | (CoS-1) (Table 10) |
| 4 | 28 | 2 | 4 | 10,000,000 | Maximum forward rate of 10 Mbps |
| 4 | 28 | 3 | 4 | 2,000,000 | Maximum return rate of 2 Mbps |
| 4 | 28 | 4 | 1 | 5 | Return path priority of 5 |
| 4 | 28 | 5 | 4 | 64,000 | Minimum guaranteed rate of 64 kbps |
| 4 | 28 | 6 | 2 | 100 | Maximum transmission burst of 100 mini-slots |
| A | 28 | 0 | 4 | 1 | QoS Flow Class-1 (Table 12) |
| A | 28 | 2 | 1 | 8 | (Table 11) |
| A | 28 | 1 | 1 | 1 | IP 54 (Table 14) |
| A | 28 | 7 | 1 | 1 | 1000:1 |
| A | 28 | 10 | 1 | 5 | 1 millisecond |

Table 22 illustrates exemplary quality-of-service identifiers assigned by QoS server 332. However, other layouts and TLV parameters may be used.

TABLE 22

| Type | Length | Value/ (sub)type | Length | Value | Description |
|---|---|---|---|---|---|
| 1 | 7 | 1 | 1 | 1 | (CoS-1) (e.g., Table 10) |
| QoS | 7 | 2 | 2 | 128 | First QoS identifier for service class-i |
| 1 | 7 | 1 | 1 | 2 | CoS-2 (e.g., Table 10) |
| QoS | 7 | 2 | 2 | 244 | First QoS identifier for service class-2 |
| . | . | . | . | . | . |
| . | . | . | . | . | . |
| . | . | . | . | . | . |
| 1 | 7 | 1 | 1 | N | CoS-N |
| QoS | 7 | 2 | 2 | 345 | QoS identifier for service class-N |

Quality-of-service identifiers allocated by QoS server 332 are assigned and grouped according to the specific quality-of-service requests received. For example, if a first CM 16 made a quality-of-service request for CoS-1 illustrated in Table 20, QoS server 332 assigns a quality-of-service identifier of 128 to the request. If a second CM 16 made a quality-of-service request for CoS-1, QoS may assign a quality-of-service identifier of 129 to the request. Other requests for quality-of-service identifiers for CoS-1 continue with 130.

However, if a third.CM 16 made a quality-of-service request for CoS-2, QoS assigns a quality-of-service identifier starting at 244. This allocation allows QoS server 332 to group similar quality-of-service requests in a range of quality-of-service identifiers. For example, CoS-1 quality-of-service requests in the range 128–243, CoS-2 quality-of-service requests in the range 244–300, etc. Table 23 illustrates an exemplary grouping of quality-of-service requests. However, other groupings could also be used.

TABLE 23

| QoS identifier | Description |
|---|---|
| CoS-1 Identifiers | 12 Mbps (Table 10) |
| 128 | CoS-1 #1 |
| 129 | CoS-1 #2 |
| CoS-2 Identitiers | 6 Mbps (Table 10) |
| 244 | CoS-2 #1 |

In one embodiment of the present invention, QoS server determines bandwidth available on CMTS 12 with quality-of-service identifiers assigned to CMTS 12 and subtracting QoS bandwidth from an available bandwidth. For example, if CMTS 12 has a total available bandwidth of 1000 Mbps and has allocated ten CoS-1 quality-of-service requests at 12 Mbps each, and 5 CoS-2 quality-of-service requests at 6 Mbps each, then CMTS 12 has 850 Mbps of available bandwidth remaining (1000 Mbps–(10*12+5*6)Mbps=850 Mbps).

When CM 16 disconnects from CMTS 12, CMTS 12 sends a release message to QoS server 332 including a quality-of-service identifier for a requested quality-of-service connection by CM 16 that is being disconnected. QoS server 332 deletes the quality-of-service identifier (e.g., from Table 23) and adds a corresponding bandwidth associated with the quality-of-service identifier back into an available bandwidth for CMTS 12.

A preferred embodiment of the present invention is illustrated with interactions between CM 16, CMTS 12 and QoS 332. However, the present invention can also be practiced by making QoS requests directly to QoS server 332 directly from CM 16. In such an embodiment, CM 16 sends a quality-of-service identifier returned from QoS server 332 in a registration message to CMTS 12. CMTS 12 allocates a connection with a specific quality of service requested by CM 16 when a quality-of-service identifier is detected in the registration message, indicating that CMTS12 has available bandwidth for the specific quality-of-service request.

A preferred embodiment of the present invention is described for one CMTS 12 as is illustrated in FIG. 18. However, QoS server 332 can also be used to handle and balance CoS, QoS and other requests among multiple CMTS 12 (not illustrated in FIG. 18). For example, if CM 16 makes a connection request with a requested quality-of-service for a first CMTS 12, and first CMTS 12 does not have the available bandwidth, QoS server 332 directs a second CMTS with available bandwidth to respond to the connection request from CM 16.

A system for a preferred embodiment of the present invention includes a quality-of-service server (e.g., QoS server 332), for determining whether a first network device has enough available bandwidth to establish a connection to a second network device with a specific quality-of-service requested by the second network device. The quality-of-service server provides support for class-of-service, quality-of-service and other parameters. The system also includes multiple quality-of-service identifiers, for identifying a transmission bandwidth required for a specific quality-of-service requested by a second network device, wherein a value for a quality-of-service identifier is determined by the quality-of-service bandwidth requested by class-of-service, quality-of-service and other parameters. In a preferred embodiment of the present invention, the quality-of-service server is QoS server 332, the first network device is CMTS 12 and the second network device is CM 16. However, the present invention is not limited to these network devices and other network devices could also be used.

Providing Quality-of-service with Configuration Protocol Messaging

Most data-over-cable systems in the prior art already use Dynamic Host Configuration Protocol ("DHCP") as a standard messaging protocol to allocate network addresses such as Internet Protocol ("IP") addresses. It is desirable to also use a standard messaging protocol for requesting and allocating static and dynamic bandwidth for various quality-of-service settings from quality-of-service servers used in data-over-cable systems. Quality-of-service settings include class-of-service, quality-of-service and other parameters (e.g., Tables 10–20), and hereinafter are collectively called "quality-of-service" settings for the sake of simplicity.

As was described above, the configuration parameters obtained in a configuration file and additional class-of-service and quality-of-service parameters are sent from CM 16 to CMTS 12 in a registration message. A quality-of-service server determines whether CMTS 12 has enough available bandwidth to create a connection with a quality-of-service requested by CM 16.

Figure 23:
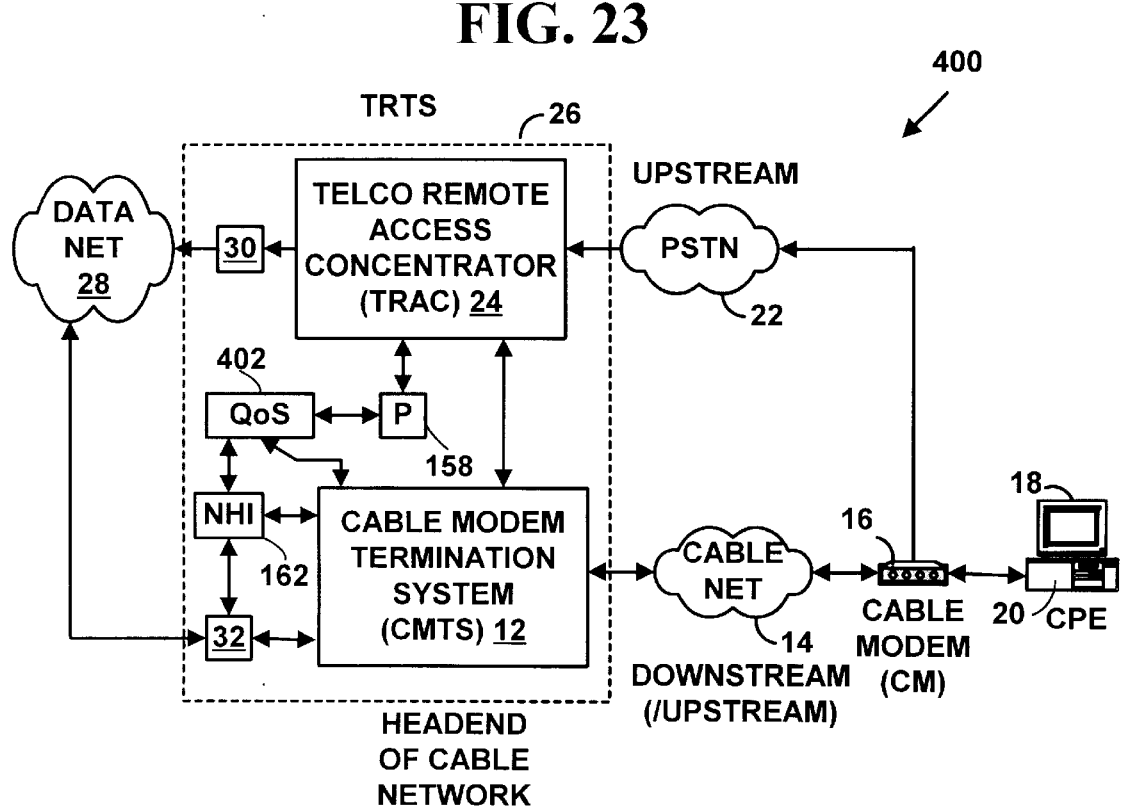
FIG. 23 is a block diagram illustrating a data-over-cable system with a quality-of-service server.

FIG. 23 is a block diagram illustrating a data-over-cable system 400 with a QoS server 402 that is also a DHCP 66 server. QoS server 402 determines if CMTS 12 has available bandwidth for network devices such as CM 16 for quality-of-service requests in data-over-cable system 400 using DHCP 66 messaging. Bandwidth is allocated for class-of-service, quality-of-service and other parameters and is hereinafter collectively referred to as "quality-of-service" bandwidth for the sake of simplicity. FIG. 23 is similar to FIG. 18 except DHCP server 160 includes quality-of-service capabilities and is illustrated as QoS server 402. In a preferred embodiment of the present invention, DHCP server 160 is integral to QoS server 402. In such an embodiment, QoS server 402 is used to provide DHCP 66 finctionality as described above as well as quality-of-service functionality. In another embodiment of the present invention, quality-of-service server 402 is a separate server with DHCP 66 and quality-of-service capabilities (e.g., server 332 FIG. 18). In such an embodiment, DHCP server 160 is used for DHCP 66 messaging and QoS server 402 provides quality-of-service capabilities with DHCP 66 messaging.

Figure 24:
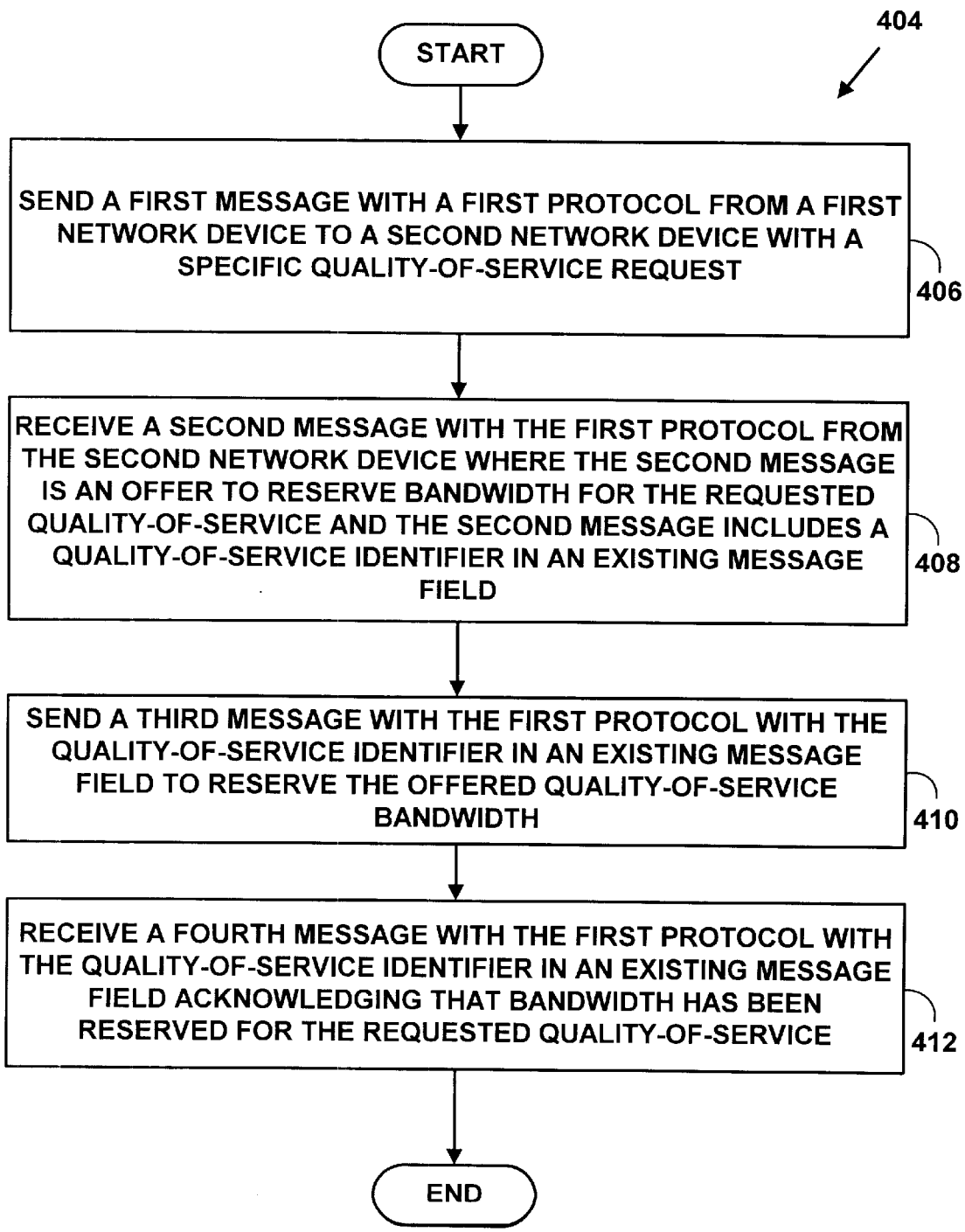
FIG. 24 is a flow diagram illustrating a method for determining quality-of-service.

FIG. 24 is a flow diagram illustrating a method 404 for determining quality-of-service. At step 406, a first message is sent with a first protocol from a first network device to a second network device. The first message includes a request to determine if the first network device has enough available bandwidth to create a connection to a third network device with a specific quality-of-service. The quality-of-service request includes bandwidth for class-of-service, quality-of-service and other parameters. At step 408, a second message is received on the first network device with the first protocol from the second network device in response to the first message. The second message is an offer to reserve bandwidth on the first network device for the specific quality-of-service requested. The second message includes a quality-of-service identifier for the specific quality-of-service requested in an existing message field for the first protocol. The second message is sent by the second network device with method 336 (FIG. 19), if the first network device has enough available bandwidth to provide a connection with the specific quality-of-service requested. If the first network device does not have enough available bandwidth to provide a connection for the specific quality-of-service requested, the second network device sends a fifth message as a rejection message, indicating no bandwidth is available. At step 410, a third message is sent with the first protocol from the first network device to the second network device with the quality-of-service identifier in an existing message field. The third message is a request to reserve bandwidth on the first network device for the specific quality-of-service requested. At step 412, a fourth message is received with the first protocol from the second network device on the first network device with the quality-of-service identifier in an existing message field indicating bandwidth for the specific quality-of-service requested by the third network device has been reserved on the second network device.

In a preferred embodiment of the present invention, the first network device is CMTS 12, the second network device is quality-of-service server 402 and the third network device is CM 16. The first protocol is DHCP 66. The first message is a DHCP 66 discover message, the second message is a DHCP 66 offer message, the third message is a DHCP 66 request message, the fourth message is a DHCP 66 acknowledgment message and the fifth message is a DHCP 66 negative acknowledgment message. The quality-of-service identifier is sent in DHCP 66 giaddr-field 130 with an IP 54 address for CMTS 12. In a preferred embodiment of the present invention, quality-of-service identifiers are implemented as additional SIDs (Table 16). In another embodiment of the present invention, the quality-of-service identifiers are not implemented as additional SIDs (Table 16), but are a new type of identifier used in data-over-cable system 400. However, other network devices, protocols, quality-of-service identifiers and message sequences can also be used.

In another embodiment of the present invention, the first network device is CM 16, the second network device is quality-of-service server 402 and the third network device is CMTS 12. In such an embodiment, CM 16 sends quality-of-service requests directly to quality-of-service server 402 with DHCP messaging before sending a registration method to CMTS 12. After obtaining a quality-of-service identifier, CM 16 sends a registration message to CMTS 12.

If CMTS 12 detects a quality-of-service identifier in a registration message, CMTS 12 creates a quality-of-service connection requested by CM 16 based on the quality-of-service identifier without contacting QoS server 402. However, the present invention is not limited to the network devices, protocol, or protocol messages described, and other network devices, protocols and protocol messages could also be used.

Figure 25:
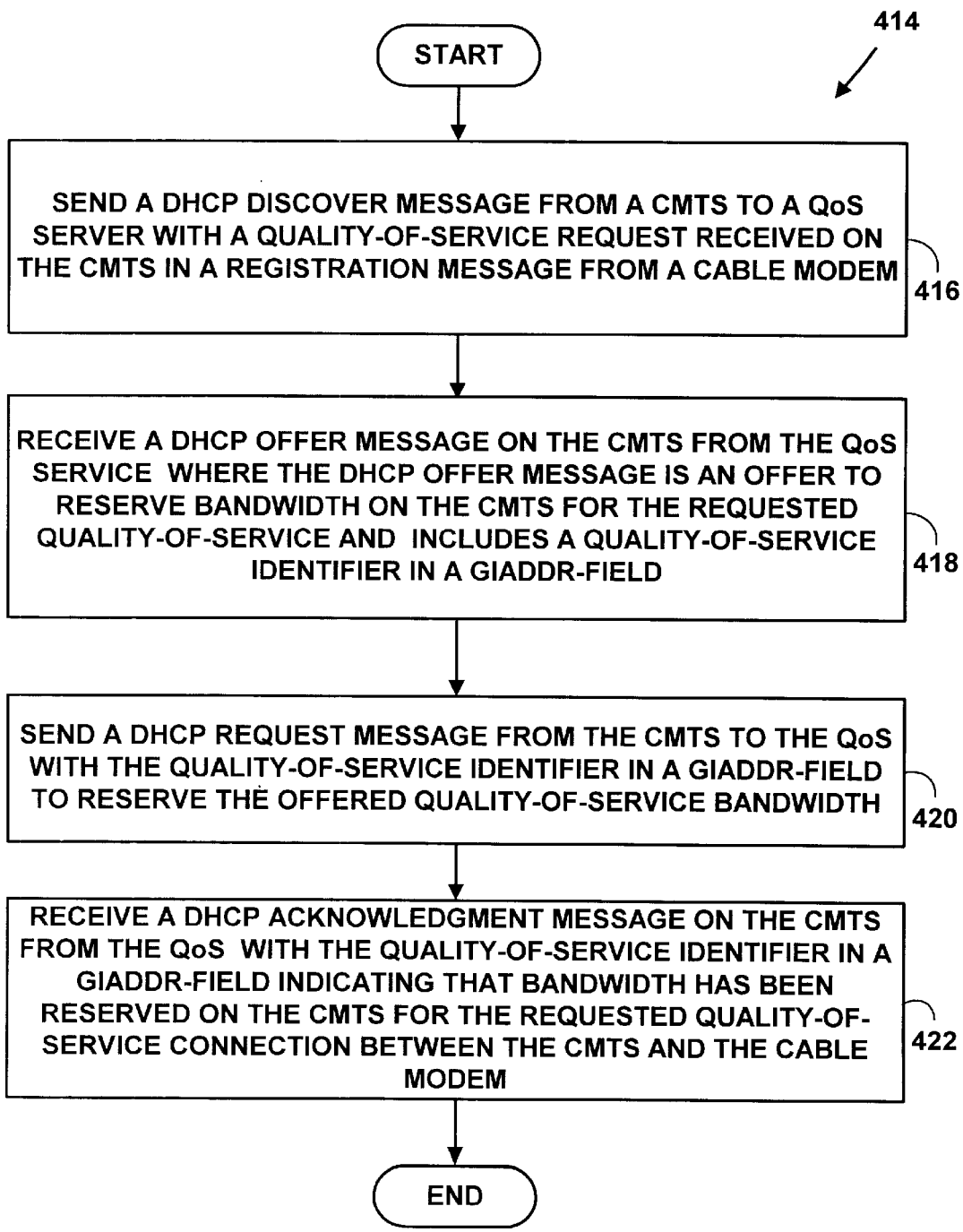
FIG. 25 is a flow diagram illustrating a method for determining quality-of-service.

FIG. 25 is a flow diagram illustrating a method 414 for determining quality-of-service. At step 416, a DHCP 66 discover message is sent from CMTS 12 to QoS server 402. The DHCP 66 discover message includes a request to determine if CMTS 12 has enough available bandwidth to create a connection to CM 16 with a specific quality-of-service requested by CM 16. At step 418, a DHCP 66 offer message is received on CMTS 12 from QoS server 402 in response to the DHCP 66 discover message. The DHCP 66 offer message is an offer to reserve bandwidth for CMTS 12 for the specific quality-of-service requested by CM 16. The offer message is sent by QoS server 402 using method 352 (FIG. 20) if CMTS 12 has enough available bandwidth to provide a connection to CM 16 with the specific quality-of-service requested. The DHCP 66 offer message includes a quality-of-service identifier for the specific quality-of-service requested in DHCP 66 giaddr-field 130 (FIG. 6). If CMTS 12 does not have enough available bandwidth to provide a connection for the specific quality-of-service requested by CM 16, QoS server 402 sends a DHCP 66 negative acknowledgment message (i.e., DHCP_NACK). The DHCP 66 negative acknowledgment message indicates no bandwidth is available on CMTS 12 to provide the specific quality-of-service request.

In one embodiment of the present invention, the DHCP 66 giaddr-field 130 (FIG. 6) includes a hashing value for an IP 54 address of CMTS 12 as 16 bits and the quality-of-service identifier for the requested.quality-of-service and class-of-service parameters as 16 bits. As is known in the art, hashing is a method to generate unique output numbers typically with a mathematical formula for a large data set of input numbers. A hashing value is used to make the quality-of-service identifier unique in the data-over-cable system since a number of cable modems may request the same quality-of-service. However, other values, hashing values and bit sizes could also be used, and the present invention is not limited to these values. The quality-of-service identifier indicates that CMTS 12 has enough bandwidth to provide the quality-of-service connection requested by CMTS 12. QoS server 402 uses method 352 (FIG. 20) to determine if CMTS 12 has enough bandwidth to create a connection with the quality-of-service desired by CM 16.

At step 420, a DHCP 66 request message with the hashed quality-of-service identifier in DHCP 66 giaddr-field 130 is sent from CMTS 12 is sent to QoS server 402 requesting QoS server 402 to reserve bandwidth for CMTS 12 for the specific quality-of-service requested by CM 16. At step 422, a DHCP 66 acknowledgment message is received on CMTS 12 with the hashed quality-of-service identifier in DHCP 66 giaddr-field 130 acknowledging bandwidth for the specific quality-of-service requested by CM 16 has been reserved on CMTS 12. CMTS 12 creates the connection with the quality-of-service requested by CM 16 with a downstream cable channel on cable network 14.

Figure 26:
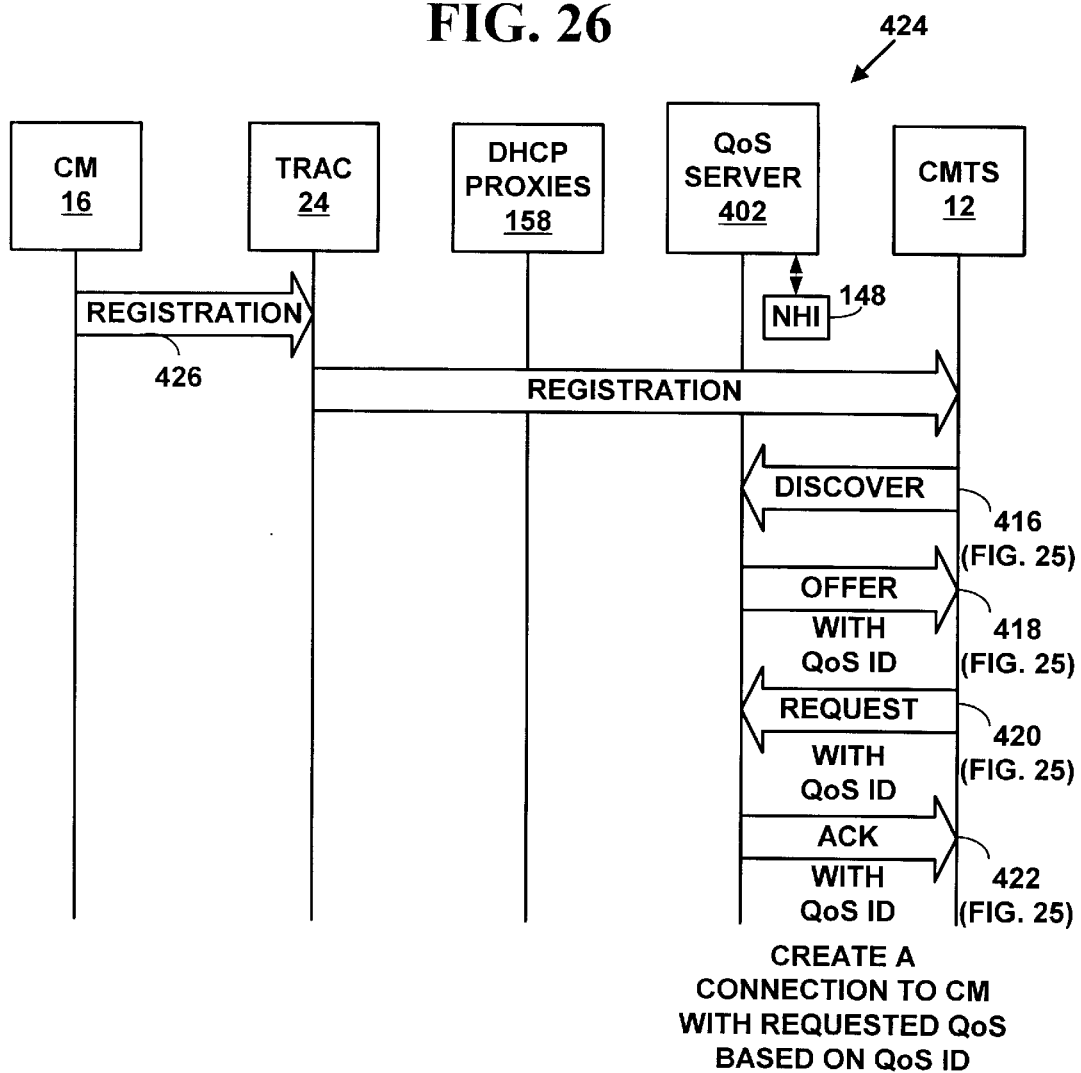
FIG. 26 is a block diagram illustrating a message flow for the method of FIG. 25.

FIG. 26 is a block diagram illustrating a message flow 424 for method 414 (FIG. 25). In a preferred embodiment of the present invention, CM 16 sends a registration message 426 on an upstream channel to TRAC 24 via telephony return, which forwards it to CMTS 12. In another embodiment of the present invention, CM 16 sends the registration message on an upstream cable channel to CMTS 12 without using the telephony return pathway through TRAC 24. In both scenarios, the registration message includes a quality-of-service request for a quality-of-service for CM 16.

CMTS 12 sends a DHCP 66 discover message to quality-of-service server 402 to determine if CMTS 12 has enough available bandwidth to provide the desired quality-of-service connection requested by CM 16 (step 416, FIG. 25). CMTS 12 receives a DHCP 66 offer message with a hashed quality-of-service identifier in DHCP 66 giaddr-field 130 (step 418, FIG. 25). CMTS 12 sends a DHCP 66 request message to quality-of-service server 402 with the hashed quality-of-service identifier obtained in the DHCP 66 offer message in DHCP 66 giaddr-field 130 (step 420, FIG. 25). The DHCP 66 request message with the hashed quality-of-service identifier indicates that CMTS 12 desires to allocate bandwidth for the quality-of-service connection requested by CM 16. CMTS 12 receives a DHCP 66 acknowledgment message from quality-of-service server 402 including the hashed quality-of-service identifier in a DHCP 66 giaddr-field 130 (Step 422, FIG. 25). The DHCP acknowledgement message indicates bandwidth for the quality-of-service connection requested by CM 16 has been allocated from available bandwidth on CMTS 12. CMTS 12 creates the connection with the quality-of-service requested by CM 16 with a downstream cable channel on cable network 14 based on the quality-of-service identifier.

In another embodiment of the present invention, CM 16 communicates directly with quality-of-service server 402. In such an embodiment, CM 16 uses a DHCP 66 message sequence (method 416, FIG. 25)identical to that used by CMTS 12 to allocate bandwidth on CMTS for a quality-of-service connection requested by CM 16 before sending a registration message to CMTS 12.

FIG. 27 is a block diagram illustrating a message flow 428 for quality-of-service requests from CM 16. CM 16 executes the steps of method 414 (FIG. 25) using the same DHCP 66 messages as was described for CMTS 12. CM 16 sends a DHCP 66 discover message 430 to QoS server 402 to determine if CMTS 12 has enough available bandwidth to provide the desired quality-of-service connection requested by CM 16. CM 16 receives a DHCP 66 offer message 432 with a hashed quality-of-service identifier in a DHCP 66 giaddr-field 130 from QoS server 402 via a downstream channel from CMTS 12. CM 16 sends a DHCP request message 434 to QoS server 402 with the hashed quality-of-service identifier obtained the DHCP 66 offer message in a DHCP 66 giaddr-field 130. DHCP 66 request message 434 with the hashed quality-of-service identifier indicates that CM 16 desires to allocate bandwidth on CMTS 12 for the quality-of-service connection requested by CM 16. CM 16 receives a DHCP 66 acknowledgment message 436 from QoS server 402 including the hashed quality-of-service identifier in DHCP 66 giaddr-field 130, and indicating that bandwidth for the quality-of-service connection requested by CM 16 has been allocated from available bandwidth on CMTS 12.

CM 16 sends CMTS 12 a registration message 438 with the quality-of-service identifier obtained from the DHCP 66 message sequence with QoS server 402. CMTS 12 recognizes that the registration message includes a quality-of-service identifier and creates the connection with the quality-of-service requested by CM 16 with a downstream cable channel on cable network 14 without further communications with quality-of-service server 402 (i.e., without executing method 414 of FIG. 5).

DHCP 66 defines mechanisms through which network host clients (e.g., CPE 18 or CM 16) can be assigned a network host address (e.g., IP 54 address) for a fixed period of time, allowing for reassignment of network host interface addresses to different network host clients.

DHCP 66 allocates temporary or permanent network addresses (e.g., IP 54 address) to network hosts clients such as CM 16 or CPE 18. Temporary network addresses are allocated dynamically and permanent network addresses are allocated statically.

A fixed period over which a network host interface address is allocated to a network host client is referred to as a "lease." The network host client may extend its lease when it expires with subsequent DHCP 66 requests. The network host client issues a message to release the network host interface address back to the network host server when the network host client no longer needs the address. The network host client may ask for a permanent static address assignment by asking for an infinite lease. When assigning "permanent" addresses, a network host server may choose to give out lengthy but non-infinite leases to allow detection that the network host client has been retired. The network host client may also ask for a temporary dynamic address assignment by asking for a temporary lease with a short duration.

The combination of DHCP 66 chaddr-field 132 (FIG. 6) and an assigned network host interface address constitute an unique identifier for the network host client's lease and are used by both the network host client and network host server to identify a lease referred to in any DHCP 66 messages.

A QoS connection is assigned a lease by QoS server 402. A static or long-term lease can be requested by requesting an "infinite" lease time from QoS server 402. A dynamic or short-term lease can be requested from QoS server 402 by requesting a desired lease time.

When CMTS 12 discovers that CM 16 is no longer using a quality-of-service connection that has a static or long term lease, CMTS 12 sends a DHCP 66 release message to QoS 402 with the hashed quality-of-service identifier in DHCP 66 giaddr-field 130. QoS server 402 deletes the quality-of-service identifier and adds a corresponding bandwidth associated with the quality-of-service identifier back into an available bandwidth for CMTS 12.

If CM 16 is finished with a quality-of-service connection or its dynamic or short-term lease has expired, CM 16 sends QoS server 402 and CMTS 12 a DHCP 66 release message with the hashed quality-of-service identifier in DHCP 66 giaddr-field 130. QoS server 402 deletes the quality-of-service identifier and adds a corresponding bandwidth associated with the quality-of-service identifier back into an available bandwidth for CMTS 12. CMTS 12 deletes the quality-of-service connection to CM 16.

If CM 16 has requested a dynamic or short-term lease, at anytime CM 16 can dynamically request a new quality-of-service connection to CMTS 12. CM 16 sends QoS server 402 a DHCP 66 discover message for the new quality-of-service connection to CMTS 12. QoS server 402 sends CM 16 a DHCP 66 offer message with a new hashed quality-of-service identifier in DHCP 66 giaddr field 130. After receiving the DHCP 66 offer message, CM 16 sends QoS server 402 and CMTS 12 a DHCP 66 release message with its original or old hashed quality-of-service identifier in DHCP 66 giaddr field for the old quality-of-service connection. QoS server 402 deletes the old quality-of-service identifier and adds a corresponding bandwidth associated with the old quality-of-service identifier back into an available bandwidth for CMTS 12. CMTS 12 deletes the old quality-of-service connection to CM 16. CM 16 sends a DHCP 66 request message with the new hashed quality-of-service identifier from the DHCP 66 offer message in DHCP 66 giaddr field 130. QoS server 402 sends CM 16 a DHCP acknowledgment message with the new hashed quality-of-service identifier in DHCP 66 giaddr field 130 indicating that CMTS 12 has enough available bandwidth to create the new quality-of-service connection for CM 16. CMTS 12 creates the new quality-of-service connection based on the new quality-of-service identifier. When CM 16 is finished with the new quality-of-service connection, CM 16 releases the connection with a DHCP 66 release message as was described above.

A preferred embodiment of the present invention can provide quality-of-service functionality using the methods and system described herein. In addition, a network device such as CM 16 or CMTS 12 makes a quality-of-service request to QoS server 402 using DHCP 66 messaging with a special hardware type in a DHCP 66 message that provides quality-of-service. For example, DHCP 66 hardware address type (i.e., DHCP 66 htype-field 112 (FIG. 6)) contains a new value specifically for QoS server 402 instead a default value (Table 4).

A system for a preferred embodiment of the present invention includes a quality-of-service server (e.g., QoS 402), for determining whether a first network device has enough available bandwidth to establish a connection to a second network device with a specific quality-of-service requested by the second network device. The quality-of-service server provides support for class-of-service, quality-of-service and other parameters with DHCP 66 messaging.

The system also includes multiple quality-of-service identifiers, for identifying a transmission bandwidth required for a specific quality-of-service requested by a second network device, wherein a value for a quality-of-service identifier is determined by the quality-of-service bandwidth requested by class-of-service, quality-of-service and other parameters and is included in an existing DHCP messaging field. In a preferred embodiment of the present invention, the quality-of-service identifiers are sent and received in DHCP 66 giaddr-field 130 as a hash value including the quality-of-service identifier and an IP 54 address for CMTS 12. However, other DHCP 66 message fields could also be used.

A preferred embodiment of the present invention offers several advantages over the prior art. CoS and QoS are handled and balanced in a data-over-cable system by a quality-of-service server using standard configuration protocol messaging. This relieves the computational burden from a cable modem termination system and helps reduce or eliminate the need for complex CoS and QoS handling software. Quality-of-service server provides a standardized way of handling CoS and QoS requests for one or more cable modem termination system and is easily adaptable for new CoS or QoS parameters.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or component may be used in the block diagrams.

The claims should not be read as limited to the described order or elements unless stated to that effect. Therefore, all embodiments that come within the scope and spirit of the following claims and equivalents thereto are claimed as the invention.

We claim:

1. In a data-over-cable system with a plurality of network devices, a method for providing quality-of-service for a network device, the method comprising the following steps:

sending a first message with a first protocol from a first network device to a second network device, the first message including a request to determine if the first network device has enough available bandwidth to create a connection to a third network device with a specific quality-of-service;

receiving a second message with the first protocol from the second network device, the second message an offer to reserve bandwidth on the first network device for the specific quality-of-service, the second message including a quality-of-service identifier for the specific quality-of-service requested in an existing message field for the first protocol;

sending a third message with the first protocol from the first network device to the second network device with the quality-of-service identifier in an existing message field for the first protocol requesting the second network device reserve bandwidth on the first network device for the specific quality-of-service requested; and receiving a fourth message with the first protocol from the second network device on the first network device with the quality-of-service identifier in an existing message field for the first protocol acknowledging bandwidth for the specific quality-of-service requested has been reserved on the first network device.

2. The method of claim 1 further comprising a computer readable medium having stored therein instructions for causing a central processing unit to execute the steps of the method.

3. The method of claim 1 wherein the first network device is a cable modem termination system, the second network device is a quality-of-service server, and the third network device is a cable modem.

4. The method of claim 1 wherein the first network device is a cable modem, the second network device is a quality-of-service server, and the third network device is a cable modem termination system.

5. The method of claim 1 wherein the first protocol is a dynamic Host Configuration Protocol, the first message is a Dynamic Host Configuration Protocol discover message, the second message is a Dynamic Host Configuration Protocol offer message, the third message is a Dynamic Host Configuration Protocol request message, and the fourth message is a Dynamic Host Configuration Protocol acknowledgment message.

6. The method of claim 1 wherein the second network device is a quality-of-service server that determines if the first network device has enough available bandwidth to create a connection to a third network device with a specific quality-of-service requested.

7. The method of claim 1 wherein the step of receiving a second message including a quality-of-service identifier indicates the first network device has enough usable bandwidth for the specific quality-of-service requested.

8. The method of claim 1 wherein step of receiving a second message including a quality-of-service identifier includes receiving the quality-of-service identifier in a network address field in the second message.

9. The method of claim 1 wherein the quality-of-service identifier includes a hashed network address plus the quality-of-service identifier for the specific quality-of-service requested by the third network device.

10. The method of claim 9 wherein the network address field is a Dynamic Host Configuration Protocol message giaddr-field, the hashed network address is a hashed valve including an Internet Protocol address plus the quality-of-service identifier for the specific quality of service requested.

11. The method of claim 1 further comprising:

receiving a registration message on the first network device from the third network device, the registration message including a request for a quality-of-service connection.

12. The method of claim 1 further comprising:

creating a connection between the first network device and the third network device with the requested quality-of-service based on the quality-of-service identifier.

13. The method of claim 1 wherein the step of sending a first message includes requesting a lease time for the specific quality-of-service requested in the first message.

14. The method of claim 13 wherein the lease time is used to allocate any of a long-term static quality-of-service connection, or a short term dynamic quality-of-service connection for the specific quality-of-service requested.

15. In a data-over-cable system with a plurality of network devices, a method for determining quality-of-service for a network device, the method comprising the following steps:

receiving a registration message on a first network device from a second network device;

determining whether the registration message includes a quality-of-service identifier, and if so, creating a connection from the first network device to the second network device with a quality-of-service based on the quality-of-service identifier, wherein the connection is created without contacting a quality-of-service server.

16. The method of claim 15 further comprising a computer readable medium having stored therein instructions for causing a central processing unit to execute the method.

17. The method of claim 15 wherein the first network device is a cable modem termination system and the second network device is a cable modem.

18. The method of claim 15 further comprising:

determining whether the registration message includes a quality-of-service identifier, and if not, sending a first message with a first protocol from the first network device to a third network device, the first message including a request to determine if the first network device has enough available bandwidth to create a connection to the second network device with a specific quality-of-service;

receiving a second message with the first protocol from the third network device, the second message an offer to reserve bandwidth on the first network device for the specific quality-of-service, the second message including a quality-of-service identifier for the specific quality-of-service requested in an existing message field for the first protocol;

sending a third message with the first protocol from the first network device to the third network device with the quality-of-service identifier in an existing message field for the first protocol requesting the third network device reserve bandwidth on the first network device for the specific quality-of-service requested;

receiving a fourth message with the first protocol from the third network device on the first network device with the quality-of-service identifier in an existing message field for the first protocol acknowledging bandwidth for the specific quality-of-service requested has been reserved on the first network device; and creating a connection from the first network device to the second network device with a quality-of-service based on the quality-of-service identifier.

19. The method of claim 18 wherein the third network device is a quality-of-service server.

20. The method of claim 18 wherein the first protocol is a dynamic Host Configuration Protocol, the first message is a Dynamic Host Configuration Protocol discover message, the second message is a Dynamic Host Configuration Protocol offer message, the third message is a Dynamic Host Configuration Protocol request message, and the fourth message is a Dynamic Host Configuration Protocol acknowledgment message.

21. A system for providing quality-of-service connections, the system comprising:

quality-of-service server, for determining whether a first network device has enough available bandwidth to establish a connection to a second first network device with a specific quality-of-service requested, wherein the specific quality-of-service requested includes class-of-service and quality-of-service parameters and the quality-of-service connection is requested with Dynamic Host Configuration Protocol messaging; and a plurality of quality-of-service identifiers, for identifying a transmission bandwidth required for a specific quality-of-service requested by a second network device, wherein a value for the quality-of-service identifier is sent and received using Dynamic Host configuration protocol messaging in an existing Dynamic Host Configuration Protocol message field.

22. The system of claim 21 wherein the first network device is a cable modem termination system and the second network device is a cable modem.

23. The system of claim 21 wherein the existing Dynamic Host Configuration Protocol message field is a giaddr-field and the giaddr-field contains a hashed value including an Internet Protocol address and a quality-of-service identifier.

24. In a data-over-cable system with a plurality of network devices, with a first network device connected to a third network device with a first quality-of-service connection, wherein the first quality-of-service connection is identified by a first quality-of-service identifier, a method for dynamically providing quality-of-service for a network device, the method comprising the following steps:

sending a first message with a first protocol from the first network device to a second network device, the first message including a request to determine if a third network device has enough available bandwidth to create a second quality-of-service connection from the first network device to the third network device with a second quality-of-service;

receiving a second message with the first protocol from the second network device, the second message an offer to reserve bandwidth on the third network device for the second quality-of-service connection, the second message including a second quality-of-service identifier for the second quality-of-service requested in an existing message field for the first protocol;

sending a third message with the first protocol from the first network device to the second network device to release the first quality of service connection, wherein the third message includes the first quality-of-service identifier in an existing message field for the first protocol;

sending a fourth message with the first protocol from the first network device to the second network device with the second quality-of-service identifier returned in the second message in an existing message field requesting the second network device reserve bandwidth on the third network device for the specific quality-of-service requested; and receiving a fifth message with the first protocol from the second network device on the first network device with the second quality-of-service identifier in an existing message field indicating bandwidth for the second quality-of-service connection has been reserved on the third network device.

25. The method of claim 24 further comprising a computer readable medium having stored therein instructions for causing a central processing unit to execute the method.

26. The method of claim 24 wherein the step of sending a third message includes sending the third message to the second network device and the third network device.

27. The method of claim 24 wherein the first network device is a cable modem, the second network device is a quality-of-service server, and the third network device is a cable modem termination system.

28. The method of claim 24 wherein the first protocol is a dynamic Host Configuration Protocol, the first message is a Dynamic Host Configuration Protocol discover message, the second message is a Dynamic Host Configuration Protocol offer message, the third message is a Dynamic Host Configuration Protocol release message, the fourth message is a Dynamic Host Configuration Protocol request message, and the fifth message is a Dynamic Host Configuration Protocol acknowledgment message.

29. In a data-over-cable system with a plurality of cable modems, a method for reserving bandwidth from a cable modem, the method comprising the following steps:

receiving a registration message from a cable modem on a cable modem termination system, the registration message including a request for a quality-of-service connection between the cable modem and the cable modem termination system;

sending a Dynamic Host Configuration Protocol discover message from the cable modem termination system to a quality-of-service server, the discover message including a request to determine if the cable modem termination system has enough available bandwidth to create a connection to a cable modem with the specific quality-of-service requested by the cable modem;

receiving a Dynamic Host Configuration Protocol offer message on the cable modem termination system device, the offer message an offer to reserve bandwidth on the cable modem termination system for the specific quality-of-service requested by the cable modem, the offer message including a quality-of-service identifier for the specific quality-of-service requested in an existing Dynamic Host Configuration Protocol message giaddr-field;

sending a Dynamic Host Configuration Protocol message request message with the quality-of-service identifier in a giaddr-field from the cable modem termination system to the quality-of-service server requesting the quality-of-service server to reserve bandwidth on the cable modem termination system for the specific quality-of-service requested by the cable modem;

receiving a Dynamic Host Configuration Protocol acknowledgment message on the cable modem termination system with the quality-of-service identifier in a giaddr-field acknowledging bandwidth for the specific quality-of-service requested by the cable modem has been reserved on the cable modem termination system;

creating a connection between the cable modem termination system and the cable modem with the specific quality-of-service requested by the cable modem and based on the quality-of-service identifier.

30. The method of claim 29 further comprising a computer readable medium having stored therein instructions for causing a central processing unit to execute the steps of the method.

31. In a data-over-cable system with a plurality of cable modems, a method of providing quality-of-service with a quality-of-service server, the method comprising the following steps:

allocating a plurality of quality-of-service identifiers from the quality-of-service server using Dynamic Host Configuration Protocol messaging, wherein the plurality of quality-of-service identifiers indicate a cable modem termination system has enough bandwidth to create connections to a plurality of cable modems with a plurality of desired quality-of-services; and creating a plurality of quality-of-service connections between the plurality of cable modems and the cable modem termination system based on the plurality of quality-of-service identifiers obtained from the quality-of-service server with Dynamic Host Configuration Protocol messaging.

* * * * *